US011911720B2

(12) United States Patent
Adams et al.

(10) Patent No.: US 11,911,720 B2
(45) Date of Patent: Feb. 27, 2024

(54) FLUID PURIFICATION DEVICE

(71) Applicant: Unger Marketing International, LLC, Bridgeport, CT (US)

(72) Inventors: Paul H. Adams, Monroe, CT (US); Stephen P. Huda, Shelton, CT (US); James M. Buckley, New Hartford, CT (US); John Anthony Triunfo, Fairfield, CT (US); Joseph K. Patterson, Monroe, CT (US); Michael T. La Tulippe, Fairfield, CT (US); Robert Camp, Bethany, CT (US); Robert F. Smith, Waterbury, CT (US)

(73) Assignee: Unger Marketing International, LLC, Bridgeport, CT (US)

( * ) Notice: Subject to any disclaimer, the term of this patent is extended or adjusted under 35 U.S.C. 154(b) by 0 days.

(21) Appl. No.: 16/534,030

(22) Filed: Aug. 7, 2019

(65) Prior Publication Data
US 2020/0001214 A1   Jan. 2, 2020

Related U.S. Application Data

(63) Continuation-in-part of application No. 14/684,071, filed on Apr. 10, 2015, now Pat. No. 10,414,671.
(Continued)

(51) Int. Cl.
*B01D 35/147*   (2006.01)
*B01D 29/31*   (2006.01)
(Continued)

(52) U.S. Cl.
CPC ......... *B01D 35/1475* (2013.01); *B01D 29/31* (2013.01); *C02F 1/004* (2013.01);
(Continued)

(58) Field of Classification Search
CPC ............ B01D 35/1475; B01D 2201/16; B01D 24/04; B01D 24/042; B01D 29/31;
(Continued)

(56) References Cited

U.S. PATENT DOCUMENTS

| 405,518 A | 6/1889 | Wilson |
|---|---|---|
| 429,384 A | 6/1890 | Manwaring |

(Continued)

FOREIGN PATENT DOCUMENTS

| CA | 2964732 A1 | 10/2015 |
|---|---|---|
| CH | 351907 A | 1/1961 |

(Continued)

OTHER PUBLICATIONS

Ask Mr Science, How do rainbows work, Oct. 2013, users.hubwest. com, blogpost, retrieved Feb. 6, 2020 from <URL:http://users. hubwest.com/hubert/mrscience/science 17.html> (Year: 2013).
(Continued)

*Primary Examiner* — Akash K Varma
(74) *Attorney, Agent, or Firm* — McCarter & English, LLP; Dave S. Christensen

(57) ABSTRACT

A device and system for purifying a fluid is provided. The system includes a tank having an interior space and a media container disposed within the interior space. A valve is provided that cooperates with an element within the interior, the valve being movable between an open and a closed position. The valve being biased to the open position when the element is not positioned within the interior space, wherein the interior space is fluidly coupled to the atmosphere in the open position. The valve further being configured to move to a closed position when the element is positioned within the interior space.

20 Claims, 55 Drawing Sheets

Related U.S. Application Data

(60) Provisional application No. 62/802,990, filed on Feb. 8, 2019, provisional application No. 62/743,880, filed on Oct. 10, 2018, provisional application No. 62/716,640, filed on Aug. 9, 2018, provisional application No. 62/065,803, filed on Oct. 20, 2014, provisional application No. 61/977,778, filed on Apr. 10, 2014.

(51) Int. Cl.
*C02F 1/00* (2023.01)
*C02F 103/04* (2006.01)

(52) U.S. Cl.
CPC ...... B01D 2201/06 (2013.01); C02F 2103/04 (2013.01); C02F 2201/004 (2013.01); C02F 2201/007 (2013.01)

(58) Field of Classification Search
CPC .......... C02F 2201/005; C02F 2201/006; C02F 1/004; C02F 2103/04; C02F 2201/004; C02F 2201/007; C02F 1/001; C02F 9/005; B01J 47/024
USPC .................. 210/91, 120, 282, 234, 436, 484
See application file for complete search history.

(56) References Cited

U.S. PATENT DOCUMENTS

| | | |
|---|---|---|
| 661,339 A | 11/1900 | Grever |
| 1,211,369 A | 1/1917 | Miller |
| 1,527,046 A | 2/1925 | Ingram |
| 1,656,896 A | 1/1928 | Astrom |
| 1,834,978 A | 12/1931 | Shapiro |
| 1,995,830 A | 3/1935 | Barnsby |
| 2,063,086 A | 12/1936 | Fitz |
| 2,073,991 A | 3/1937 | Koser |
| 2,087,157 A | 7/1937 | Lind |
| 2,167,225 A | 7/1939 | Van Eweyk |
| 2,278,488 A | 4/1942 | Ralston |
| 2,295,708 A | 9/1942 | Raymond |
| 2,365,221 A | 12/1944 | Shafor |
| 2,367,260 A | 1/1945 | Beddoes |
| 2,525,497 A | 10/1950 | Monfried |
| 2,630,227 A | 3/1953 | Rodwell |
| 2,633,990 A | 4/1953 | Simpson |
| 2,717,614 A | 9/1955 | Palivos |
| 2,753,302 A | 7/1956 | Cioffi |
| 3,094,043 A | 6/1963 | Powers et al. |
| 3,094,807 A | 6/1963 | Dorman |
| D198,153 S | 5/1964 | Baker |
| 3,209,915 A | 10/1965 | Gutkowski |
| 3,266,628 A | 8/1966 | Price |
| 3,283,903 A | 11/1966 | Muller |
| 3,319,794 A | 5/1967 | Gross |
| 3,327,859 A | 6/1967 | Pall |
| 3,342,340 A | 9/1967 | Shindell |
| 3,371,792 A | 3/1968 | Weyand et al. |
| 3,402,126 A | 9/1968 | Cioffi |
| 3,442,390 A | 5/1969 | Petrucci et al. |
| 3,497,069 A | 2/1970 | Lindenthal et al. |
| 3,517,816 A | 6/1970 | Hoppen |
| 3,561,602 A | 2/1971 | Molitor |
| 3,642,213 A | 2/1972 | Parkison et al. |
| 3,746,171 A | 7/1973 | Thomsen |
| 3,807,298 A | 4/1974 | Luke et al. |
| 3,960,092 A | 6/1976 | Newman, Jr. |
| 4,005,010 A | 1/1977 | Lunt |
| 4,048,030 A | 9/1977 | Miller |
| 4,048,064 A | 9/1977 | Clark, III |
| 4,049,548 A | 9/1977 | Dickerson |
| 4,102,473 A | 7/1978 | Draxler |
| 4,178,249 A | 12/1979 | Council |
| 4,272,263 A | 6/1981 | Hancock |
| 4,368,123 A | 1/1983 | Stanley |
| 4,418,924 A | 12/1983 | Mack |
| D281,755 S | 12/1985 | Bradley |
| 4,654,140 A * | 3/1987 | Chen .................... B01D 35/143 116/268 |
| 4,659,460 A | 4/1987 | Muller et al. |
| 4,728,422 A | 3/1988 | Bailey |
| 4,793,922 A | 12/1988 | Morton |
| 4,795,173 A | 1/1989 | Osborne |
| 4,877,526 A | 10/1989 | Johnson et al. |
| 4,882,050 A | 11/1989 | Kopf |
| 4,885,089 A | 12/1989 | Hankammer |
| 4,932,915 A | 6/1990 | Boris et al. |
| 4,989,636 A | 2/1991 | Hunter et al. |
| 5,006,238 A | 4/1991 | Tominaga |
| 5,040,903 A | 8/1991 | Schramer |
| D320,273 S | 9/1991 | Heiden |
| 5,064,534 A | 11/1991 | Busch |
| 5,087,357 A | 2/1992 | Villa |
| 5,100,551 A | 3/1992 | Pall et al. |
| D326,002 S | 5/1992 | Rodriguez |
| 5,112,503 A | 5/1992 | Raifman |
| 5,114,572 A | 5/1992 | Hunter et al. |
| 5,137,632 A | 8/1992 | Morgan, Jr. |
| 5,154,823 A | 10/1992 | Ma et al. |
| 5,236,595 A | 8/1993 | Wang et al. |
| 5,254,242 A | 10/1993 | Van der Meer |
| 5,288,412 A | 2/1994 | Voorhees et al. |
| 5,318,703 A | 6/1994 | Heiligman |
| 5,378,370 A | 1/1995 | Brane et al. |
| 5,510,027 A | 4/1996 | Tejeda |
| D369,544 S | 5/1996 | Culliss |
| D372,760 S | 8/1996 | Brancazio |
| D374,064 S | 9/1996 | Brancazio |
| 5,558,244 A | 9/1996 | Akaike et al. |
| 5,566,611 A | 10/1996 | Scheucher et al. |
| 5,595,652 A | 1/1997 | Rainer |
| 5,605,624 A | 2/1997 | Wright |
| 5,605,632 A | 2/1997 | Jansen |
| 5,624,559 A | 4/1997 | Levin et al. |
| 5,637,214 A | 6/1997 | Kahana |
| 5,660,863 A | 8/1997 | Nakano et al. |
| D395,274 S | 6/1998 | Stoll |
| 5,853,572 A | 12/1998 | Kuennen et al. |
| D404,086 S | 1/1999 | Harwell |
| 5,876,600 A | 3/1999 | Matsubara et al. |
| D414,824 S | 10/1999 | Canoose |
| D416,790 S | 11/1999 | Bertozzi et al. |
| 5,985,139 A | 11/1999 | Zoeller |
| 5,993,656 A | 11/1999 | Cordani |
| 6,068,761 A | 5/2000 | Yuen |
| D427,046 S | 6/2000 | Mannix |
| 6,009,728 A | 8/2000 | Bairischer |
| 6,099,728 A | 8/2000 | Bairischer |
| 6,120,686 A | 9/2000 | Bilz |
| 6,132,612 A | 10/2000 | Bourgeois |
| 6,136,183 A | 10/2000 | Suzuki et al. |
| 6,197,193 B1 | 3/2001 | Archer |
| D441,278 S | 5/2001 | Remar |
| D441,914 S | 5/2001 | Armour |
| 6,241,389 B1 | 6/2001 | Gilmore et al. |
| 6,274,055 B1 | 8/2001 | Zuk, Jr. |
| 6,343,697 B1 | 2/2002 | Hausdorf et al. |
| D455,935 S | 4/2002 | Detiveaux |
| 6,391,097 B1 | 5/2002 | Rosenberg |
| 6,485,639 B1 * | 11/2002 | Gannon .................. B01D 15/00 210/164 |
| 6,500,335 B2 | 12/2002 | Janik et al. |
| 6,610,275 B1 | 8/2003 | Owades et al. |
| 6,622,871 B2 | 9/2003 | Gabele et al. |
| D481,442 S | 10/2003 | Liu |
| 6,649,056 B2 | 11/2003 | Fritze |
| 6,685,843 B2 | 2/2004 | Leaverton |
| 6,716,348 B1 | 4/2004 | Morgan |
| 6,764,595 B1 | 7/2004 | Halemba et al. |
| 6,773,588 B2 | 8/2004 | Beeman et al. |
| D496,984 S | 10/2004 | Costa |
| D506,551 S | 6/2005 | Booth et al. |
| 6,966,444 B2 | 11/2005 | Morgan |

(56) References Cited

U.S. PATENT DOCUMENTS

| | | | |
|---|---|---|---|
| D517,162 S | 3/2006 | Clower | |
| 7,014,690 B2 | 3/2006 | Mitsch et al. | |
| 7,147,774 B2 | 12/2006 | Jones, III | |
| 7,156,994 B1 | 1/2007 | Archer | |
| 7,186,338 B2 | 3/2007 | Boisvert | |
| 7,243,728 B2 | 7/2007 | Stoesz et al. | |
| D552,248 S | 10/2007 | Brawley | |
| 7,297,257 B1 * | 11/2007 | Terry | C02F 5/145 422/282 |
| 7,303,605 B2 | 12/2007 | Zia et al. | |
| D562,431 S | 2/2008 | Brune | |
| 7,357,337 B2 | 4/2008 | Farrari | |
| 7,378,019 B1 | 5/2008 | Currier et al. | |
| D580,205 S | 11/2008 | Callahan | |
| 7,459,078 B2 | 12/2008 | Klein | |
| 7,566,399 B2 | 7/2009 | Kuo et al. | |
| D606,420 S | 12/2009 | Shoji | |
| 7,625,199 B2 | 12/2009 | Jahn et al. | |
| 7,748,755 B2 | 7/2010 | Camp et al. | |
| 7,850,859 B2 | 12/2010 | Tanner et al. | |
| D640,933 S | 6/2011 | Gallagher | |
| 7,963,400 B2 | 6/2011 | Stolarik et al. | |
| D649,477 S | 11/2011 | Burns | |
| 8,110,103 B2 | 2/2012 | Mormino et al. | |
| 8,182,212 B2 | 5/2012 | Parcell | |
| D661,339 S | 6/2012 | Thixton et al. | |
| 8,323,493 B2 | 12/2012 | Quintel et al. | |
| D678,815 S | 3/2013 | Hernandez | |
| 8,393,262 B1 | 3/2013 | Molayem | |
| 8,464,743 B2 | 6/2013 | King et al. | |
| D692,524 S | 10/2013 | Ziser | |
| D700,063 S | 2/2014 | Torang | |
| 8,815,086 B2 | 8/2014 | Morgan | |
| D736,651 S | 8/2015 | Moad | |
| D740,915 S | 10/2015 | Harrington | |
| D742,997 S | 11/2015 | Sgroi | |
| D779,629 S | 2/2017 | Kemper | |
| D797,888 S | 9/2017 | Schurmeyer | |
| D798,996 S | 10/2017 | Sgroi | |
| D804,596 S | 12/2017 | Nichols | |
| D815,220 S | 4/2018 | Nichols | |
| D828,488 S | 9/2018 | Sgroi | |
| 10,088,398 B2 | 10/2018 | Clark et al. | |
| D851,412 S | 6/2019 | Harrington et al. | |
| D859,626 S | 9/2019 | Hu | |
| 10,414,671 B2 | 9/2019 | Hirsch et al. | |
| D861,847 S | 10/2019 | Li | |
| D870,258 S | 12/2019 | Song | |
| D894,326 S | 8/2020 | Sommerfeld et al. | |
| 10,829,396 B2 | 11/2020 | Camp et al. | |
| D913,413 S | 3/2021 | Huda et al. | |
| D928,911 S | 8/2021 | Huda et al. | |
| 2003/0047522 A1 * | 3/2003 | Gannon | B01D 15/00 210/799 |
| 2004/0084361 A1 | 5/2004 | Janik et al. | |
| 2004/0140251 A1 | 7/2004 | Hsiao | |
| 2004/0149666 A1 | 8/2004 | Leaverton | |
| 2004/0251191 A1 | 12/2004 | Darmawan | |
| 2005/0199536 A1 | 9/2005 | Koslow | |
| 2006/0086656 A1 * | 4/2006 | Morgan | B01D 29/27 210/448 |
| 2007/0000829 A1 | 1/2007 | Boisvert | |
| 2007/0235381 A1 | 10/2007 | Tsai | |
| 2008/0000820 A1 | 1/2008 | Mitchell | |
| 2008/0011669 A1 | 1/2008 | Morgan | |
| 2008/0296210 A1 | 12/2008 | Bittner | |
| 2009/0008318 A1 | 1/2009 | Anes et al. | |
| 2009/0045583 A1 | 2/2009 | Ropponen | |
| 2009/0146421 A1 | 6/2009 | Engdahl | |
| 2009/0314703 A1 | 12/2009 | Beach et al. | |
| 2010/0012590 A1 | 1/2010 | Slark | |
| 2010/0084030 A1 | 4/2010 | Mackulin et al. | |
| 2010/0126946 A1 | 5/2010 | Morgan | |
| 2010/0314301 A1 | 12/2010 | Sloan et al. | |
| 2011/0062065 A1 | 3/2011 | McCague | |
| 2011/0062066 A1 | 3/2011 | McCague | |
| 2011/0089180 A1 | 4/2011 | Kolbasi | |
| 2011/0303618 A1 | 12/2011 | Cueman et al. | |
| 2012/0031142 A1 | 2/2012 | Marton et al. | |
| 2012/0085687 A1 | 4/2012 | Simonette | |
| 2012/0132573 A1 | 5/2012 | Lautzenheiser et al. | |
| 2012/0261325 A1 | 10/2012 | Brown et al. | |
| 2012/0261329 A1 | 10/2012 | Quintel | |
| 2012/0261359 A1 | 10/2012 | Quintel et al. | |
| 2013/0020246 A1 | 1/2013 | Hoots et al. | |
| 2013/0025447 A1 | 1/2013 | Crowder | |
| 2013/0056406 A1 | 5/2013 | Jacobs et al. | |
| 2013/0158637 A1 | 6/2013 | Sheikh | |
| 2013/0277298 A1 | 10/2013 | Sanocki et al. | |
| 2014/0027361 A1 | 1/2014 | Pennington | |
| 2015/0107205 A1 | 4/2015 | Hartog | |
| 2015/0353383 A1 | 12/2015 | Hirsch et al. | |
| 2017/0197854 A1 | 7/2017 | Chandler, Jr. et al. | |
| 2018/0194646 A1 | 7/2018 | Camp | |
| 2019/0070535 A1 | 3/2019 | Patterson | |
| 2019/0193006 A1 | 6/2019 | Huda et al. | |
| 2020/0010338 A1 | 1/2020 | Hirsch et al. | |

FOREIGN PATENT DOCUMENTS

| | | |
|---|---|---|
| CN | 105709492 A | 6/2016 |
| DE | 860195 A1 | 12/1952 |
| DE | 2020929 A1 | 1/1972 |
| DE | 2364504 A1 | 8/1974 |
| DE | 2608408 A1 | 11/1976 |
| DE | 2531850 A1 | 1/1977 |
| DE | 3207511 A1 | 9/1983 |
| DE | 3624414 A1 | 1/1988 |
| DE | 4136852 A1 | 5/1993 |
| DE | 4325114 C1 | 11/1994 |
| DE | M97016860001 A1 | 8/1997 |
| DE | 69411911 T2 | 2/1999 |
| DE | 20022322 U1 | 7/2001 |
| DE | 10305632 A1 | 11/2003 |
| DE | 202006002737 U1 | 4/2006 |
| EM | 0003898380031 | 8/2005 |
| EM | 0003898380032 | 10/2005 |
| EP | 1221429 A1 | 11/1999 |
| EP | 1626936 A1 | 2/2006 |
| EP | 1728767 A1 | 12/2006 |
| EP | 0676010 B1 | 7/2010 |
| EP | 2969106 A1 | 1/2016 |
| EP | 3056276 A2 | 8/2016 |
| EP | 3070058 A1 | 9/2016 |
| EP | 3214046 A1 | 9/2017 |
| EP | 3372558 A1 | 9/2018 |
| EP | 3617154 A1 | 3/2020 |
| FR | 2636940 A1 | 3/1990 |
| GB | 525643 A | 9/1940 |
| GB | 1296051 A1 | 3/1969 |
| GB | 1404267 A1 | 8/1975 |
| GB | 1441269 A | 6/1976 |
| GB | 1543590 A | 4/1979 |
| GB | 2206292 A | 1/1989 |
| GB | 2222536 A | 3/1990 |
| JP | H07163820 A | 6/1995 |
| JP | H1190427 A1 | 4/1999 |
| JP | 2005138064 A | 6/2005 |
| NL | 8204637 A | 6/1984 |
| WO | 2003064290 A1 | 8/2003 |
| WO | 2004110938 A2 | 12/2004 |
| WO | 2005115924 A2 | 12/2005 |
| WO | 2010010574 A1 | 1/2010 |
| WO | 2010081075 A1 | 1/2010 |
| WO | 2013103765 A1 | 7/2013 |
| WO | 2015157680 A1 | 10/2015 |
| WO | 2016068746 A1 | 5/2016 |
| WO | 2018067437 A1 | 4/2018 |

OTHER PUBLICATIONS

"Componenti Per Addolcitori/Water Softners Components," ITA/NIG-CAT-801, Dated Apr. 2009, 6 Pages.

(56) References Cited

OTHER PUBLICATIONS

Application for Invalidation dated Sep. 28, 2016 in European Community Registration EU 002555425-0002.
Lustiges Taschenbuch No. 210 (front page, pp. 2, 3, 218, 219, 238, 239, 240, 241, published 1995).
Penquin Filter Pump Industries, "In-Tank & Out-Tank Filtration Systems", https://filterpump.com, Jul. 2010 (Jul. 2010)—refer to BF Bag Filtration Systems.
Walt Disney's Donald Duck No. 378 (Front page, p. 1; published 1987).
European Search Report for Application No. EP19190926 dated Feb. 3, 2020; 9 pgs.
Great Britain Search Report for Application No. 20189164.5 dated Jan. 11, 2021; 8 pgs.
European Office Action; International Application No. 19190926.6-1101; International Filing Date: Aug. 9, 2019; dated Nov. 2, 2020; 9 pages.
Partial European Search Report; International Application No. 201941242-1101; International Filing Date: Sep. 2, 2020; dated Nov. 11, 2020; 14 pages.
Susan Selke: "Packaging: Polymers in Flexible Packaging", Encyclopedia of Materials: Science and Technology (Second Edition), Dec. 31, 2001 (Dec. 31, 2001), pp. 6652-6656, XP055742846, Retrieved from the Internet: URL:https://www.sciencedirect.com/sdfe/pdf/download/eid/3-s2.0-B0080431526011761/first-page-pdf [retrieved on Oct. 22, 2020].
"Annulus." Merriam-Webster.com, 2021 https://www.merriam-webster.com/dictionary/annulus (retrieved Jul. 21, 2021).
European Office Action; European Application No. 20189164.5-1101; dated Feb. 1, 2022; 8 pages.
European Office Action; European Application No. 20194124.2; dated Jan. 4, 2022; 6 pages.
U.S. Appl. No. 29/693,663, filed Jun. 4, 2019, U.S. Pat. No. D. 913413, Issued.
U.S. Appl. No. 29/764,043, filed Dec. 28, 2020, U.S. Pat. No. D. 928911, Issued.
Unger, HydroPower Ultra, HydroPower® Ultra Resin Pack. Retrieved online at: https://USA.ungerglobal.com/product/hydropower-ultra-resin-packs/. 9 pages, (2020).
European Office Action for Application No. 20189164.5, dated Aug. 24, 2023, 5 pages.

* cited by examiner

Test 1b

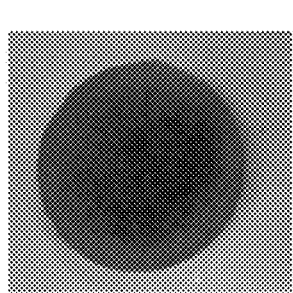
FIG. 23E
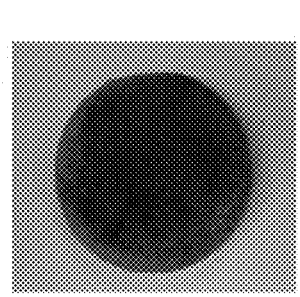
FIG. 23F
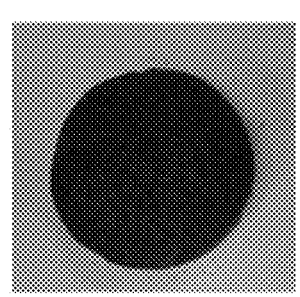
FIG. 23G
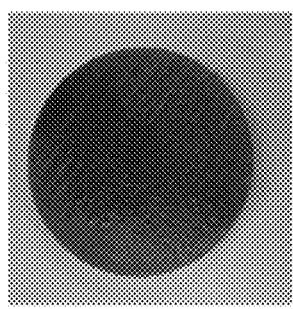
FIG. 23B
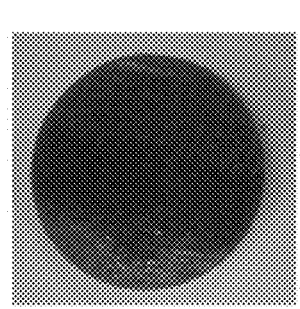
FIG. 23C
FIG. 23D
Test 3b
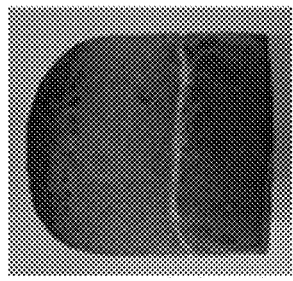
FIG. 23A Test 5b

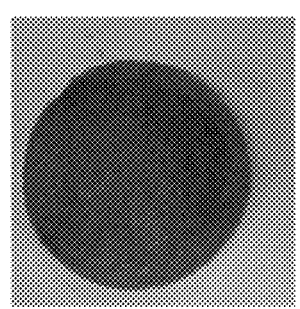
FIG. 25E
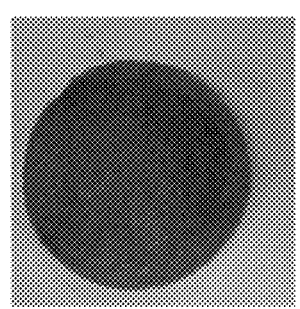
FIG. 25F
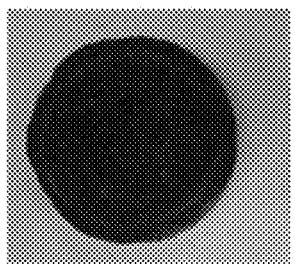
FIG. 25G
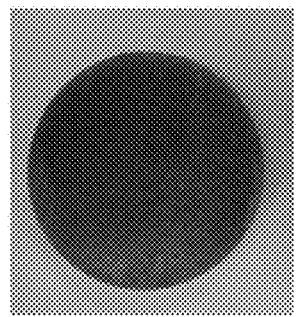
FIG. 25B
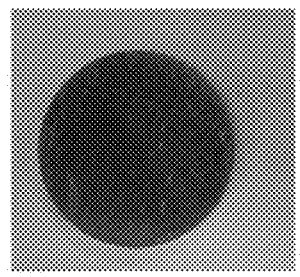
FIG. 25C
FIG. 25D
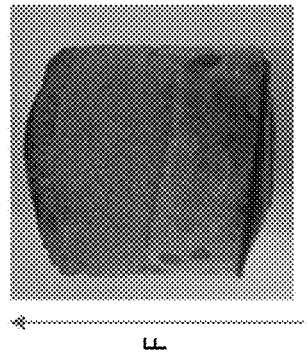
FIG. 25A
Test 6b

| | | Test 1 | Test 1a | Test 1b | Test 3 | Test 3b | Test 5b | Test 6b |
|---|---|---|---|---|---|---|---|---|
| | | Test 1 of Serial No. 14/684,071 | Retest of Test 1 using current resin | Retest of Test 1 using current resin | Test 3 of Serial No. 62/468,167 using current resin | Retest of Test 3 using current resin | Device 100 with module 1900 of FIG. 19 current resin | Device 100 with module 300 of FIG. 3 current resin |
| Water in (ppm) | Water out (ppm) | (liters) | (liters) | (liters) | (liters) | (liters) | (liters) | (liters) |
| 400 | 10 | 260 | 258 | 273 | 324 | 310 | 348 | 333 |
| 400 | 20 | 300 | 305 | 299 | 364 | 352 | 382 | 367 |
| | | Test 1 | Test 1a | Test 1b | Test 3 | Test 3b | Test 5b | Test 6b |
| | | Test 1 of Serial No. 14/684,071 | Retest of Test 1 using current resin | Retest of Test 1 using current resin | Test 3 of Serial No. 62/468,167 using current resin | Retest of Test 3 using current resin | Device 100 with module 1900 of FIG. 19 current resin | Device 100 with module 300 of FIG. 3 current resin |
| Water in (ppm) | Water out (ppm) | (grains) | (grains) | (grains) | (grains) | (grains) | (grains) | (grains) |
| 400 | 10 | Not available | 1652 | 1676 | 2033 | 1910 | 2174 | 2057 |
| 400 | 20 | Not available | 1883 | 1850 | 2272 | 2136 | 2369 | 2267 |

FIG. 26

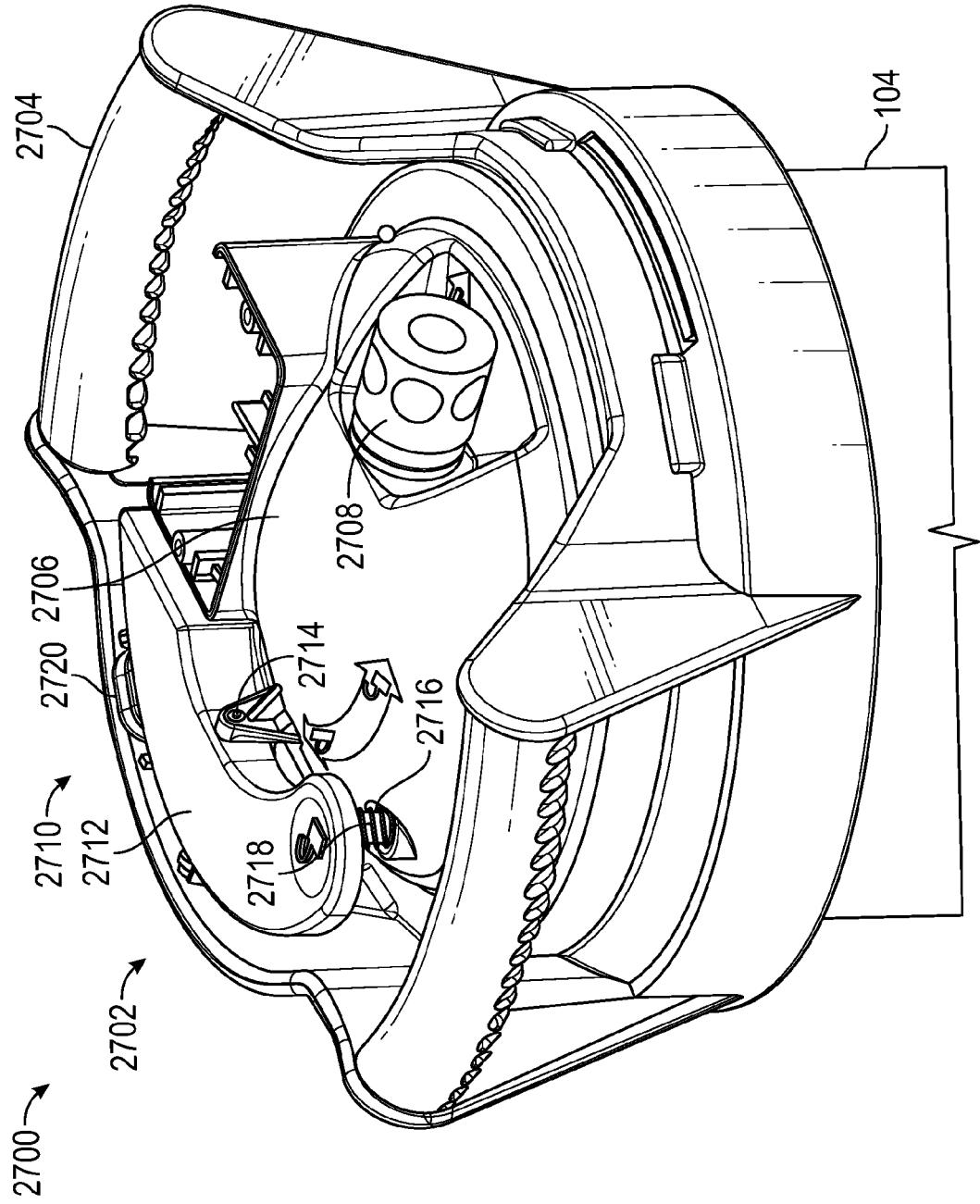

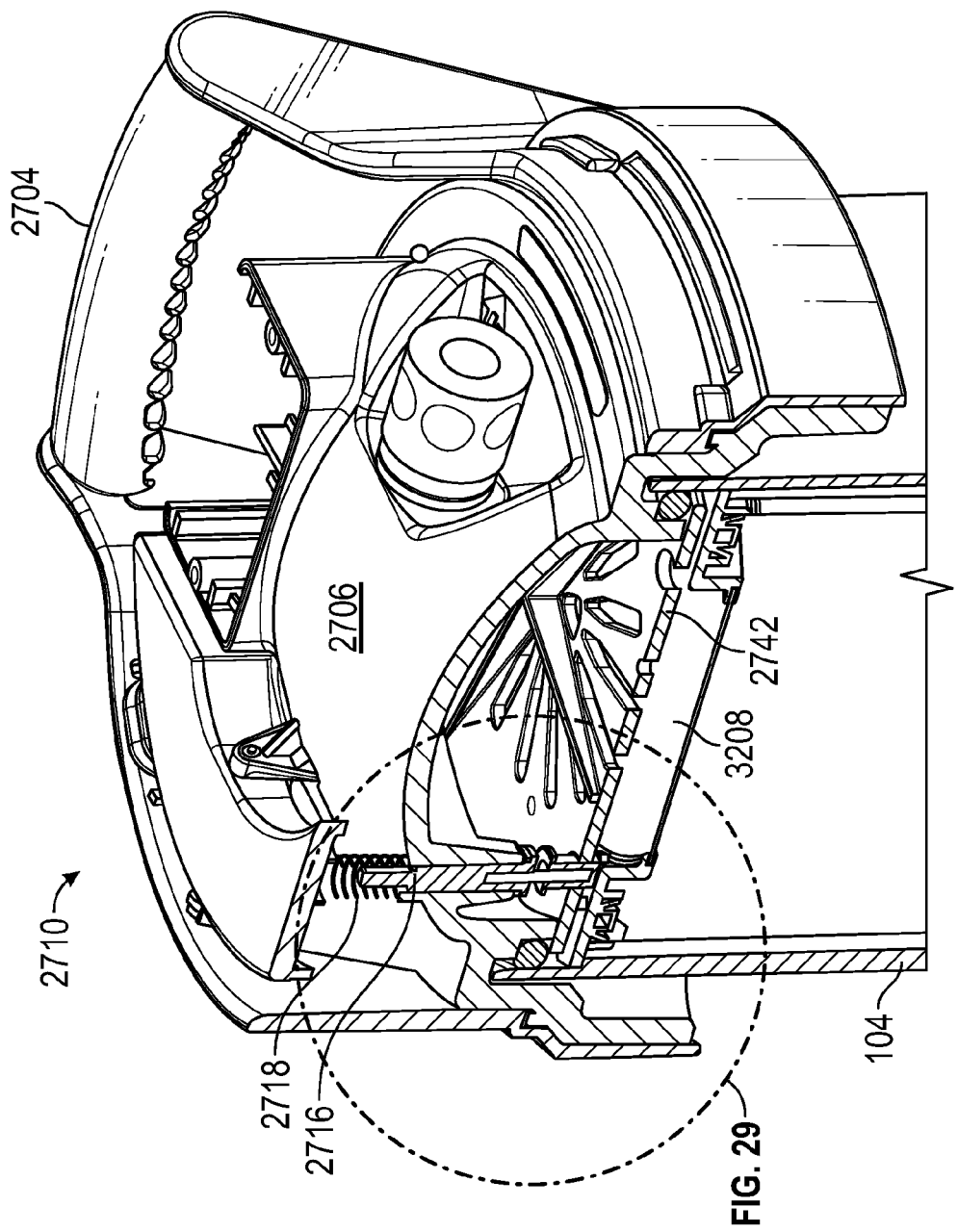

FLUID PURIFICATION DEVICE

CROSS-REFERENCE TO RELATED APPLICATIONS

The present application is a nonprovisional of, and claims the benefit to, U.S. Provisional Application Ser. No. 62/716,640 filed on Aug. 9, 2018, to U.S. Provisional Application Ser. No. 62/743,880 filed on Oct. 10, 2018, and to U.S. Provisional Application Ser. No. 62/802,990 filed on Feb. 8, 2019. The present Application is also a continuation-in-part application of U.S. patent application Ser. No. 14/684,071 filed on Apr. 10, 2015, which is a nonprovisional application of U.S. Provisional Application 61/977,778 filed on Apr. 10, 2014, and U.S. Provisional Application 62/065,803 filed on Oct. 20, 2014. The contents of all of which are incorporated by reference herein in their entirety.

BACKGROUND OF THE DISCLOSURE

The subject matter disclosed herein relates to a fluid purification device, and in particular to a fluid purification device having a replaceable media module.

It is desirable to use purified water (referred to herein as "pure water") in various cleaning applications. One common cleaning application for pure water is the cleaning of windows, cars, buildings, solar panels, and other surfaces. For example, the use of pure water in the form of deionized (DI) water, also known as demineralized (DM) water, has been found to be effective when cleaning smooth or reflective surfaces such as metal, glass, ceramics, tile, plastics, and others. The pure water can reduce the formation water marks and spots, which can be formed by impurities in untreated water that remain on the surface when the water dries.

Many pure water systems use one or more types of purification media alone or in combination with other devices/processes such as, but not limited to, particle filtration, distilling (i.e., distilled water), reverse osmosis, desalination, carbon filtration, microfiltration, ultrafiltration, ultraviolet oxidation, electrodialysis, nanofilteration, others, and any combinations thereof.

Some pure water systems improve the ease of replacing depleted or spent purification media by providing media purification devices that contain or house the purification media. Still further pure water systems condition the water by adding to or removing one or more components from the input water.

Accordingly, while existing water conditioning systems are suitable for their intended purposes the need for improvement remains, particularly in providing a fluid purification system having the features described herein.

BRIEF DESCRIPTION OF THE DISCLOSURE

According to one aspect of the disclosure a water purification system is provided. The system includes a tank having an interior space and a media container disposed within the interior space. A valve is provided that cooperates with an element within the interior, the valve being movable between an open and a closed position. The valve being biased to the open position when the element is not positioned within the interior space, wherein the interior space is fluidly coupled to the atmosphere in the open position. The valve further being configured to move to a closed position when the element is positioned within the interior space.

Additionally or alternatively, in this or other embodiments an element cooperates with the media container. Additionally or alternatively, in this or other embodiments the element is integral with the media container. Additionally or alternatively, in this or other embodiments the pressure relief valve comprises: a first valve member movingly coupled to a cover, the cover being removably coupled to the tank; a second valve member movingly coupled to the first valve member, the second valve member being disposed to engage at least a portion of the media container when the cover is coupled to the tank; and a biasing member disposed between the first valve member and the second valve member, the biasing member biasing the second valve member towards an unsealed position.

Additionally or alternatively, in this or other embodiments the pressure relief valve further comprises: a first seal member disposed to form a first seal between the first valve member and the cover when the valve is in the closed position; and a second seal member coupled to the second valve member and disposed to engage the first valve member to form a second seal when the valve is in the closed position. Additionally or alternatively, in this or other embodiments the second seal being disengaged from the first valve member when the media container is not installed. Additionally or alternatively, in this or other embodiments a lever operably coupled to the cover and movable between a first and second position, the lever being configured to engage the first valve member when in the second position.

Additionally or alternatively, in this or other embodiments the first seal opens in response to the lever moving to the second position to open a first fluid path from the tank to an environment. Additionally or alternatively, in this or other embodiments the first valve member and the cover define a first fluid path therebetween, and the first valve member and the second valve member define a second fluid path therebetween. Additionally or alternatively, in this or other embodiments the first seal closes the first gap, and the second seal closes the second gap. Additionally or alternatively, in this or other embodiments the valve is further movable to a venting position.

According to one aspect of the disclosure a fluid purification device is provided. The device includes a first member, the first member having a first open end. A first element is coupled to and disposed about the first open end. A porous second member is provided, the second member being operably coupled to the first element and enclosing the first open end.

Additionally or alternatively, in this or other embodiments the first ring element is integral with the first member. Additionally or alternatively, in this or other embodiments the first member is made from a flexible material. Additionally or alternatively, in this or other embodiments the first member is made from an elastic and flexible material. Additionally or alternatively, in this or other embodiments the first member is made from a substantially rigid material. Additionally or alternatively, in this or other embodiments.

According to one aspect of the disclosure a fluid purification device for use in a fluid purification system having a tank, a valve, and a lever arranged to engage the valve, the valve having an open position and a closed position. The device includes a first member configured to be disposed within the tank, having a purification media disposed therein. An activation element is sized to fit within the tank, the activation element being configured to engage the valve when the activation element is disposed in the tank.

Additionally or alternatively, in this or other embodiments the activation element is operably coupled to the first member. Additionally or alternatively, in this or other embodiments a porous second member, the second member being operably coupled to the activation element and enclosing the end of the first member. Additionally or alternatively, in this or other embodiments the activation element is integral with the first member.

Additionally or alternatively, in this or other embodiments the tank has a hollow interior extending from an open end, the hollow interior having a predetermined depth. Additionally or alternatively, in this or other embodiments the activation element includes activation surface, the activation surface being configured to be located 0-30% of the predetermined depth from the open end when the first member is inserted in the tank.

Additionally or alternatively, in this or other embodiments the tank includes a location surface, and the activation element includes an activation surface that is configured to be parallel with the location surface when the first member is inserted in the tank. Additionally or alternatively, in this or other embodiments the activation element includes an activation surface configured to engage the valve when the first member is inserted in the tank, the activation surface being positioned at least partially within an annular region, the annular region being between 65% to 85% of the tank diameter when the first member is inserted in the tank.

Additionally or alternatively, in this or other embodiments the activation element includes a rib extending from a side opposite the valve. Additionally or alternatively, in this or other embodiments the rib contacts the first member. Additionally or alternatively, in this or other embodiments the first member and activation element are sized to fit within a tube that is 220 mm long and has a 205 mm inner diameter, the activation element having an activation surface that is positioned 0 mm to 40 mm from an end of the tube when the first member and activation element are positioned within the cylinder.

According to one aspect of the disclosure a fluid purification device is provided. The device includes a first member, the first member having a first open end, the first member being made from an flexible material. A first assembly is coupled to and disposed about the first open end. A porous second member is provided that is operably coupled to the first ring assembly and enclosing the first open end.

Additionally or alternatively, in this or other embodiments a diffuser is coupled to the first member on an end opposite the first assembly.

Additionally or alternatively, in this or other embodiments the first member includes a second open end opposite the first open end.

Additionally or alternatively, in this or other embodiments a second assembly coupled to and disposed about the second open end and a porous third member, the third member being coupled to the second ring assembly and enclosing the second open end.

Additionally or alternatively, in this or other embodiments the first member and second member are made from the same material.

Additionally or alternatively, in this or other embodiments the first member is made from a porous material.

Additionally or alternatively, in this or other embodiments a purification media is disposed within the first member, the purification media may be compressed by at least one of the first member and the second member.

Additionally or alternatively, in this or other embodiments the first assembly has a circular shape.

Additionally or alternatively, in this or other embodiments the second porous member is integrally formed with the first assembly via molding.

Additionally or alternatively, in this or other embodiments the first ring assembly comprises: a first ring having a first wall and a first flange extending radially therefrom; a second ring disposed adjacent an outer surface of the first wall and the first flange; and a third ring having a second wall and a second flange extending radially therefrom, the third ring being disposed adjacent an inner surface of the first wall and the second ring; wherein a portion of the first member adjacent the first open end is disposed between the second ring and the third ring; wherein a portion of the second member is disposed between the first wall and the second wall.

Additionally or alternatively, in this or other embodiments the second member is formed from a mesh material.

Additionally or alternatively, in this or other embodiments the first assembly comprises: a first ring, the second member being integrally formed with the first ring; and a second ring, wherein a portion of the first member adjacent the first open end is disposed between the first ring and the second ring.

Additionally or alternatively, in this or other embodiments the first assembly is a rigid member.

According to another aspect of the disclosure a fluid purification system is provided. The system includes an inlet port and an outlet port. A purification device is fluidly coupled to the inlet port and the outlet port. The purification device comprises a first member, the first member having a first open end, the first member being made from an elastic material; a first assembly coupled to and disposed about the first open end; and a porous second member, the second member being operably coupled to the first assembly and enclosing the first open end.

Additionally or alternatively, in this or other embodiments the purification device further includes a diffuser coupled to the first member on an end opposite the first assembly.

Additionally or alternatively, in this or other embodiments the first member includes a second open end opposite the first open end.

Additionally or alternatively, in this or other embodiments the system further comprises a second assembly coupled to and disposed about the second open end, and a porous third member, the third member being coupled to the second assembly and enclosing the second open end.

Additionally or alternatively, in this or other embodiments the first member and second member are made from the same material.

Additionally or alternatively, in this or other embodiments the first member is made from a porous material.

Additionally or alternatively, in this or other embodiments the system further comprises a diffuser element fluidly connected to the purification device adjacent the inlet.

Additionally or alternatively, in this or other embodiments the diffuser element is coupled to the first element.

Additionally or alternatively, in this or other embodiments the diffuser is disposed opposite the first ring assembly.

Additionally or alternatively, in this or other embodiments the flow controller is coupled to the first member.

Additionally or alternatively, in this or other embodiments the first assembly has a circular shape.

Additionally or alternatively, in this or other embodiments the first ring assembly comprises: a first ring having a first wall and a first flange extending radially therefrom; a second ring disposed adjacent an outer surface of the first wall and the first flange; and a third ring having a second wall and a second flange extending radially therefrom, the third ring being disposed adjacent an inner surface of the first wall and the second ring; wherein a portion of the first member adjacent the first open end is disposed between the second ring and the third ring; wherein a portion of the second member is disposed between the first wall and the second wall.

Additionally or alternatively, in this or other embodiments the second member is formed from a mesh material.

Additionally or alternatively, in this or other embodiments the first assembly comprises: a first ring, the second member being integrally formed with the first ring; and a second ring, wherein a portion of the first member adjacent the first open end is disposed between the first ring and the second ring.

Additionally or alternatively, in this or other embodiments the first member is made from a porous material.

Additionally or alternatively, in this or other embodiments the outer diameter of the ring assembly is sized within −10% to 0% of an inner diameter of the hollow interior.

Additionally or alternatively, in this or other embodiments the outer diameter of the ring assembly is sized about within −4% of the inner diameter of the hollow interior.

Additionally or alternatively, in this or other embodiments the system further comprises a purification media disposed within the first member, the purification media being compressed by the tank and the second member.

Additionally or alternatively, in this or other embodiments the purification media has an initial volume and a depleted volume, the initial volume being at least 20% greater than the depleted volume, the purification media being compressed by at least one of the tank and the second member when at the depleted volume.

According to another aspect of the disclosure, another fluid purification system is provided. The system includes a tank having an open end, the tank sized to receive the replaceable media module. A cover is coupled to enclose the open end. A replaceable media module is disposed within the tank. A release assembly having a plunger is movable between a closed and an open position, the release assembly further having an actuator operably coupled to the plunger and the replaceable media module, wherein the actuator is configured to move the plunger to the closed position when the replaceable media module is disposed within the tank.

Additionally or alternatively, in this or other embodiments, the actuator is configured to move the plunger to the open position when the replaceable media module is not disposed within the tank. Additionally or alternatively, in this or other embodiments, the release assembly further includes a first biasing member coupled to the plunger on a first end and a second biasing member coupled between the actuator and a second end of the plunger.

Additionally or alternatively, in this or other embodiments, the release assembly further includes a lever pivotally coupled to the cover, the first biasing member being disposed between the lever and the plunger. Additionally or alternatively, in this or other embodiments, the replaceable media module includes a first ring assembly having a top surface. Additionally or alternatively, in this or other embodiments, the actuator is arranged to engage a top surface of the replaceable media module when the replaceable media module is disposed within the tank.

According to another aspect of the disclosure, another water purification system is provided. The system includes a tank having an interior space. A media container is disposed within the interior space. A cover is removably coupled to the tank. A pressure release valve is operably coupled to the cover, the pressure release valve being movable between an open and a closed position, the pressure relief valve being biased to the open position, wherein the interior space is fluidly coupled to the atmosphere in the open position. A first member is operably coupled to the pressured relief valve and positioned between at least a portion of the media container and the pressure relief valve, the first member moving the pressure release valve to the closed position when the cover is coupled to the tank.

Additionally or alternatively, in this or other embodiments, a release lever is coupled to the cover and operably coupled to the pressure relief valve, the release lever being movable between a first position and a second position, the release lever moving the pressure relief valve to the open position when in the second position. Additionally or alternatively, in this or other embodiments, the first member is coupled to the media container. Additionally or alternatively, in this or other embodiments, the first member is coupled to an end of the media container.

Additionally or alternatively, in this or other embodiments, the first member has a circular shape having a central opening. Additionally or alternatively, in this or other embodiments, the first member has at least one opening disposed on an outer periphery. Additionally or alternatively, in this or other embodiments, the at least one opening is sized to allow purification media to pass therethrough. Additionally or alternatively, in this or other embodiments, the first member has at least one opening extending therethrough.

Additionally or alternatively, in this or other embodiments, the at least one slot is sized to allow purification media to pass therethrough. Additionally or alternatively, in this or other embodiments, the first member includes a body portion and a plurality of flanges disposed radially outward from the body portion. Additionally or alternatively, in this or other embodiments, each of the plurality of flanges is pivotally coupled to the body portion. Additionally or alternatively, in this or other embodiments, the inner space includes a lip on an end adjacent the cover, the first member being sized to engage the lip about an outer diameter.

Additionally or alternatively, in this or other embodiments, the lip is on the end. Additionally or alternatively, in this or other embodiments, a second member is coupled to the media container on an end opposite the first member. Additionally or alternatively, in this or other embodiments, the second member includes a second body portion and a plurality of second flanges disposed radially outward from the second body portion, the plurality of second flanges being pivotally coupled to the second body portion; and the second body portion is coupled to the end and the plurality of second flanges are disposed between a side of the media container and an inner surface of the tank.

According to another aspect of the disclosure, another water purification system is provided. The system includes a tank having an interior space. A media container is disposed within the interior space. A valve is operably coupled to at least a portion of the media container, the valve being movable between an open and a closed position, the valve being biased to the open position, wherein the interior space is fluidly coupled to the atmosphere in the open position, the valve being configured to move to a closed position.

Additionally or alternatively, in this or other embodiments, the pressure relief valve includes a first valve member, a second valve member, and a biasing member. The first valve member is movingly coupled to a cover, the cover being removably coupled to the tank. The second valve member is movingly coupled to the first valve member, the second valve member being disposed to engage at least a portion of the media container when the cover is coupled to the tank. The biasing member is disposed between the first valve member and the second valve member, the biasing member biasing the second valve member towards an unsealed position.

Additionally or alternatively, in this or other embodiments, the pressure relief valve further includes a first seal member and a second seal member. The first seal member being disposed to form a first seal between the first valve member and the cover when the valve is in the closed position. The second seal member is coupled to the second valve member and disposed to engage the first valve member to form a second seal when the valve is in the closed position.

Additionally or alternatively, in this or other embodiments, the second seal is disengaged from the first valve member when the media container is not installed. Additionally or alternatively, in this or other embodiments a lever is operably coupled to the cover and movable between a first and second position, the lever being configured to engage the first valve member when in the second position. Additionally or alternatively, in this or other embodiments, the first seal opens in response to the lever moving to the second position to open a first fluid path from the tank to an environment.

Additionally or alternatively, in this or other embodiments, the first valve member and the cover define a first fluid path therebetween. The first valve member and the second valve member define a second fluid path therebetween.

Additionally or alternatively, in this or other embodiments, the first seal closes the first gap and the second seal closes the second gap. Additionally or alternatively, in this or other embodiments, the valve is further movable to a venting position.

According to another aspect of the disclosure, a fluid purification device is provided. The device includes a first member, a first ring element, and a porous second member. The first member having a first open end. The first ring element coupled to and disposed about the first open end. The porous second member being operably coupled to the first ring element and enclosing the first open end.

Additionally or alternatively, in this or other embodiments, the first ring element is integral with the first member. Additionally or alternatively, in this or other embodiments, the first member is made from a flexible material. Additionally or alternatively, in this or other embodiments, the first member is made from an elastic and flexible material. Additionally or alternatively, in this or other embodiments, the first member is made from a substantially rigid material.

According to another aspect of the disclosure, another fluid purification device is provided. The fluid purification device is for use in a fluid purification system having a tank, a valve, and a lever arranged to engage the valve, the valve having an open position and a closed position. The device includes a first member and an activation element. The first member is configured to be disposed within the tank, having a purification media disposed therein. The activation element is operably coupled to an end of the first member, the activation element being configured to engage the valve when the first member is disposed in the tank.

Additionally or alternatively, in this or other embodiments, a porous second member is provided. The second member being operably coupled to the activation element and enclosing the end of the first member. Additionally or alternatively, in this or other embodiments, the activation element is integral with the first member. Additionally or alternatively, in this or other embodiments, the first member is made from a flexible material.

Additionally or alternatively, in this or other embodiments, the first member is made from an elastic and flexible material. Additionally or alternatively, in this or other embodiments, the first member is made from a substantially rigid material. Additionally or alternatively, in this or other embodiments, the tank includes a location surface and the activation element is configured to at least partially contact the location surface when inserted into the tank. The activation element includes an activation surface, the activation surface being configured positioned about 0-10 mm from the location surface when the first member is inserted in the tank.

Additionally or alternatively, in this or other embodiments, the tank has a hollow interior extending from an open end, the hollow interior having a predetermined depth. The activation element includes activation surface, the activation surface being configured to be located 0-30% of the predetermined depth from the open end when the first member is inserted in the tank. Additionally or alternatively, in this or other embodiments, the activation surface is configured to be parallel with the open end when the first member is inserted in the tank.

Additionally or alternatively, in this or other embodiments, the activation surface is configured to be 180 to 300 mm from a location surface within the hollow interior when the first member is inserted in the tank. Additionally or alternatively, in this or other embodiments, the first member includes an end and the activation element includes activation surface, the activation surface being located within 50 mm from the end of the first member.

Additionally or alternatively, in this or other embodiments, the tank includes a location surface and the activation element includes an activation surface that is configured to be parallel with the location surface when the first member is inserted in the tank. Additionally or alternatively, in this or other embodiments, the tank has a hollow interior extending from an open end, the hollow interior having a diameter.

Additionally or alternatively, in this or other embodiments, the activation element includes an activation surface configured to engage the valve when the first member is inserted in the tank, the activation surface being positioned at least partially within an annular region, the annular region being between 65% to 85% of the tank diameter when the first member is inserted in the tank. Additionally or alternatively, in this or other embodiments, the annular region has an inner diameter of about 140 mm and an outer diameter of about 160 mm. Additionally or alternatively, in this or other embodiments, the activation surface has an area of at least 5 mm2.

Additionally or alternatively, in this or other embodiments, the activation element includes a rib extending from a side opposite the valve. Additionally or alternatively, in this or other embodiments, the rib contacts the first member. Additionally or alternatively, in this or other embodiments, the rib is curved and has an outer diameter of up to 140 mm.

Additionally or alternatively, in this or other embodiments, the first member and activation element are sized to fit within a tube that is 220 mm long and has a 205 mm inner diameter, the activation element having an activation surface that is positioned 0 mm to 40 mm from an end of the tube when the first member and activation element are positioned within the cylinder.

According to another aspect of the disclosure, a fluid purification device for use in a fluid purification system is provided. The fluid purification system having a valve and a lever arranged to engage the valve, the valve having an open position, and a closed position, the system having a tank being sized to receive a purification member that contains water purification media, the tank further having a hollow interior extending from an open end, the hollow interior have a location surface disposed therein. The device comprises an activation element configured to be positioned relative to the location surface and is configured to be disposed at least partially adjacent an end of the purification member when the purification member is inserted in the tank, the activation element being arranged to actuate the valve when the purification member is disposed in the tank.

Additionally or alternatively, in this or other embodiments, the activation element is configured to be at least partially in contact with the location surface when the purification member is inserted in the tank, and includes an activation surface, the activation surface being positioned about 0-10 mm from the location surface when the purification member is inserted in the tank.

Additionally or alternatively, in this or other embodiments, the hollow interior has a predetermined depth, and the activation element includes activation surface, the activation surface being configured to be located 0-30% of the predetermined depth from the open end when the purification member is inserted in the tank. Additionally or alternatively, in this or other embodiments, the activation surface is parallel to the open end when the purification member is inserted in the tank. Additionally or alternatively, in this or other embodiments, the activation surface is configured to be 180-300 mm from a location surface within the hollow interior when the purification member is inserted in the tank.

Additionally or alternatively, in this or other embodiments, the purification member includes an end and the activation element includes activation surface, the activation surface being located less than or equal to 50 mm from the end of the purification member. Additionally or alternatively, in this or other embodiments, the tank includes a location surface and the activation element includes an activation surface that is configured to be parallel to the location surface when the purification member is inserted in the tank. Additionally or alternatively, in this or other embodiments, the hollow interior has a diameter.

Additionally or alternatively, in this or other embodiments, the activation element includes an activation surface configured to engage the valve when the purification member is inserted in the tank, the activation surface being positioned at least partially within an annular region, the annular region being between 65% to 85% of the tank diameter. Additionally or alternatively, in this or other embodiments, the annular region has an inner diameter of about 140 mm and an outer diameter of about 160 mm. Additionally or alternatively, in this or other embodiments, the activation surface has an area of at least 5 mm2.

Additionally or alternatively, in this or other embodiments, the activation element includes a rib extending from a side opposite the valve. Additionally or alternatively, in this or other embodiments, the rib contacts the purification member. Additionally or alternatively, in this or other embodiments, the rib is curved and has an outer diameter of up to 140 mm. Additionally or alternatively, in this or other embodiments, the purification member and activation element are sized to fit within a tube that is 220 mm long and has a 205 mm inner diameter, the activation element having an activation surface that is positioned between 0 mm to 40 mm from an end of the tube when the purification member and activation element are positioned within the cylinder.

Additionally or alternatively, in this or other embodiments, the location surface is lip formed in the inner wall of the tank. Additionally or alternatively, in this or other embodiments, the location surface is a top surface of a diffuser disposed in the hollow interior of the tank. Additionally or alternatively, in this or other embodiments, the location surface is bottom surface of the hollow interior of the tank.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 23A-23G are images of a resin usage test using a water purification device described in U.S. Patent Application Ser. No. 62/468,167;

FIG. 25A-25G are images of a resin usage test using the replaceable media module of FIG. 3;

FIG. 26 is a data table of the results of the resin usage tests;

FIG. 27 is a partial perspective view of a fluid purification device according to an embodiment;

FIG. 28 is a partial perspective sectional view of the fluid purification device of FIG. 27;

The detailed description explains embodiments of the disclosure, together with advantages and features, by way of example with reference to the drawings.

DETAILED DESCRIPTION OF THE DISCLOSURE

Embodiments of the present disclosure are directed to a fluid purification system such as that used to condition or generate pure water. Embodiments provide technical effect in having a replaceable media module that has substantially uniform fluid flow therethrough. Further, embodiments provide a technical effect in having a replaceable media module substantially fills a reservoir area of the fluid purification system. Further, embodiments provide a technical effect of actuating a valve to close the system when an activation element is arranged within the tank. Further, embodiments provide a technical effect where the activation element is part of a replaceable media module.

Figure 1:
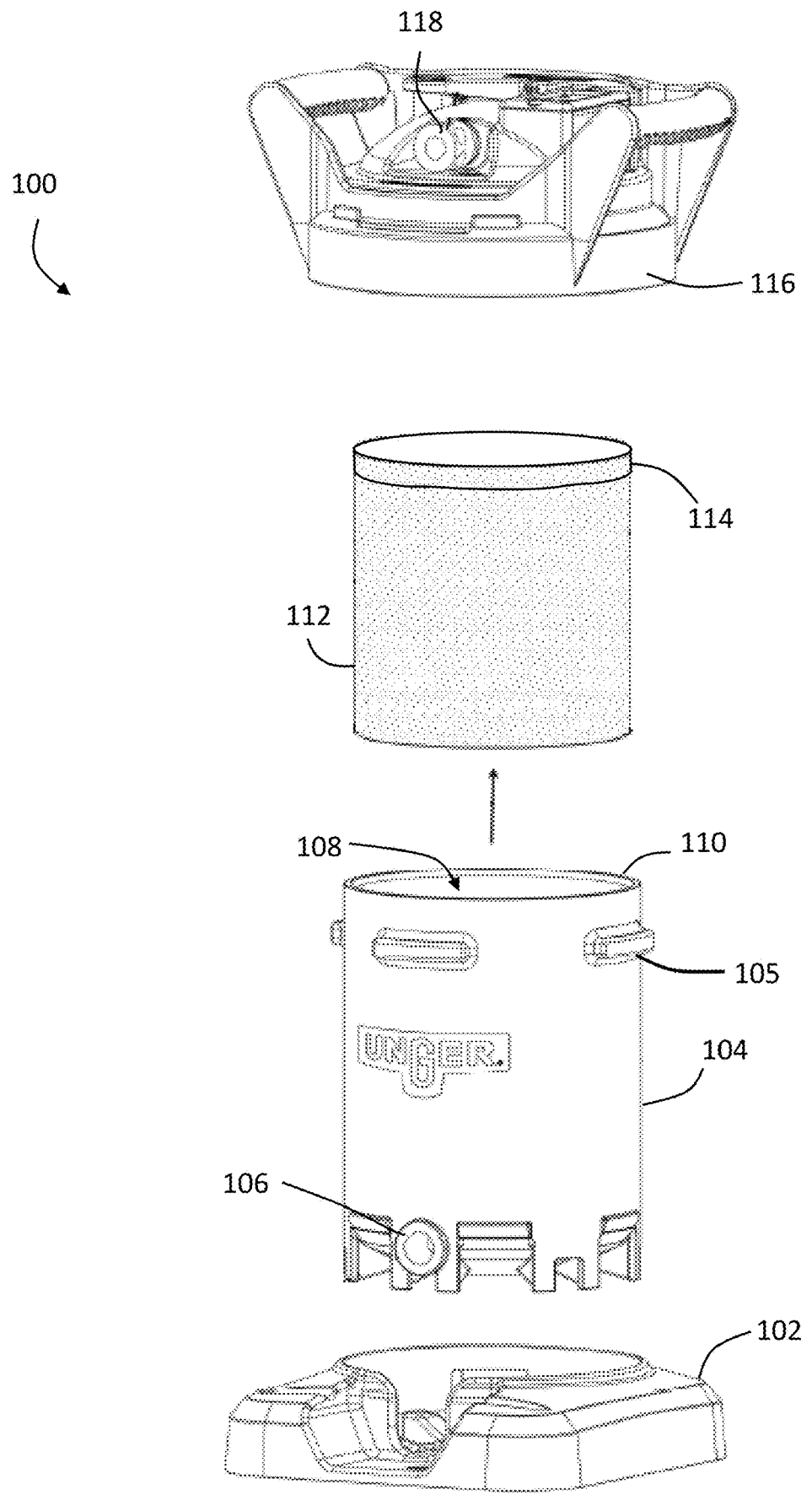
FIG. 1 is a perspective unassembled view of a fluid purification device according to an embodiment.

Referring now to FIG. 1, an embodiment is shown of a fluid purification system 100. It should be appreciated that while the illustrated embodiment may refer to the fluid purification system 100 as generating pure water for use in cleaning applications, this is for exemplary purposes and the claims should not be so limited in other embodiments, the fluid purification system 100 may be used in other applications, such as for conditioning water or in providing a purified fluid to a heating system for example. The system 100 includes a base 102 that holds and supports a tank 104. The tank 104 includes an inlet port 106 and a hollow interior 108. The tank 104 includes an open end 110.

The hollow interior 108 includes an inner surface having a diameter sized to receive a replaceable media module 112. As will be described in more detail herein, the module 112 includes at least one frame or ring assembly 114 having an outer diameter that is a close fit with the inner surface of the hollow interior 108. A cover 116 having an outlet port 118 is removably coupled to the tank 104 and encloses the open end 110. The module 112 includes a purification media 200 (FIG. 2) that is under compression when the module 112 is inserted into the hollow interior 108. It should be appreciated that while embodiments herein describe the assembly 114 as being circular, this is for exemplary purposes and the claims should not be so limited. In one or more embodiments described herein, the assembly 114 may be any suitable shape, such as but not limited to square, rectangular, oval, or a polygon for example.

It should be appreciated that while embodiments herein may describe the port 106 as being an "inlet" and the port 118 as being the "outlet," this is for example purposes and the claims should not be so limited. In other embodiments, the flow of fluid may be reversed, with the port 118 being the "inlet" and the port 106 being the "outlet."

In an embodiment, the module 112 includes an initial volume of purification media 200. As the system 100 is operated, such as to generate pure water for example, the water will pass through the media 200 to become purified. As used herein, the terms "pure", "purified", and "purification" includes the removal of one or more components and/or the addition of one or more components from water or any other fluid. The components removed or added can include soluble and/or insoluble materials such as, but not limited to minerals, salts, suspended particles, bacteria, and others, where the soluble components are often referred to as total dissolved solids or TDS.

In some embodiments, during operation, the purification of the fluid will cause the media 200 to gradually deplete. As the media 200 depletes, it also reduces in volume. As used herein, the term "depleted volume" means an operating condition where the output water (e.g. at the outlet port 118) has a TDS level that is substantially the same as the input water. It has been found that the depleted volume is about 10-20% less than the initial volume. Therefore, in the illustrated embodiment, the initial volume of media 200 is selected to allow a 20% reduction in volume and still be under compression when at the depleted volume.

Figure 2:
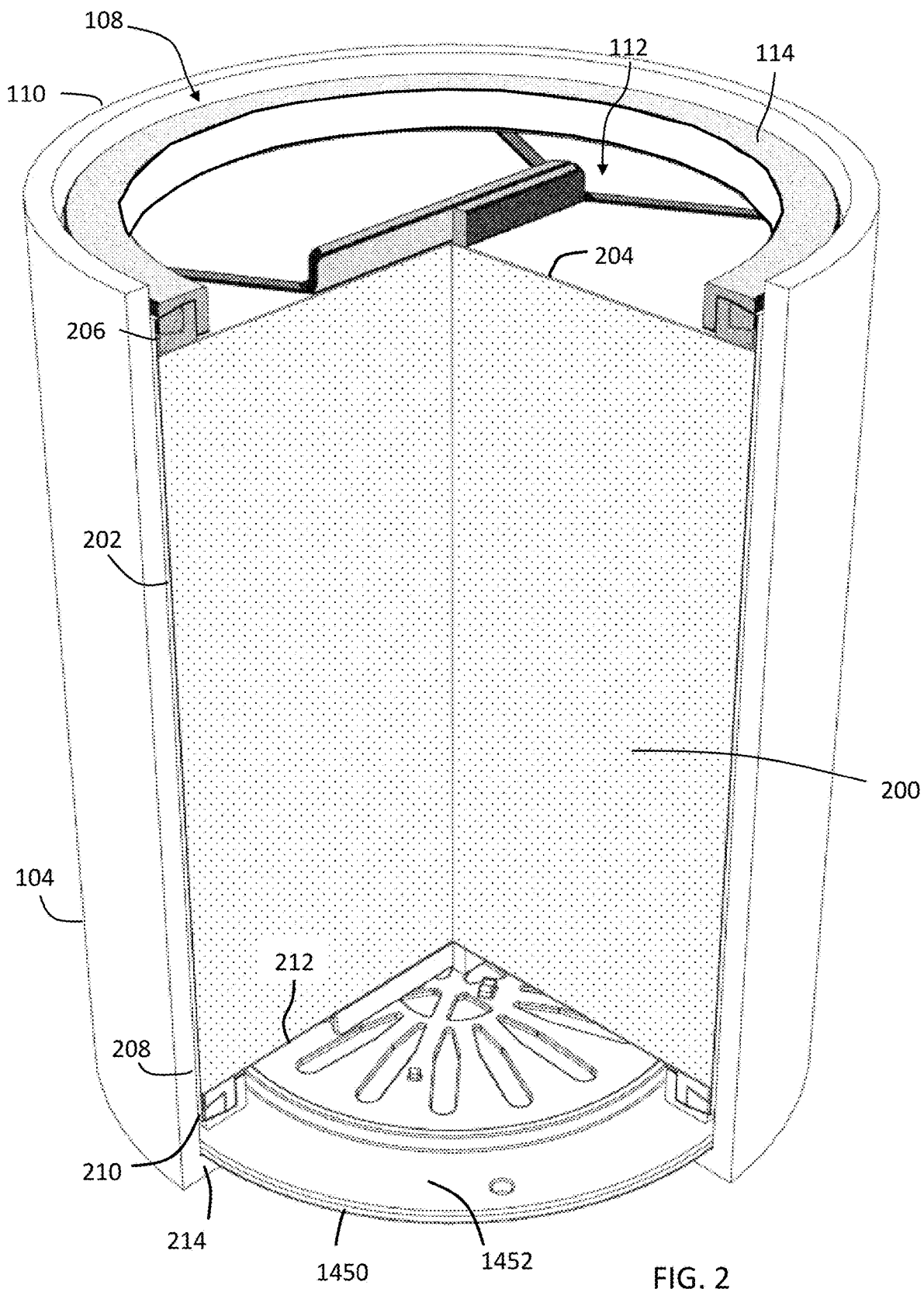
FIG. 2 is perspective view, partially in section, of tank housing portion of the fluid purification device of FIG. 1.

Referring now to FIG. 2, the tank 104 and module 112 assembly is shown. In this embodiment, the module 112 includes a first member 202. In an embodiment, the member 202 is made from a thin porous, flexible, and/or elastic material. In an embodiment, the material of member 202 may be rigid and nonporous. In an embodiment, the material of member 202 may be flexible and nonporous. In an embodiment, at least one of the material is both porous and elastic. In other embodiments, at least one of the material is both porous and flexible. In some such embodiments, first member 202 may be formed from a material that has 5%-25% elastane and 75%-95% Nylon, preferably a material formed from between 10%-20 elastane and between 80%-90% Nylon, or with 15% elastane and 85% Nylon being desired, and any subranges therebetween. In one embodiment, the flexible bag may be 100% nylon or polyamide (PA).

Figure 32:
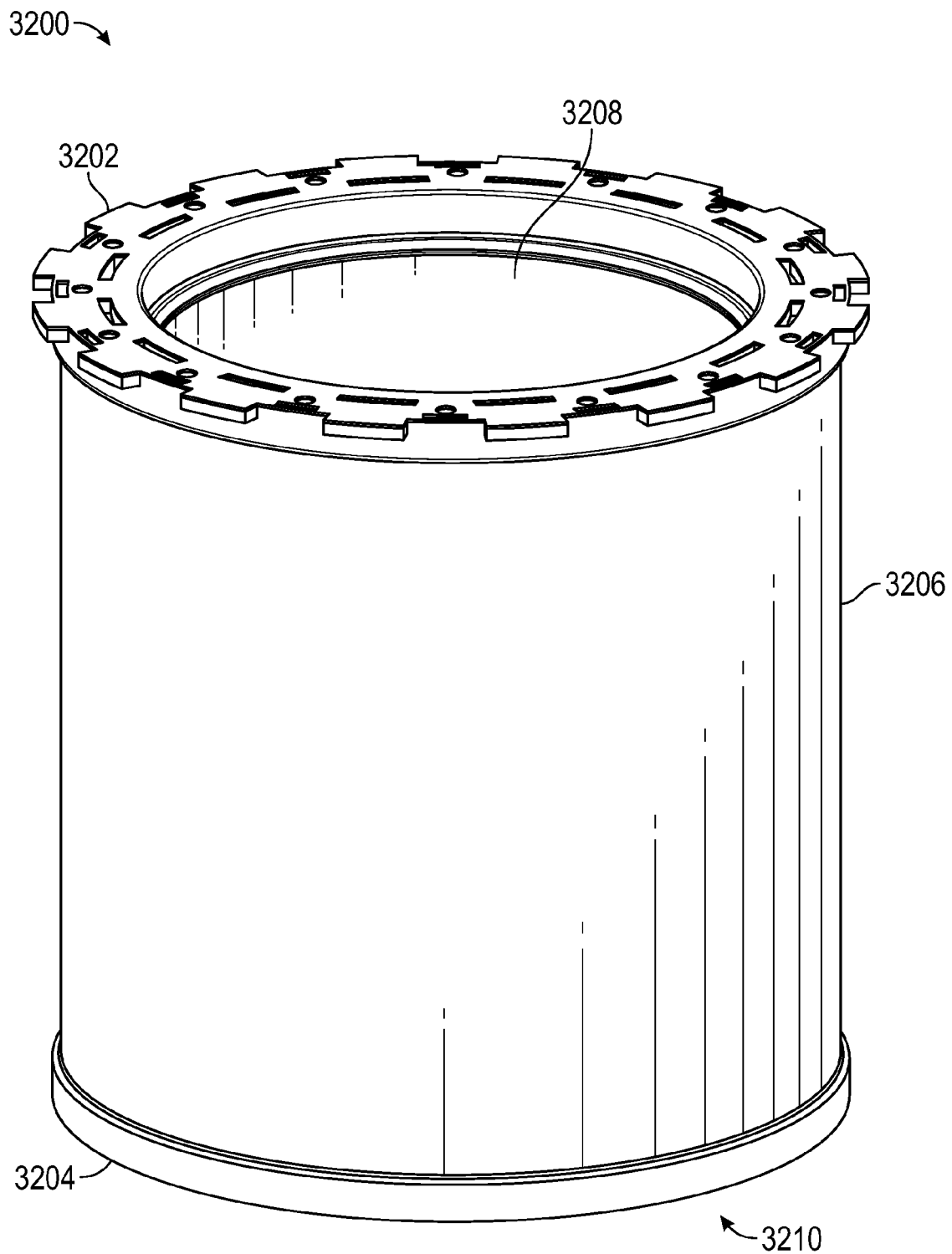
FIG. 32 is a perspective view of a replaceable media module according to an embodiment.
Figure 33:
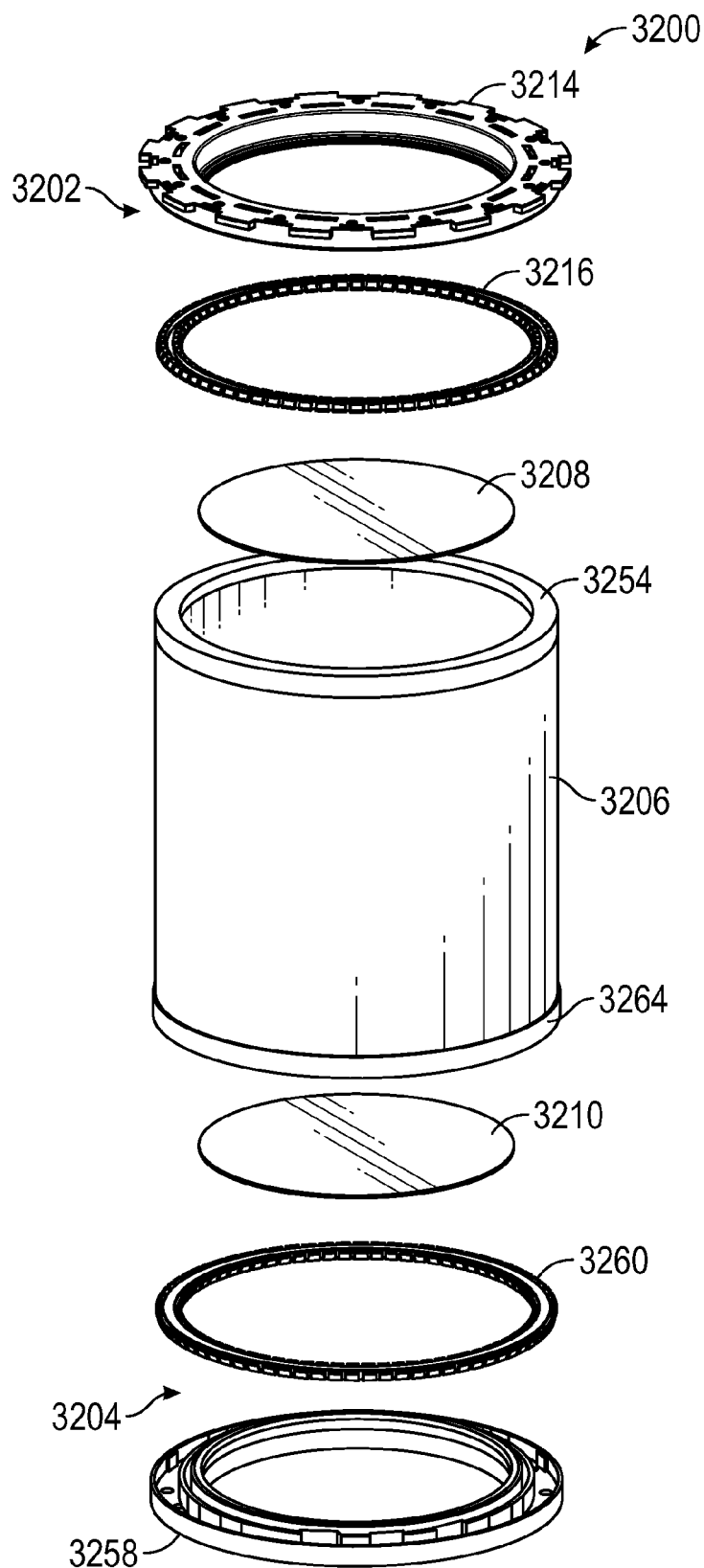
FIG. 33 is an unassembled view of the replaceable media module of FIG. 32.

In the illustrated embodiment, the first member 202 is tubular in shape when inserted into the tank 104. It should be appreciated that due to the elastic properties of the first member 202, the module 112 may have a bulbous shape (shown in FIG. 3) when placed on a surface outside of the tank 104. In other embodiments such as the module 3200 (FIG. 32), where the first member 202 has a flexible (but relative low elasticity), the module 112 may have relatively straight sides (e.g. non-bulbous) when placed on a surface outside of the tank 104. In the unassembled state, the first member 202 has pair of opposing open ends. The first member 202 is coupled on a first open end 206 to a first ring assembly 114. In an embodiment, the first ring assembly 114 is a substantially rigid body having an outer diameter that is a close fit with the inner surface of the hollow interior 108. In some embodiments where module 112 is configured for use with the tank 104, which has an internal diameter of 200 mm, the first ring assembly 114 can have an outer diameter of between 160 mm and 240 mm, or between about 180 mm to 200 mm, with 192.5 mm being desired, and any subranges therebetween. In this manner, first ring assembly has outer diameter that is within ±20%, or within −10% to 0%, with about −4% of the inner diameter of the hollow interior 108 being desired, and any subranges therebetween. In embodiments where first ring assembly has an outer diameter that is larger than the inner diameter of hollow interior 108, the first ring assembly can have one or more resiliently flexible outer regions that are deformed when installed in the system.

Figure 13:
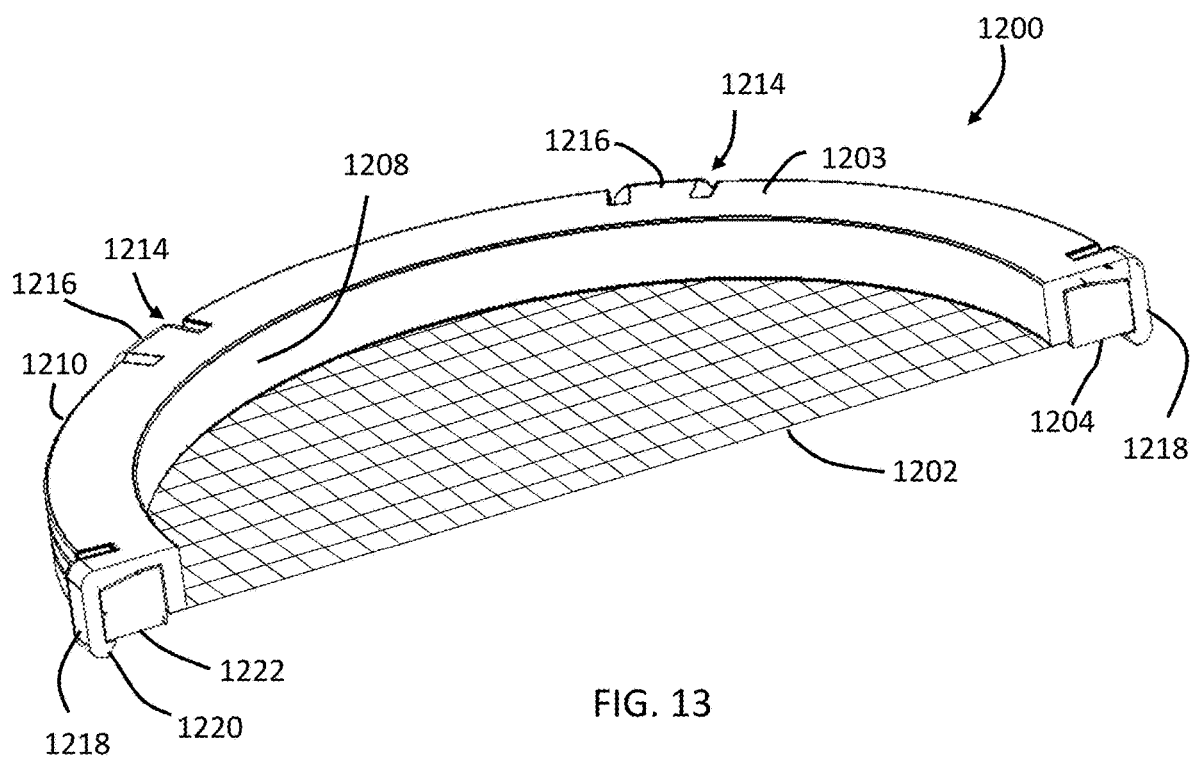
FIG. 13 is a top perspective sectional view of a ring assembly having an integrally formed mesh end member.

Also coupled to the first ring assembly 114 is a second member 204. The second member 204 extends across the inner diameter of the first ring assembly 114 to enclose the open end of the first member 202. As will be discussed in more detail, in some embodiments the second member 204 may be coupled to the first ring assembly 114 prior to the first member 202. In the illustrated embodiment, the second member 204 is made from a thin porous, flexible, and/or elastic material. In another embodiment, the material of second member 204 may be rigid and porous. In an embodiment, the material is both porous and elastic. In an embodiment, the material is both porous and flexible. In some such embodiments, first member 204 may be formed from a material that has 5%-25% elastane and 75%-95% Nylon, preferably a material formed from between 10%-20 elastane and between 80%-90% Nylon, or with 15% elastane and 85% Nylon being desired, and any subranges therebetween. In the illustrated embodiment, the first member 202 and the second member 204 are made from the same material. In another embodiment, the second member 204 may be made from a mesh material (FIG. 13). In an embodiment, the mesh material is sized to substantially prevent purification media from flowing therethrough. In an embodiment, the second member 204 has an opening or pore size of between 10-400 microns (US Standard Mesh No. 850-US Standard Mesh 45). In another embodiment, the second member 204 has an opening or pore size between 50-300 microns (US Standard Mesh No. 270-US Standard Mesh 50). In an embodiment, the mesh material may be made from any suitable porous, relatively stiff/nonflexible material, such as but not limited to fabrics, plastics (e.g. polypropylene, nylon, etc.) or metal for example.

In an embodiment, the second member 204 provides for a more uniform fluid flow relative to the prior art, which improves utilization of the purification media.

The second end 208 of the first member 202 is coupled to a second ring assembly 210. In the illustrated embodiment, the second ring assembly 210 is the same as the first ring assembly 114. In an embodiment, the second ring assembly 210 has the same construction as the first ring assembly 114, but is rotated 180° relative to the first ring assembly 114. A third member 212 is coupled to the second ring assembly 210 and extends across the inner diameter of the second ring assembly 210 to enclose the second end 208. It should be appreciated that the first member 202, the second member 204 and the third member 212 cooperate to contain the media 200. In an embodiment, the tank 104 may include a lip 214 that the second ring assembly 210 engages when the module 112 is inserted into the hollow interior 108. In an embodiment, the third member 212 is spaced apart from the bottom of the tank 104 such that water entering through the inlet port 106 engages the entire surface of the third member 212. It should be appreciated that since the ring assemblies 114, 210 closely fit with the inner diameter of the hollow interior 108, the module 112 substantially fills the hollow interior and there are no or little gaps in the corners.

Referring now to FIGS. 3-10, an embodiment of a replaceable media module 300 is shown for use with the system 100. It should be appreciated that the module 300 illustrated in FIGS. 3-7 is outside of the tank 104. Due to the elasticity of the first member 302 and the weight of the media 304, the first member 303 will sag or form a bulbous shape as shown. It should be appreciated that when placed in the hollow interior 108, the module 300 forms a substantially cylindrical shape that conforms to the interior surface of the tank 104.

The module 300 includes a first ring assembly 303 coupled to the first end 304 of the first member 302. The module 300 further includes a second ring assembly 306 that is coupled to a second end 308 of the first member 302. A second member 310 is coupled to the first ring assembly 303 to enclose the first end 304. A third member 312 is coupled to the second ring assembly 306 to enclose the second end 308. In the illustrated embodiment, the first member 302, second member 310, and third member 312 are made from a porous, flexible, and/or elastic material, such as that described in reference to module 112. In an embodiment, the material of member 302 may be rigid and nonporous. In an embodiment, the material of member 302 may be flexible and nonporous. In an embodiment, the material of second member 310 may be rigid and porous.

Referring now to FIGS. 7-10, an embodiment is shown of the first ring assembly 303. In an embodiment, the second ring assembly 306 is the same as first ring assembly 303, but rotated 180°. In an embodiment, the first ring assembly 303 includes a first ring 800 having an inner wall 802 and a flange 804. The inner wall 802 includes an inner surface 803. In an embodiment, the flange 804 has a conical surface 806 and an opposing bottom surface 808. In an embodiment, the conical surface tapers from the outer diameter is a direction towards the bottom surface 808. In an embodiment, the first ring 800 further includes a handle portion 826. In an embodiment, the handle 826 is connected to the inner wall 802 by a first pair of beams 828, 830 and a second pair of beams 832, 834. It should be appreciated that in other embodiments, the handle 826 may have other shapes and may be attached directly to the inner wall 802 or other surfaces on the ring 800. In an embodiment, the handle 826 could be a wire coupled to the ring 800 or any other member coupled to the ring that the user can grasp. In still another embodiment, the inner surface of the second ring 818 may include an undercut or a recess that allows the operator to grasp the ring assembly 303 with their fingers.

The first ring assembly 303 further includes a second ring 810 having a pair of conical surfaces 812, 814. The conical surface 812 is shaped to substantially match the taper of the surface 806 of the first ring 800 such that it tapers from the outer diameter towards the bottom surface 808. In the illustrated embodiment, the other conical surface 814 tapers from the outer diameter in a direction away from the bottom surface 808. The first ring assembly further includes a third ring 816 having an inner wall 818 with an outer surface 820 and a flange 822. The flange 822 includes a conical surface 824 that is shaped to substantially match the conical surface 814 of second ring 818.

To couple the first member 302 and the second member 310 to the first ring assembly 303, the second member 310 is first placed around the first ring 800 such that the second member 310 is routed over the surface 806 and against the surface 819 of the first ring 800. The second ring 810 is then inserted over the first ring 800 to capture the second member 810 between the surfaces 806, 812 and between surface 819 and surface 821 of the second ring 810.

Next, the end portion of the first member 302 is placed around the outer diameter of the first ring 800 and the second ring 810. The edge of the first member is then placed radially inward and the third ring 816 is slid over the first ring 800 and second ring 810 to capture the end portion of the first member 302 between the outer surface 820 and the inner surface 803 and between the surfaces 814, 824. In the illustrated embodiment, the outer surface 820 and the inner surface 803 are sized such that the pressing of the third ring 816 onto the first ring 800, with the first member 302 and second member 310 in place, causes a friction fit that holds the first ring assembly together.

It should be appreciated that the second ring assembly 306 is assembled to the first member 302 and third member 312 in the same manner. In an embodiment, the second ring assembly 306 may not include the handle 826.

In an embodiment, features may be molded into the surfaces (e.g. bumps or ridges) of the rings to increase the surface roughness of the surface to more firmly couple the first member 302 and second member 310 to the ring assembly. Further, in other embodiments, other methods or means of coupling the first member and/or second member to the ring assembly may used. For example, the first member and/or second member may be routed along a different path between the ring assembly components. In still other embodiments, the first member and/or the second member may be coupled using bonding, an adhesive, or by ultrasonic welding for example.

It should further being appreciated that in other embodiments, different methods of attaching the first member 302 and the second member 310 to the first ring assembly 303. Therefore, the illustrated embodiment should not be limiting on the claims. In other non-limiting embodiments, the first member 302 and/or the second member 310 may be coupled to the first ring assembly 303 by mechanical fasteners, ultrasonic welding, bonding with an adhesive, or a combination thereof. In still other embodiments, one or both of the first member 302 and/or the second member 310 may be coupled to the first ring assembly 303 by molding the respective members to the ring components during fabrication. In an embodiment, the second member 310 may be configured as a mesh that is molded integrally with the ring assembly.

Figure 11:
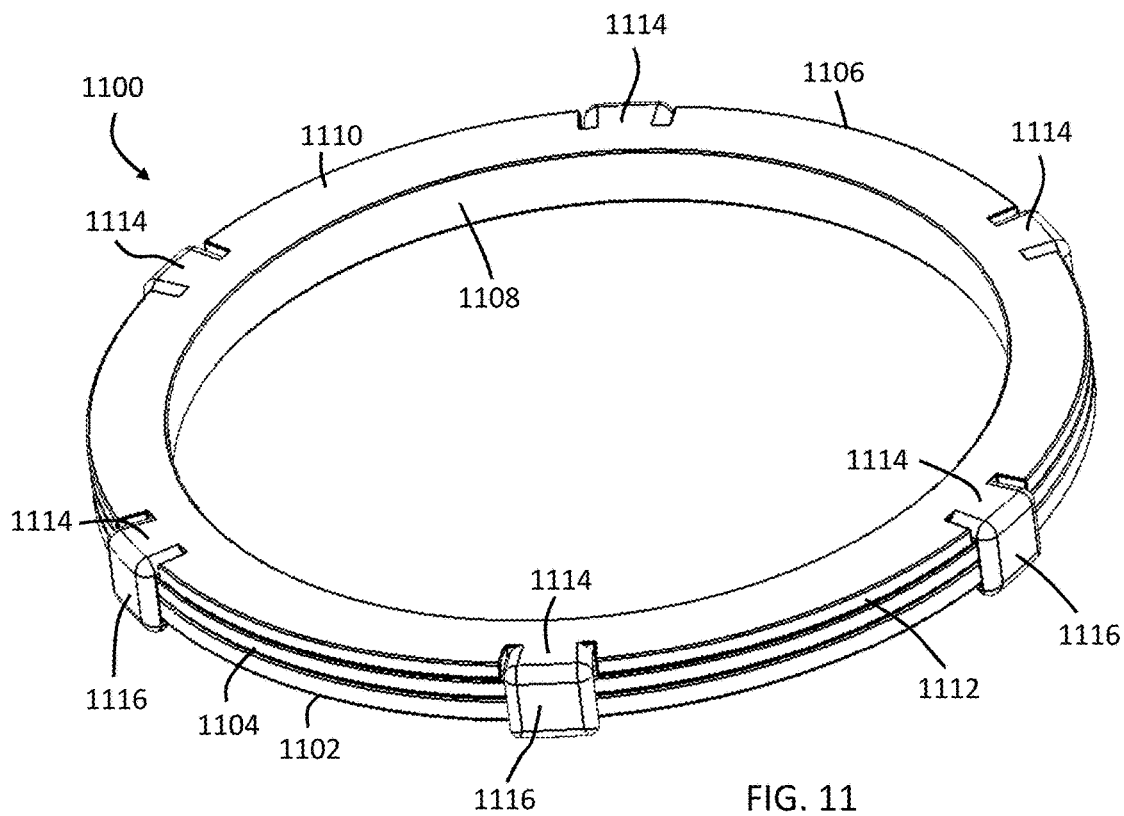
FIG. 11 is a top perspective view of a ring assembly for use with the replaceable media module of FIG. 2 or FIG. 3 in accordance with another embodiment.
Figure 12:
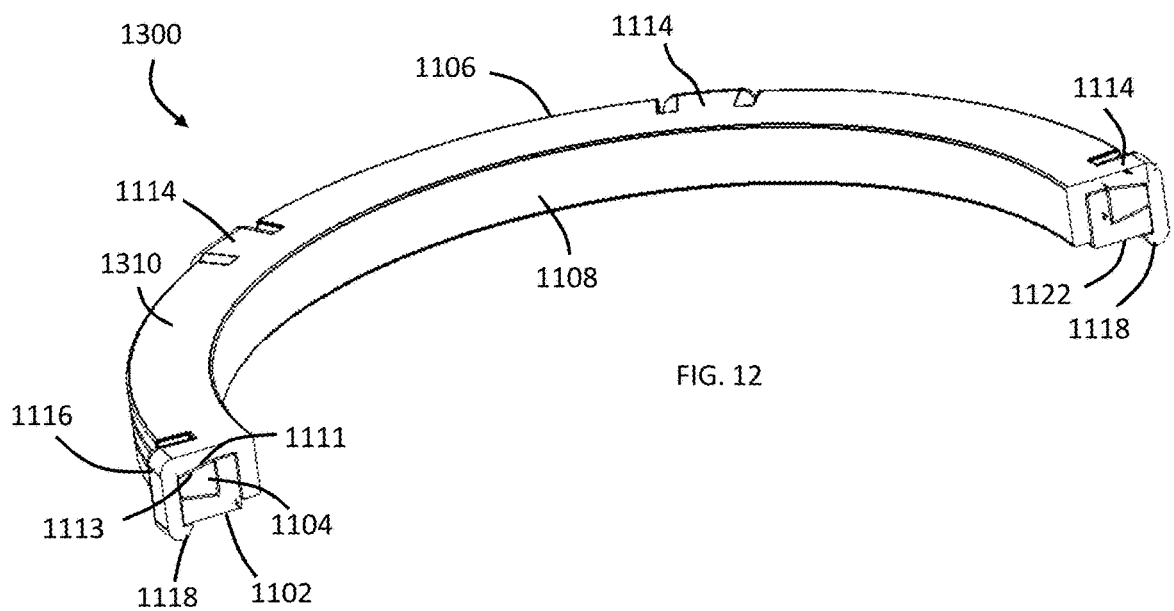
FIG. 12 is a perspective sectional view of the ring assembly of FIG. 11.

Referring now to FIGS. 11-12, another embodiment is shown of a ring assembly 1100. In this embodiment, the ring assembly includes a first ring 1102 and a second ring 1104. In an embodiment, the rings 1102, 1104 are the same as rings 800, 810 respectively. The ring assembly 1100 includes a third ring 1106. In this embodiment, the third ring 1106 includes an inner wall 1108 having a flange 1110 extending therefrom in a similar manner to third ring 816. The flange 1110 also includes a conical surface 1111 that is tapered to match the corresponding conical surface 1113 of second ring 1104. The flange 1110 further includes a plurality of slots, each having a tab 1114. Extending axially from the end of each tab 1114 is an arm 1116. The arm 1116 has an inner surface that is positioned at a radius that is the same as or slightly smaller than the outer diameter of the first ring and the second ring 1104. On the end of each arm 1118 is a lip 1120. The length of the arms 1118 is sufficient to allow the lip 1120 to engage the surface 1122 of the first ring 1102. It should be appreciated that the arms 1118 provide a snap-fit that couples the rings 1102, 1104, 1106 together.

Figure 9:
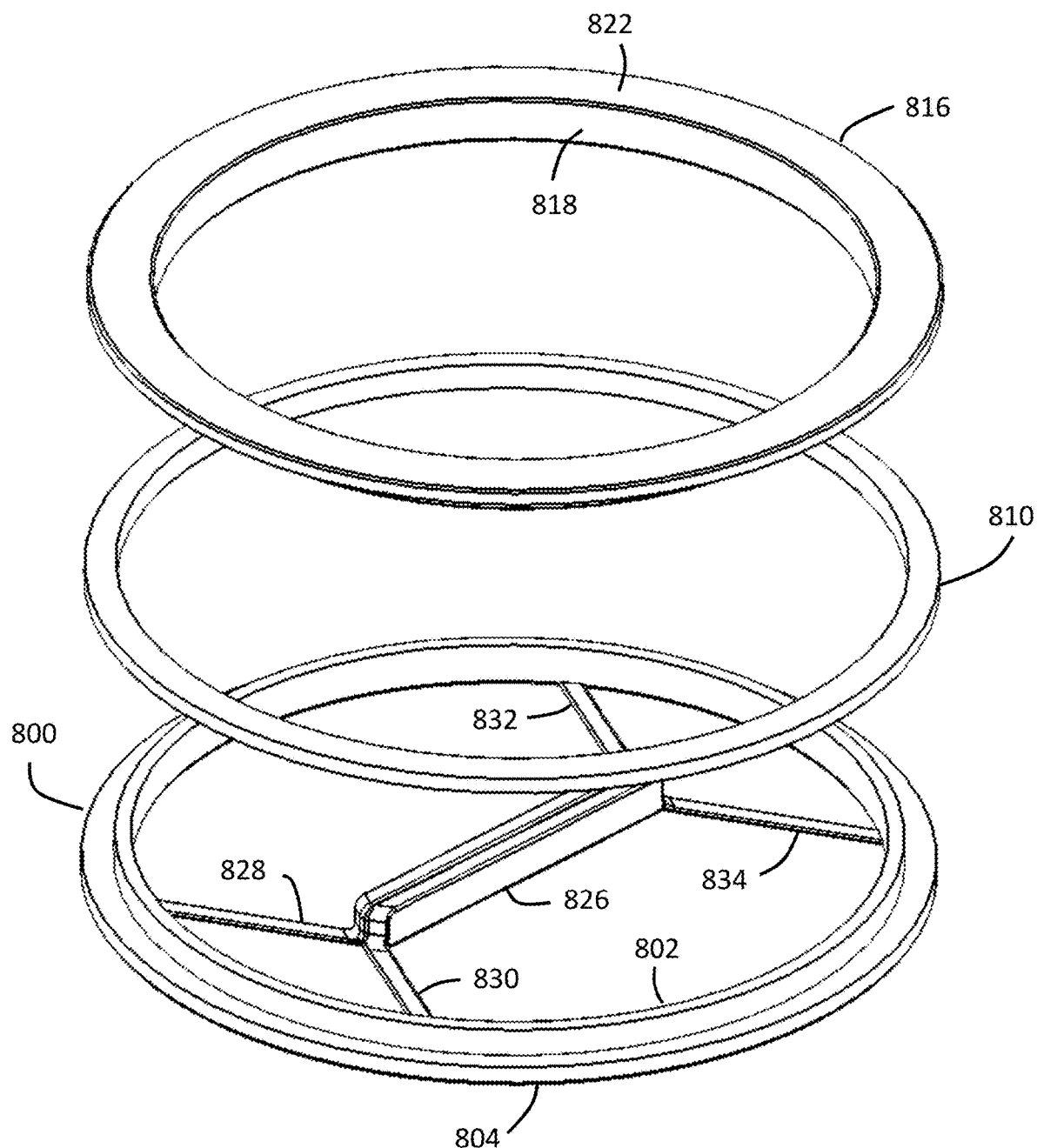
FIG. 9 is a top perspective view of a ring assembly for use with the replaceable media module of FIG. 3 in accordance with an embodiment.
Figure 10:
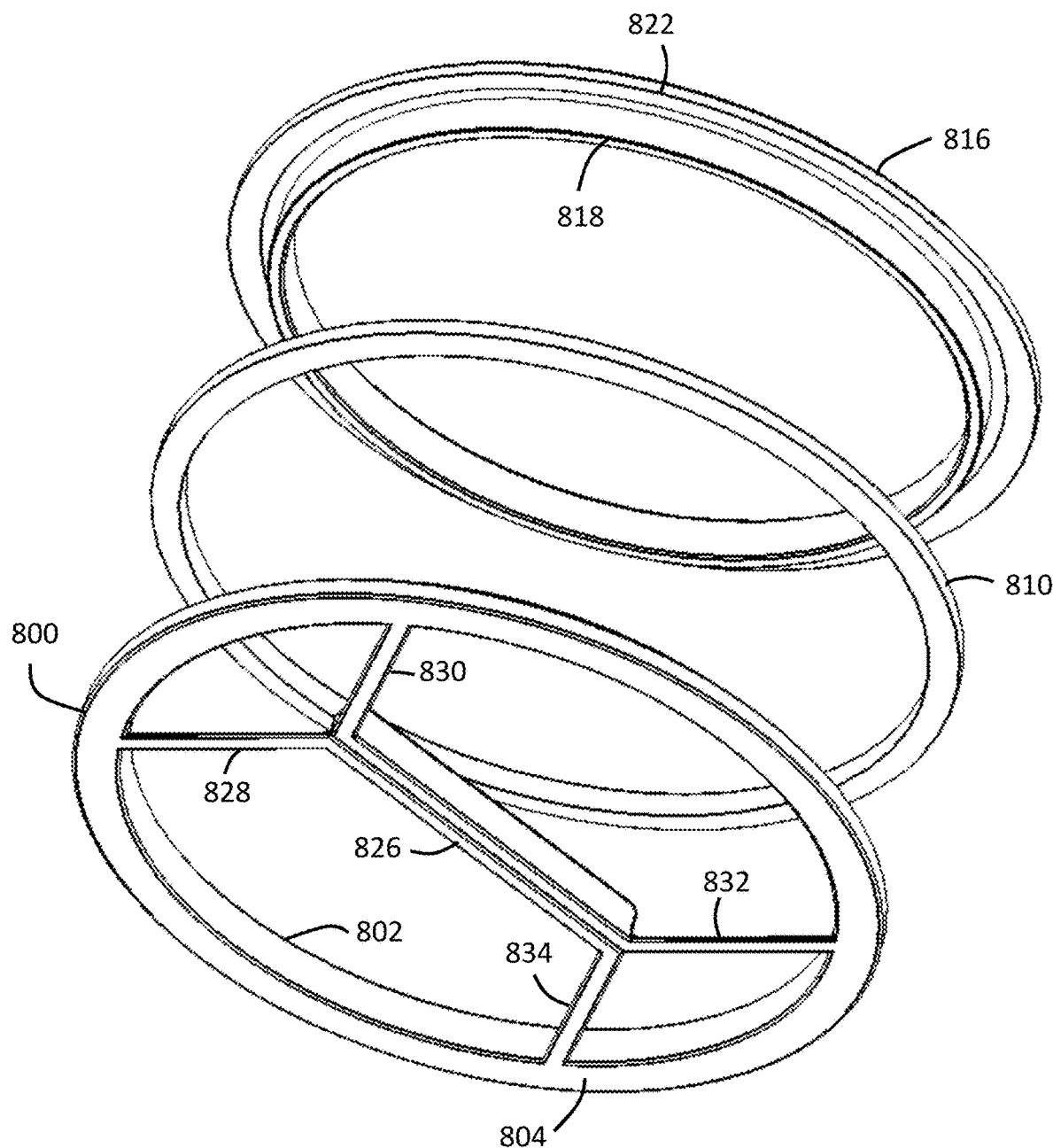
FIG. 10 is a bottom perspective view of the ring assembly of FIG. 8.

Referring now to FIG. 13, in another embodiment a ring assembly 1200 is provided having an integrally formed second member 1202. In this embodiment, the ring assembly includes a first ring 1203 and a second ring 1204. In an embodiment, the first ring 1203 is the same ring 1102 of FIG. 11. In the illustrated embodiment, the first ring 1203 includes an inner wall 1208 having a flange 1210 extending therefrom in a similar manner to third ring 816 (FIG. 9). The flange 1210 also includes a conical surface that is tapered to match the corresponding conical surface of second ring 1204. The flange 1210 further includes a plurality of slots 1214, each having a tab 1216. Extending axially from the end of each tab 1216 is an arm 1218. The arm 1218 has an inner surface that is positioned at a radius that is the same as or slightly smaller than the outer diameter of the second ring 1204. On the end of each arm 1218 is a lip 1220. The length of the arms 1218 is sufficient to allow the lip 1120 to engage the surface 1222 of the second ring 1204. It should be appreciated that the arms 1218 provide a snap-fit that couples the rings 1203, 1204 together.

In this embodiment, the second member 1202 is integrally formed with the first ring 1203. In an embodiment, the second member 1202 is molded with the first ring 1203. In another embodiment, the second member 1202 is insert molded or co-molded with the first ring 1203. In this embodiment, the open end of the first member (e.g. first member 302) is placed between the first ring 1203 and the second ring 1204 such that when the rings 1203, 1204 are coupled together, the first member is coupled to the ring assembly 1200. In still other embodiments, the second member 1202 is coupled to the first ring 1203 via bonding, an adhesive, ultrasonic welding or a mechanical fastener for example. It should be appreciated that when the first member is coupled to the ring assembly 1200, the second member 1202 encloses the end of the first member. In an embodiment, the second member 1202 is formed with a porosity sized to substantially prevent purification media from flowing therethrough. In an embodiment, the second member 204 has an opening or pore size of between 10-400 microns (US Standard Mesh No. 850-US Standard Mesh 45). In another embodiment, the second member 204 has an opening or pore size between 50-300 microns (US Standard Mesh No. 270-US Standard Mesh 50). In an embodiment, the mesh material may be made from any suitable porous, relatively stiff/nonflexible material, such as but not limited to fabrics, plastics (e.g. nylon) or metal for example.

In an embodiment, the replaceable media module includes the ring assembly 1100 on one end and the ring assembly 1200 on an opposite end. In another embodiment, the replaceable media module includes the ring assembly 1100 at both ends. In still another embodiment, the replaceable media module includes the ring assembly 1200 at both ends.

In an embodiment, the mesh member may be coupled to the ring adjacent the purification media to support the second member 310 or third member 312 to limit the amount of stretching of the second member 310 or third member 312 as the purification media 304 is compressed by the first member 302.

Figure 14A:
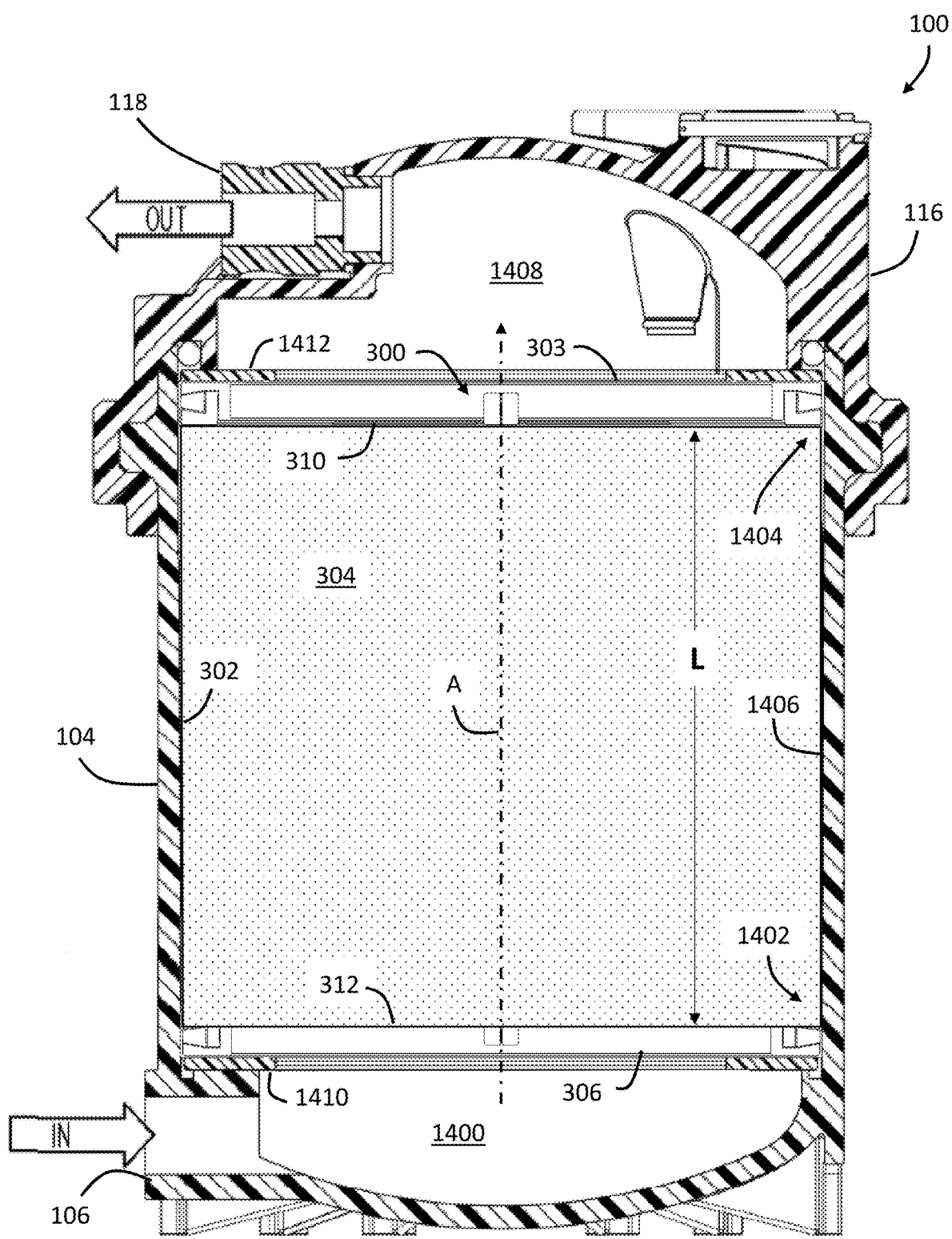
FIG. 14A is a side sectional view of the fluid purification system of FIG. 1.

Referring now to FIG. 14A, the operation of the system 100 having the replaceable media module 300 is shown and described. In an embodiment, the fluid to be purified enters the tank 104 via the inlet port 106. In the embodiment where the fluid is water, the inlet port 106 may be coupled to a source, such as a water tap. The water flows into a chamber 1400, through a lower diffuser element 1410 and against the second ring assembly 306. In an embodiment, the lower diffuser element 1410 may be the diffuser shown and described with respect to FIG. 14B and FIG. 14C. Due to the pressure of the fluid from the source, the fluid flows through the third member 312 and into the purification media 304. In an exemplary embodiment, the pressurized water source is a normal residential or commercial water source having a pressure of approximately 40 to 60 pounds per square inch (psi). Of course, it is contemplated by the present disclosure for purification device 10 to find use with any pressurized water source such as, but not limited to, pumped systems and at any desired pressure. Further, it is contemplated for purification device 10 to be configured for use with a heated fluid source (not shown) such as, but not limited to, heating ventilation and air conditioning (HVAC) systems.

It should be appreciated that due to the circular shape of the ring assemblies 303, 306, and the flexibility and/or elasticity of the first member 302, the purification media 304 assumes a cylindrical shape within the tank 104 and there are no gaps in the corners 1402, 1404 like prior art systems or between the first member 302 and the inner wall 1406 of the hollow interior 108. Thus, the length of contact "L" of the fluid being purified is along substantially the entire length of the hollow portion 108 of the tank 104 to increase or maximize the utilization of the purification media relative to prior art containers where the corners were rounded or curved. Further, as discussed above, the replaceable media module provides for improved water flow across the width of the module (e.g. across the faces of members 310, 312). Without being bound to a particular theory, it is believed that the improved water flow further improves the utilization of the purification media relative to prior art containers.

After flowing through the purification media 304, the fluid flows through the second member 310, the first ring assembly 303, and upper diffuser element 1412 and into a second chamber 1408. In an embodiment, the diffuser element 1412 may be the same as that shown and described with respect to FIG. 14B and FIG. 14C. From the second chamber 1408, the fluid flows out of the outlet port 118. In the exemplary embodiment, the outlet port 118 may be coupled to a fluid consumption device. The fluid consumption device may be any device that uses the purified fluid, such as but not limited to cleaning devices, window cleaning systems, floor cleaning systems, hot water heating systems and the like for example.

It should be appreciated that while the illustrated embodiment shows the fluid flowing through the bottom port 106, along the axis indicated by the arrow "A", and out a top port 118, this is for exemplary purposes and the claims should not be so limited. In other embodiments, the flow of the fluid may be reversed, e.g. flows in through port 118 and out through port 106. Further, the orientation of the tank 104 may not be vertical (e.g. axis A being perpendicular to the floor), but rather, the tank 104 may be positioned in any suitable orientation.

Figure 14B:
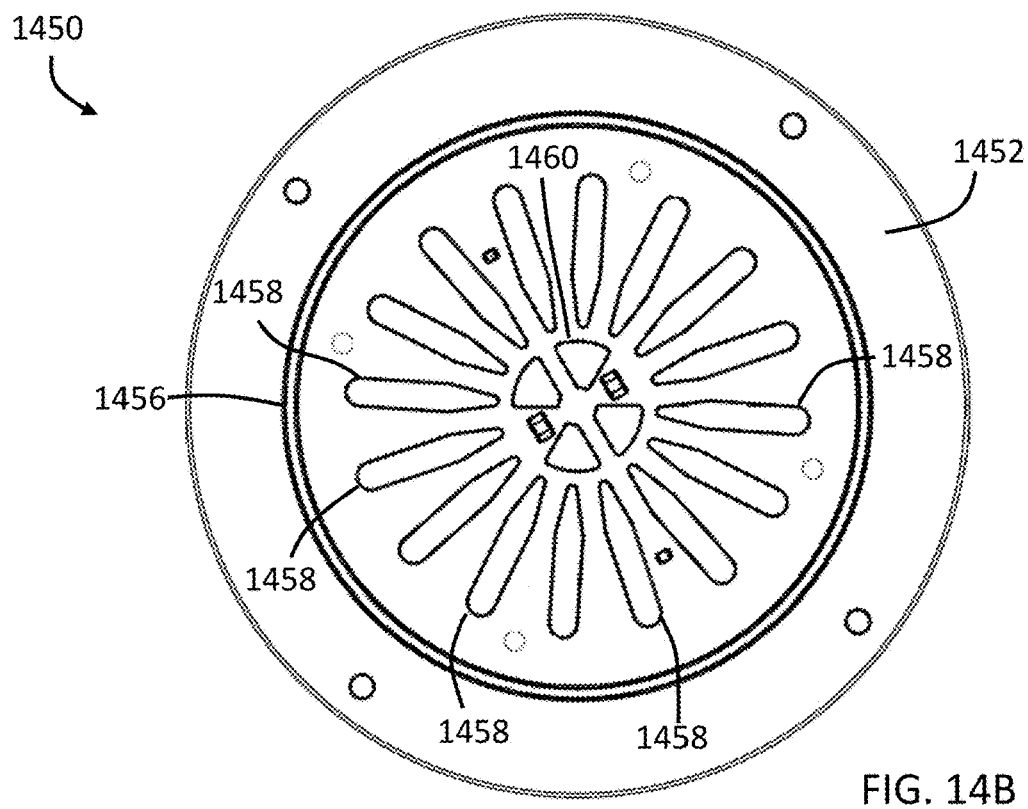
FIG. 14B is a top view of a diffuser for use with the fluid purification system of FIG. 1 in accordance with an embodiment.
Figure 14C:
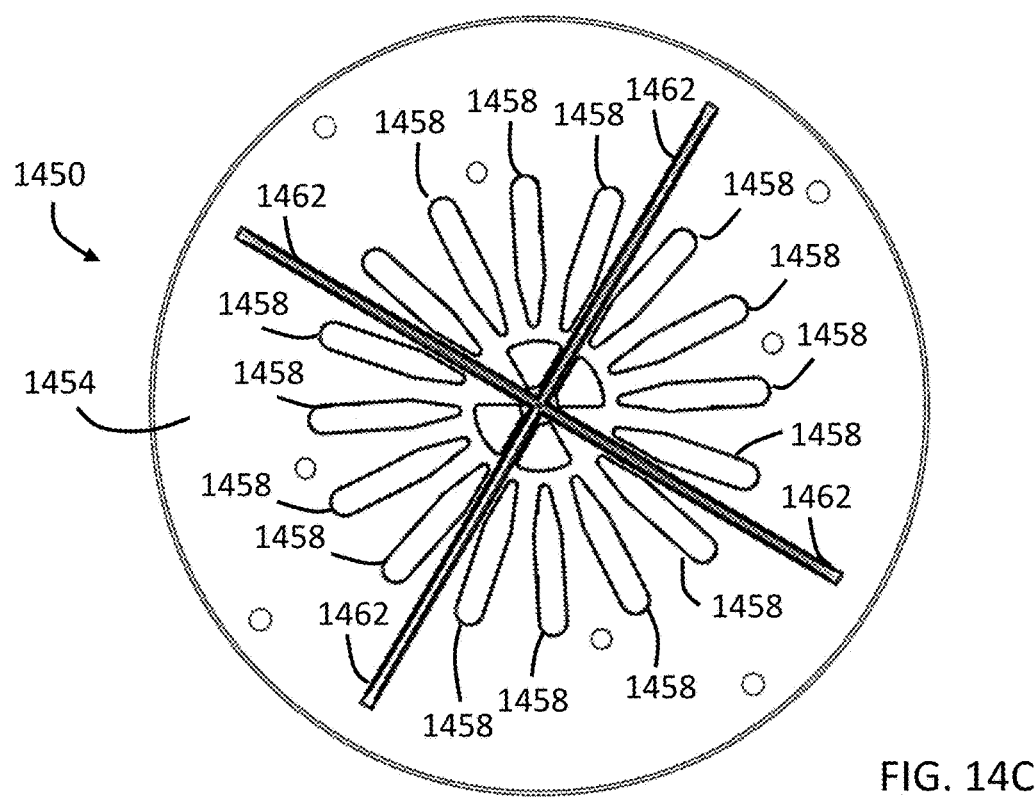
FIG. 14C is a bottom view of the diffuser of FIG. 14B.

Referring now to FIG. 14B and FIG. 14C, an embodiment of a diffuser element 1450 is shown. In an embodiment, the diffuser element 1450 may be the diffuser plate described in commonly owned United States Patent Publication 2015/0353383, the contents of which are incorporated herein by reference. In an embodiment, the diffuser 1450 includes a first side 1452 that faces the module 300 and an opposing side 1454 that faces either the first chamber 1400 or the second chamber 1408. In an embodiment, the first side 1452 includes a circular projection 1456 that extends about a plurality of openings 1458. The openings 1458 extend through the diffuser 1450 so that water may pass therethough. In an embodiment, an optional porous mesh material is comolded into the diffuser element 1450 over the openings 1458. The diffuser 1450 may further include additional central openings 1460. In an embodiment, the openings 1458, 1460 are sized to provide a desired back pressure within the system. The second side 1454 includes a plurality of ribs 1462 that stiffen the diffuser 1450. In an embodiment, the ribs 1462 extend into the chambers 1400, 1408.

In an embodiment, the diffuser 1450 may include an open central portion instead of the plurality of openings 1458, 1460. This embodiment may be desirable for example when the module 300 includes the ring assembly 1200 having the relatively stiff mesh 1202 that supports the purification media for example. In one embodiment, one or both of the lower diffuser 1410 or upper diffuser 1412 may be eliminated.

Figure 15A:
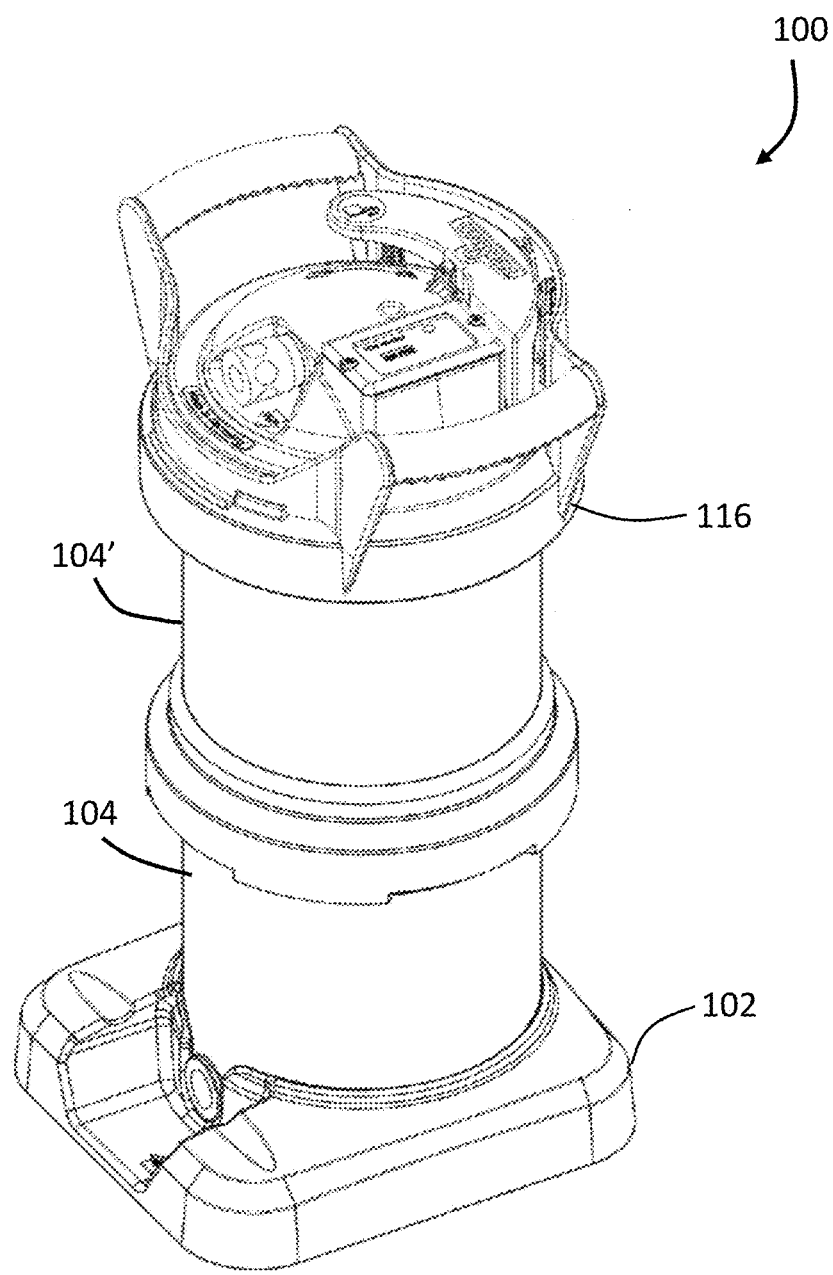
FIG. 15A-15C are views of an expandable fluid purification system in accordance with an embodiment.
Figure 15B:
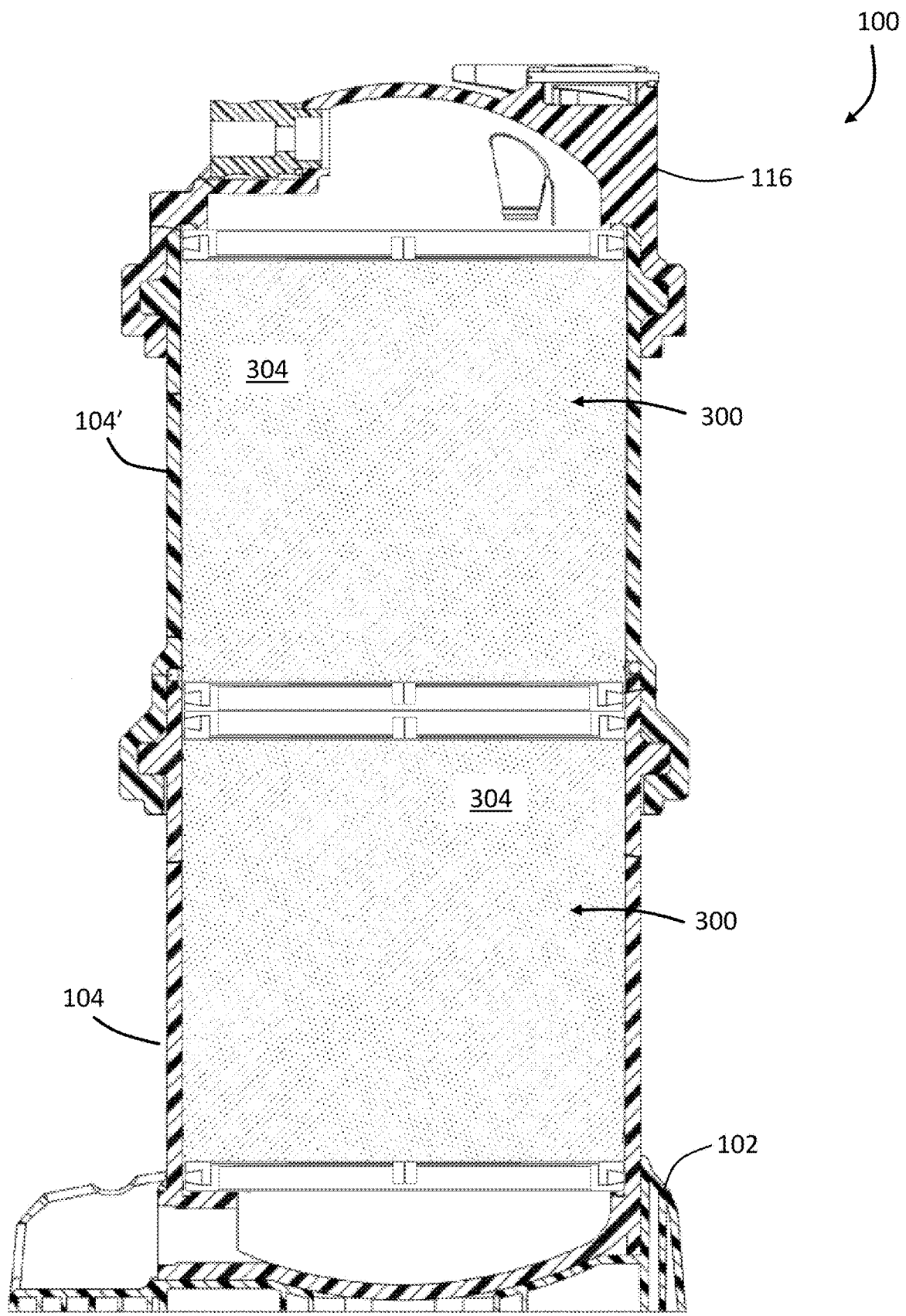
Figure 15C:
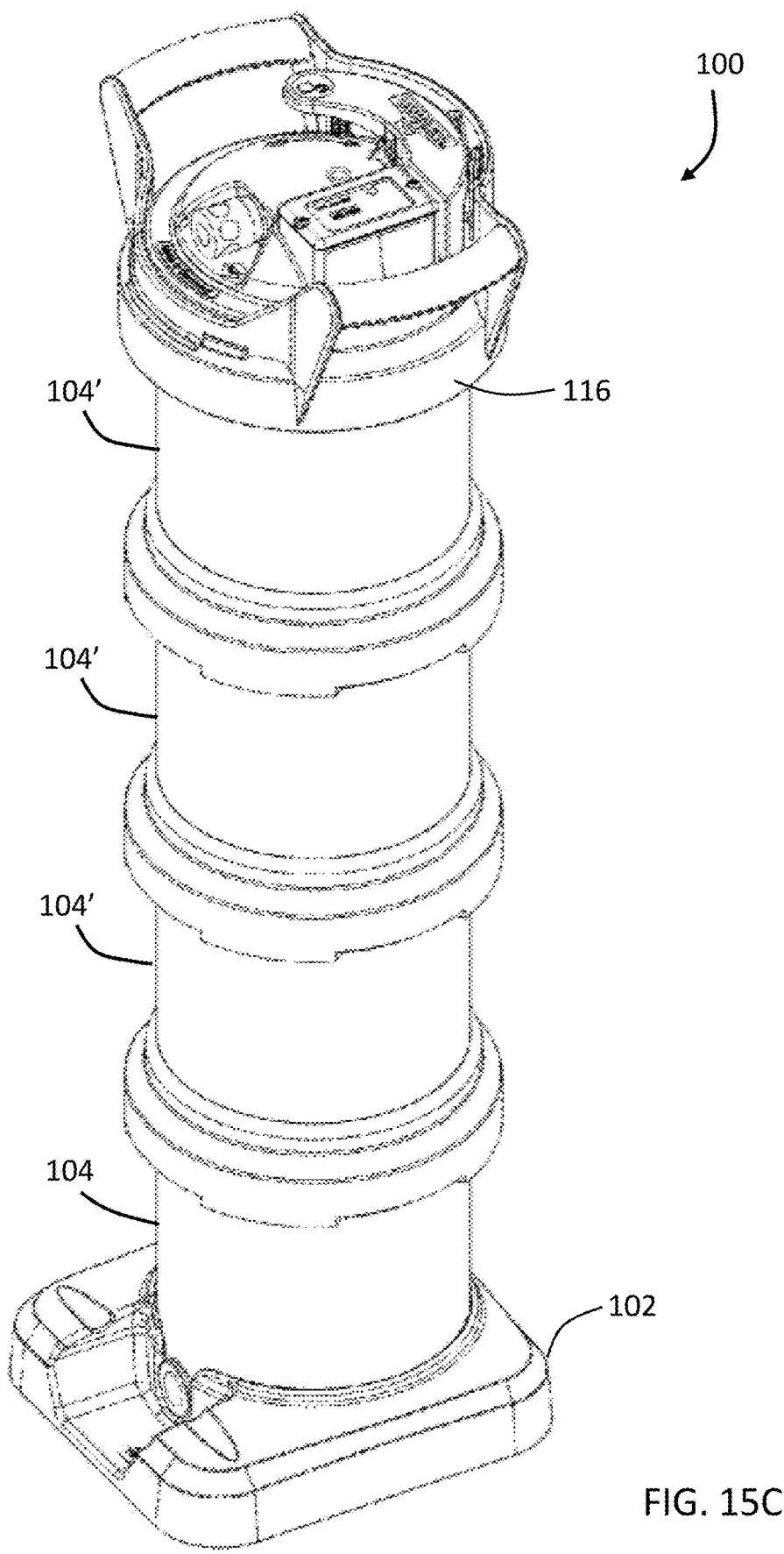
Figure 16:
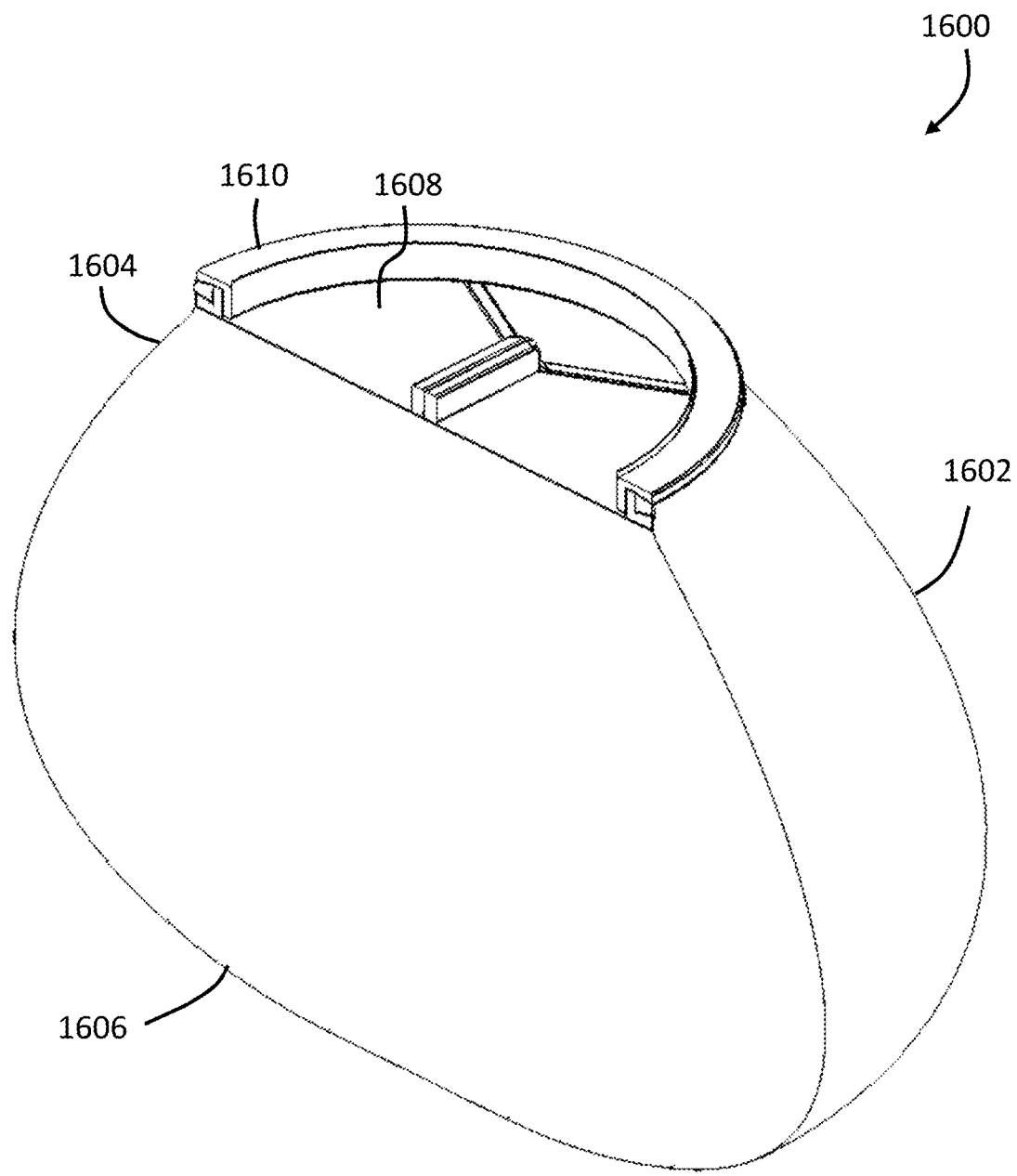
FIG. 16 is a perspective sectional view of a replaceable media module having a closed end for use with the fluid purification device of FIG. 1 in accordance with another embodiment.
Figure 17:
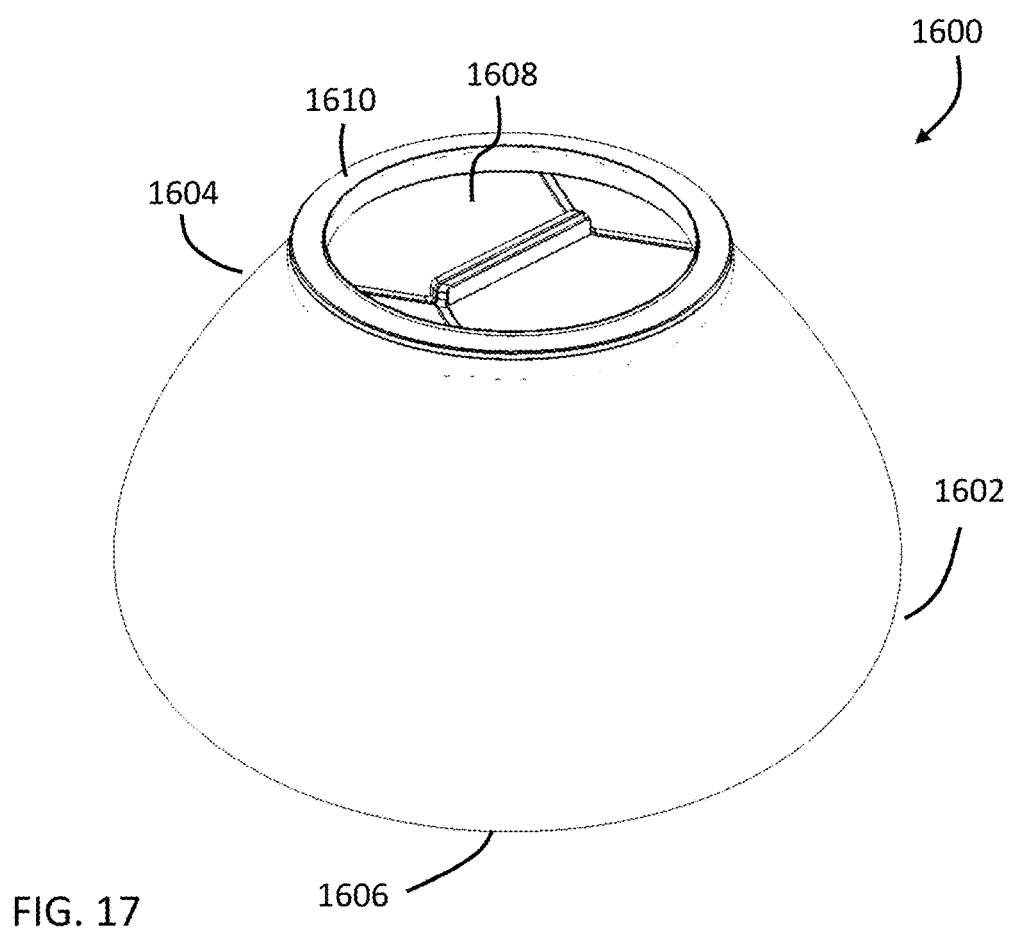
FIG. 17 is a top perspective view of a replaceable media module for use with the fluid purification device of FIG. 1 in accordance with another embodiment.
Figure 18A:
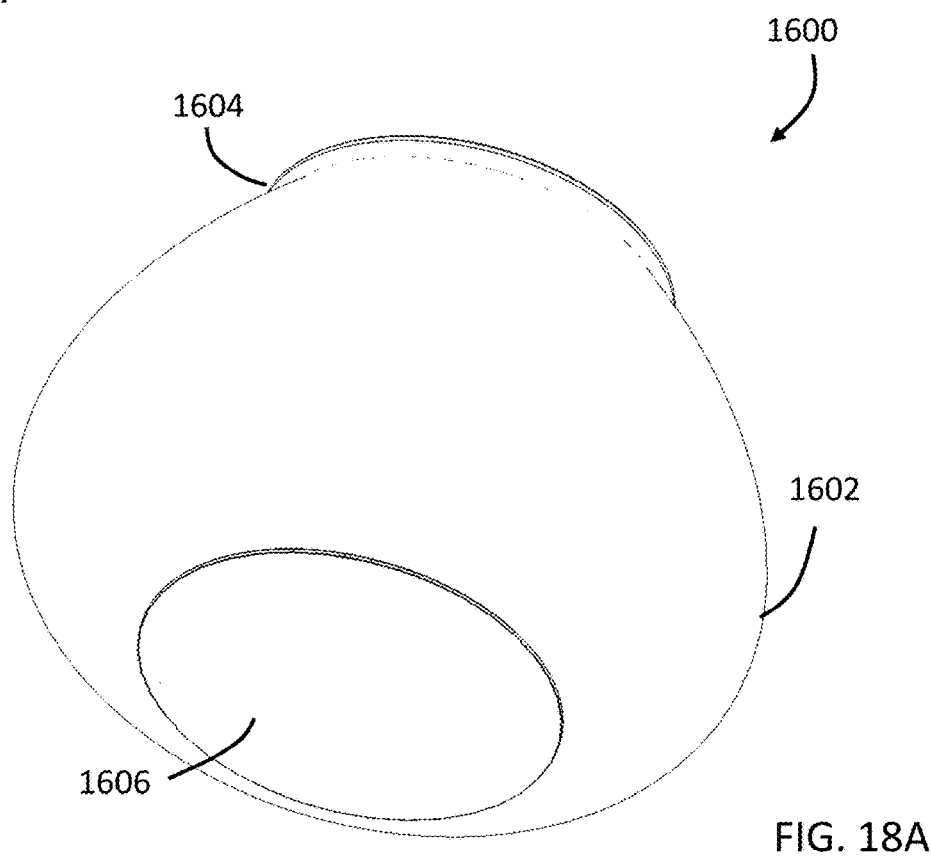
FIG. 18A is a bottom perspective view of the replaceable media module of FIG. 17.
Figure 18B:
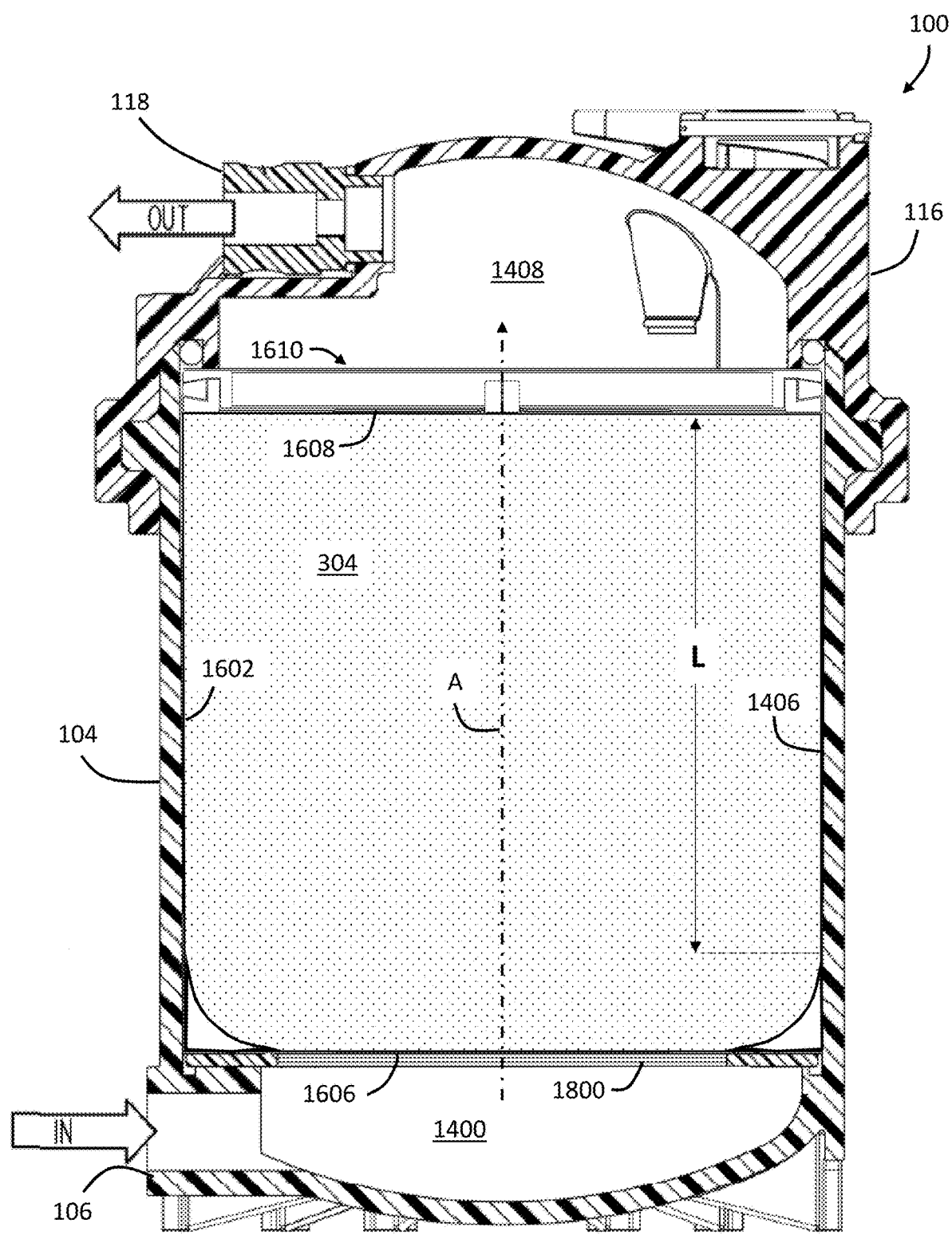
FIG. 18B is a side sectional view of the fluid purification system of FIG. 1 with the replaceable media module of FIG. 16.

Further, while the embodiments herein illustrate the system 100 as having a single replaceable media module 300, this is for exemplary purposes and the claims should not be so limited. In other embodiments, the hollow interior may have a length that is longer than the replaceable media module 300, for example, the hollow interior 108 may be sized to contain two, three or more replaceable media modules. In an embodiment, the tank 104 may be configured to be stackable with other tanks 104' to increase the capacity of the system 100, as shown in FIG. 15A-15C. In an embodiment, the system 100 may be similar to that described in the above referenced United States Patent Publication 2015/0353383, the contents of which are incorporated by reference herein.

It should be appreciated that while the illustrated embodiments show multiple replaceable media modules 300 as being used in the system 100, this is for exemplary purposes and the claims should not be so limited. In other embodiments, the replaceable media module 300 is used in the top most (e.g. closest to the cover 116) and a replaceable media module without a ring assembly, such as that described in the aforementioned US Patent Publication 2015/0353383, may be used between the top most replaceable media module and the base 102. In still further embodiments having two or more replaceable media modules, the replaceable media modules 300 may be used in the top most (e.g. adjacent the cover 116) position and the lower most (e.g. adjacent the base 102) position, with replaceable media modules without rings being used therebetween. It should be appreciated that the modules 1600, 1900, 3200, 4200 may also be used in the system 100.

Referring now to FIGS. 16-18A, another embodiment is shown of a replaceable media module 1600. In this embodiment, the first member 1602 has an open end 1604 and a closed end 1606. In an embodiment, the first member 1602 is the same (e.g. made from a porous, flexible, and/or elastic material) as first member 302 of FIG. 3. Disposed within the interior of the first member 1602 is purification media (not shown for clarity). A second member 1608 encloses the open end 1604. The first member 1602 and the second member 1608 are coupled together by a ring assembly 1610 as described herein with reference to FIGS. 3-12. In another embodiment, one or more diffuser elements 1800 (FIG. 18B) may be arranged on the between the first chamber 1400 and the closed end 1606. In another embodiment, the ring assembly 1610 may be disposed adjacent the first chamber 1400 and the diffuser element is disposed between the closed end 1606 and the second chamber 1408. It should be appreciated that the diffuser 1800 may also be disposed between the ring assembly 1610 and the chamber 1408, similar to that shown in FIG. 14A. In still other embodiments, no diffusers may be used. In an embodiment, the diffusers 1410, 1412, 1800 may be the same as the diffuser shown and described in the aforementioned United States Patent Publication 2015/0353383. The diffusers 1410, 1412, 1800 may be integral (e.g. formed as part of), a separate component from the tank 104, or fastened to the tank 104 or placed between the resin modules.

It should further be appreciated that the first member 1602, the second member 1608 and the closed end 1606 may be made from the same material. In some embodiments, the members 1602, 1606, 1608 are made from a continuous piece of material. In another embodiment, the members 1602, 1606, 1608 may be made from multiple pieces.

Figure 19:
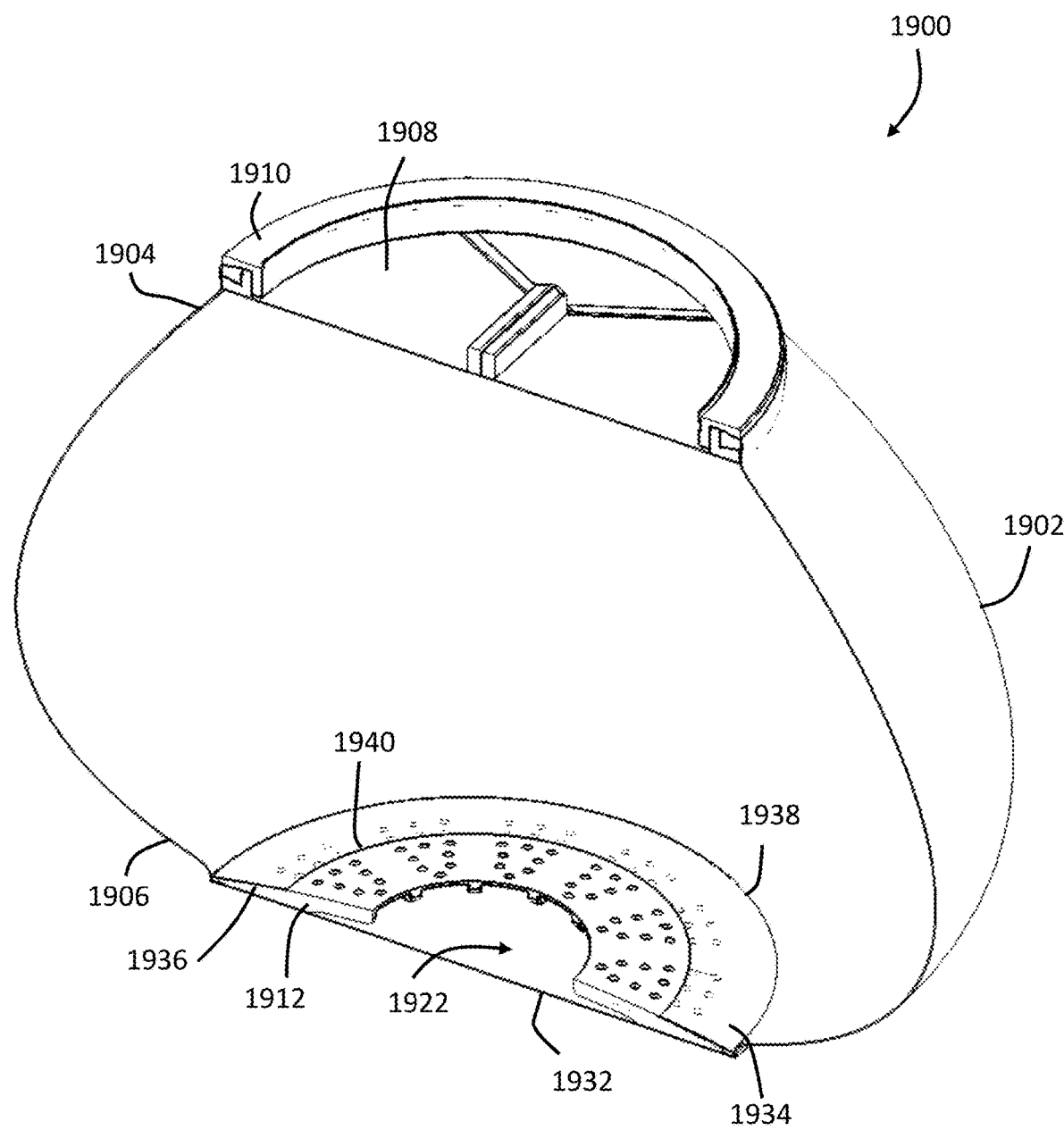
FIG. 19 is a perspective sectional view of the replaceable media module of FIG. 17 in accordance with another embodiment.
Figure 20:
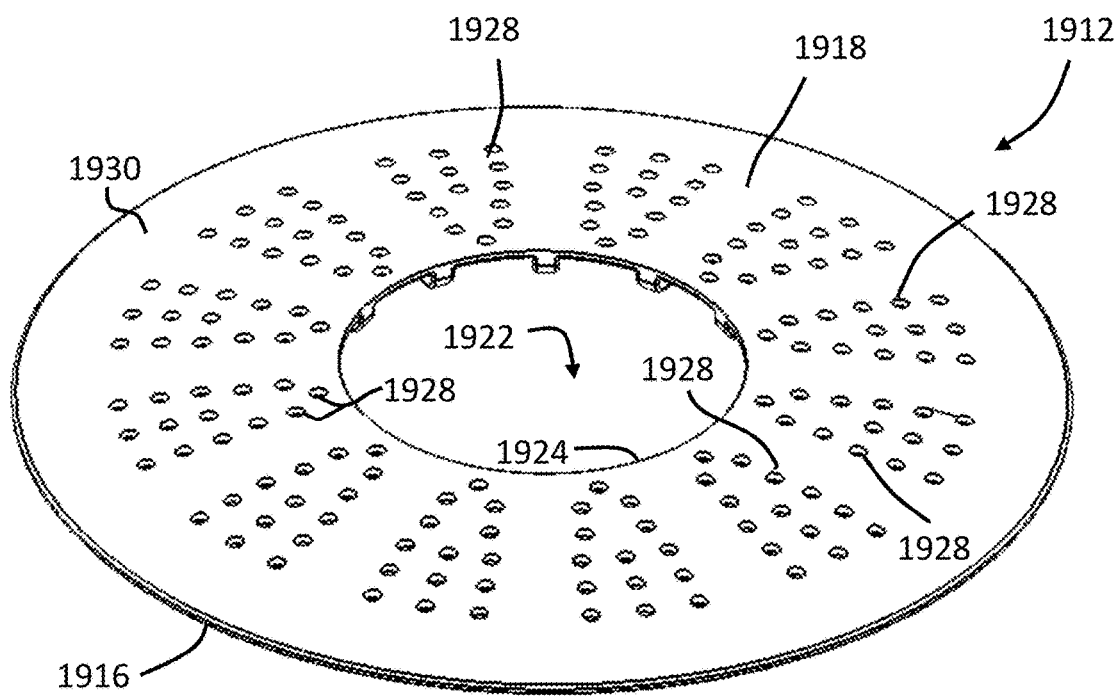
FIG. 20 is a top perspective view of a diffuser plate for use with the replaceable media module of FIG. 19.
Figure 21:
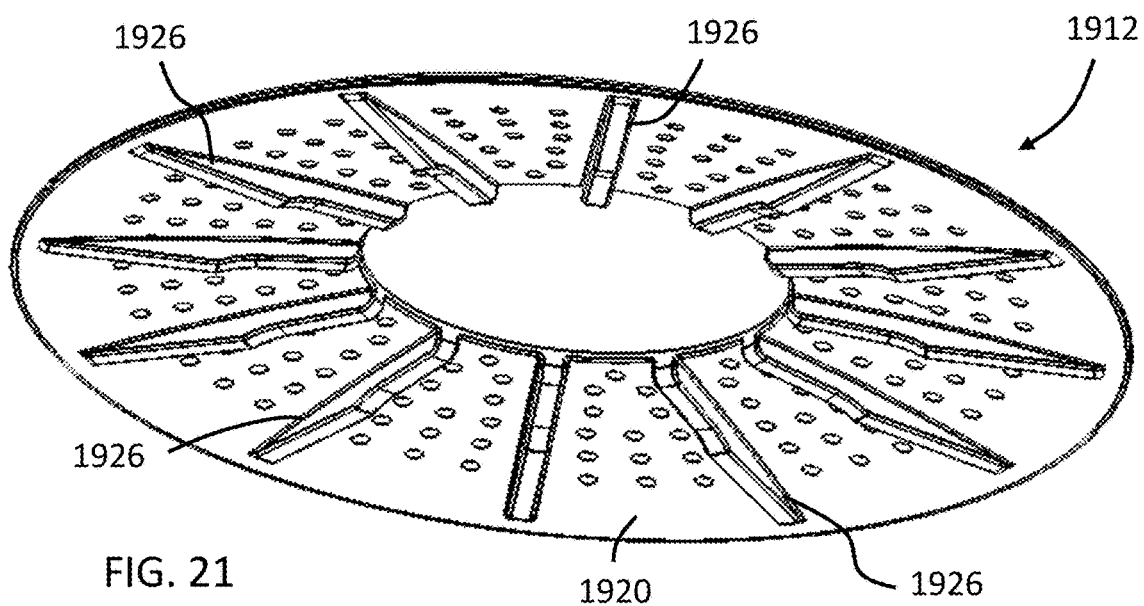
FIG. 21 is a bottom perspective view of the diffuser plate of FIG. 20.

Referring now to FIGS. 19-21, another embodiment is shown of a replaceable media module 1900. In this embodiment, the first member 1902 has a first open end 1904 and a closed end 1906. The first member 1602 is made from a porous, flexible, and/or elastic member similar to first member 302 of FIG. 3. Disposed within the interior of the first member 1902 is purification media (not shown for clarity). A second member 1908 encloses the open end 1904. The first member 1902 and the second member 1908 are coupled together by a ring assembly 1910 as described herein with reference to FIGS. 3-12.

In this embodiment, coupled to the closed end 1906 is a diffuser member 1912 that controls the flow of the fluid from the chamber 1400 into the purification media 304. In an embodiment, the closed end of the module 1900 and the diffuser member 1912 may be similar to that described in commonly owned U.S. patent application Ser. No. 15/914, 049 filed on Mar. 7, 2018, the contents of which is incorporated by reference herein by reference. Without being limited to a particular theory, as with the embodiment of FIG. 3 (with two ring assemblies) the integral diffuser 1912 improves the utilization of purification media 304 by providing a more uniform flow pattern through the resin, improved compressive forces on the purification media, an increase in a length (L) of contact between container 114 and tank 24, a desired porosity at the first chamber 1400 side of tank 104, a desired stretch of first member 192 regardless of the volume or depletion amount of purification media 304, a closer fit of outer diameter of diffuser 1912 to inner diameter of tank, and other benefits.

The diffuser 1912 is considered to be integral with first member 1902 by virtue of the diffuser 1912 residing within the first member 1902 at a lower interior surface (when viewed from the viewpoint of FIG. 14) of end 1906 of first member 1902, with respect to the flow direction.

In an embodiment, the diffuser 1912 has a generally frustoconical shape tapering upward (e.g. away from chamber 1400) from a lower outer edge 1916. Diffuser 1912 has an upper face 1918 and a lower face 1920 and, may be installed in system 100 so that lower face 1920 faces towards the direction of flow (A). It should be appreciated that in other embodiments, the replaceable media module 1900 may be inverted relative to the orientation illustrated in FIG. 19, such that the diffuser 1912 is adjacent the second chamber 1408.

In some embodiments, diffuser 1912 has a central opening 1922 such that the diffuser 1912 tapers from outer edge 1916 to edge 1924 of the opening 1922. Central opening 1922 can have an inner diameter (located at edge 1924) that may be between 10% and 90% of the outer diameter (located at edge 1916) of the diffuser 1912, may be between 20% and 60%, or with about 30% to 50% being desired, and any subranges therebetween.

Diffuser 1912 can include one or more ribs 1926 defined on lower face 1920. Ribs 1926 can provide structural rigidity to diffuser 1912 or can guide the flow of water into/through central opening 1922. Additionally, diffuser 1912 can include a plurality of openings 1928, such as in the form of slots or holes, at any desired location or pattern to provide the desired flow through replaceable media module 1900.

In this manner, diffuser 1912 multiple zones of differing flow restriction. For example, central opening 1922 can be thought of as a zone of very low flow restriction through diffuser 1912, while the remaining portions of the controller can be thought of as zones of higher levels of flow restriction as compared to the zone of the central opening. Further when diffuser 1912 includes openings 1928, this area can be thought of as a zone of a middle level of flow restriction through the diffuser 1912 as compared to the zone of opening 1922. Finally, diffuser 1912 can include regions that lack any openings 1930 in the region proximate outer edge 1916 can be thought of a zone of highest level of restriction. Simply stated, diffuser 1912 has at least two, but in some embodiments may have at least three zones of differing flow restriction—where the center of the diffuser 1912 has the lowest level of restriction (i.e., offers the highest level of flow) and outer edge 1916 of the diffuser 1912 has the highest level of restriction (i.e., offers the lowest level of flow).

It should be recognized that diffuser 1912 is described above by way of example only as having zones of flow restriction that are lowest in the center and highest at the outer edge 1916. In other embodiment, it is contemplated by the present disclosure for diffuser 1912 to have any desired order or number of zones that are configured to control the flow of fluid into/through purification media 304 so as to improve the utilization of the purification media 304 taking into account one or more variables such as, but not limited to, tank inner diameter, tank aspect ratio, number of tank sections, flowrate, media type, TDS of incoming and/or outgoing water, and others.

In some embodiments where diffuser 1912 is configured for use with tank 104, which may have an internal diameter of 200 mm, the diffuser 1912 can have an outer diameter at edge 1916 of between 160 mm and 240 mm, or between about 180 mm to 200 mm, with 192.5 mm being desired, and any subranges therebetween. In this manner, diffuser 1912 has outer diameter that is within ±20%, or within −10% to 0%, with about −4% of the inner diameter of the tank 104 being desired, and any subranges therebetween. In embodiments where diffuser 1912 has an outer diameter that is larger than the inner diameter of tank 104, the diffuser 1912 can have one or more resiliently flexible outer regions that are deformed when installed in the tank 104.

In some embodiments, diffuser 1912 can be in the form of a split ring, namely include a slit running through the diffuser 1912 from edge 1916 to edge 1924 that allows the diffuser 1912 to be resiliently compressed to a smaller outer dimeter for securement in tank 104. Here, one or more edges of slit can include a feature (e.g., a tongue and groove feature) that, when engaged, prevents compression of diffuser 1912 to the smaller diameter once installed in tank 104.

It should be appreciated that in some embodiments, the first member 1902 may be formed from multiple panels that are attached together by a suitable means, such as sewing, bonding or ultrasonic welding for example. In an embodiment, the replaceable media module 1900 may have a three-piece construction that includes a first panel or first member 1902, a circular bottom panel 1932, and a retaining panel 1934.

Panels 1902, 1932, 1934 may be formed of a porous material that is resilient or elastomeric and may be made of the same material. However, it is contemplated that in some embodiments the panels 1902, 1932, 1934 to be made of different materials, such as different porosity, flexibility and/or elasticity for example.

Cylindrical wall panel 1902 lacks any seams that run along the primary flow direction (A)—namely from the bottom to the top of the container. Bottom panel 1932 and cylindrical wall panel 1902 are secured to one another along an internal seam. In some embodiments, internal seam is formed by polyester yarn (not shown). Regardless of how formed, seam may be provided in a manner that allows container 114 to remain flexible or elastic at the seam. In some embodiments, the seam will also be elastic when the panels are made from an elastic material.

In an embodiment, bottom panel 1932, cylindrical wall panel 1902, and seam are configured, via the materials, shapes, and sizes, so that once module 1900 is filled with purification media 304 and diffuser 1912, the seam will be located partially up the side wall. In other embodiments, the seam may be positioned at any location. In some embodiments, it is desired that the seam be placed in a position so as to not impede or provide an alternate flow path for the fluid flowing through the replaceable media module. In an embodiment, the seam is located such that cylindrical wall panel 1902 lacks any seams that run along the primary flow direction (A). In an embodiment, the seam is arranged substantially perpendicular to the flow direction (A). Further, in other embodiments, multiple materials may be used for panels 1932, 1934 such that module 1900 includes multiple seams at different locations.

In an embodiment, the module 300 is formed from single panel such as those made using known circular knitting techniques.

Retaining panel 1934 is secured to bottom panel 1932 so as to form a pocket 1936 into which diffuser 1912 is secured. In an embodiment, diffuser 1912 is held in pocket 1936 by the elastic properties of first member 1902. In the illustrated embodiment, retaining panel 1934 has an outer edge 1938 and an inner edge 1940, such as where the outer edge is secured to bottom panel 1932 and the inner edge remains unsecured to the bottom panel forming pocket 1912 therebetween.

Retaining panel 1934 has an unstretched outer diameter—defined at outer edge 1938, which is smaller than the outer dimeter, defined at outer edge 1916, of the diffuser 1912. In this manner, insertion of retaining panel 1934 into pocket 1936 stretches bottom and retaining panels 1932, 1934 to hold diffuser 1912 in pocket 1936. In an embodiment, retaining panel 1934 has an unstretched outer diameter that is at least 10% less that the outer diameter of diffuser 1912, or may be at least 40% less, or may be at least 60% less being desired. In one embodiment, retaining panel 1934 has an unstretched outer diameter of 110 mm and finds use with diffuser 1912 having an outer diameter of 192.5 mm. Thus, effect of installing diffuser 1912 into pocket 1936 is that the portion of bottom panel 1932 inside of outer edge 1938 of retaining panel 1934 is also stretched at least 10%, or may be at least 40% less, or may be at least 60% less being desired. Furthermore, module 1900 is configured so that the stretch of bottom panel 1932, such as at least in the region of diffuser 1912, is independent of the amount of resin in module 1900 or the depletion level of the resin in the module 1900.

When diffuser 1912 is installed in pocket 1936, retaining panel 1934 can have an inner diameter, defined at inner edge 1940, that is small enough to provide that openings 1928 and central opening 1922 in the diffuser 1912 remain unrestricted by the retaining panel 1934. However and depending on the flow restriction characteristics desired, in some embodiments the inner edge 1940 covers openings 1928, and in other embodiments central openings 1922. Simply, it is contemplated that in some embodiments, the retaining panel 1934 is sized to have a sufficiently sized opening to allow insertion of diffuser 1912.

Advantageously, module 1900 via the interconnection of first member 1902 and diffuser 1912 is configured to stretch bottom panel 1932 consistently to a predefined amount. Bottom panel 1932 is the area of entry for water into module 1900. The amount of stretch applied to the fabric of bottom panel 1932 effects the porosity of this entry point. It has been determined by the present disclosure that stretching bottom panel 1932 consistently to the predefined amount provides an increase or a maximization of purification media 304 utilization by providing a lowest level of fluid restriction into/through module 1900 at the water entry side.

It should be recognized that module 1900 is disclosed above by way of example as having diffuser in bottom panel 1932, e.g. where that panel is the water entry side of the device. However, it is contemplated by the present disclosure for module 1900 to be arranged so that bottom panel 1932 is the water exit side. In other words, module 1900 can have diffuser 1912 at the water entrance side (which can be the bottom or top of the module) or at the water exit side (which can be the bottom or top of the module), with the ring assembly 1910 being located at the opposite end.

Without wishing to be bound by any particular theory, it is believed that elasticity of the first member material and/or the sidewalls of the tank 104, the elasticity of the material applies compressive forces on purification media 304, which reduces or minimizes movement of the individual resin beads within module 300, 1600, 1900 before, during, in between uses, and after use. It is believed that maintaining of purification media 304 in a compressed state within module 300, 1600, 1900 and/or system 100 as the media changes in volume due to depletion, at least in part, maximizes the use or consumption of media. However, this can be made particularly difficult as it has been determined by Applicant that purification media 304, when depleted has a reduced volume. In an embodiment, purification media 300 can experience a reduction in volume of up to 20% while still remaining under compression from either the tank 104 walls or the first member. It should be appreciated that more or less volume reduction is contemplated.

In some embodiments, module 300, 1600, 1900 is formed of material sufficient to maintain purification media 304 under compression even after being depleted, used or spent.

Additionally, in some embodiments, module 1900 is configured so that diffuser 1912 maintains the predetermined stretch of bottom panel 1932, at least in the region of the controller, after purification media 304 has been depleted, used or spent.

Accordingly, replaceable media module 300, 1600, 1900 of the present disclosure, has been found to provide a simple, yet effective way to improve the utilization of the media while remaining easy to load and unload from system 100.

Referring to FIGS. 22A-22G, FIGS. 23A-23G, FIGS. 24A-24G, FIGS. 25A-25G and FIG. 26 the results of resin usage tests are illustrated that were performed to determine the water flow through the system and, thus, to compare media usage. A total of seven tests are compared in FIG. 26, these tests are identified as Test 1, Test 1a, Test 1b, Test 3, Test 3b, Test 5b and Test 6b with the results being reported in both liters and grains.

Test 1 is simply reported herein as they were performed in Applicant's own U.S. Ser. No. 14/684,071. Test 1a is a retest of the Test 1, Test 1b is a retest of Test 1. It is noted that the difference in results between Tests 1/1a/1b are believed to be attributable primarily to differences in the resin. Thus, Test 1a, 1b, 3, 3b, 5b and 6b were performed using resin from the same manufacturer (Resin Tech MBD30) on the results of FIG. 26.

During the Test 1a and Test 1b, the pure water system used is Applicant's commercially available HydroPower® system, which includes a static diffuser inside of the system and a container, which is described in Applicant's own U.S. patent application Ser. No. 14/684,071.

During Test 3 and Test 3b, are the pure water system used is Applicant's commercially available HydroPower® system—which includes a static diffuser and a container with an integral diffuser inside of the system, which is described in Applicant's own U.S. Patent Application Ser. No. 62/468, 167.

During test 5b, the system 100 of FIG. 1 was the pure water system used is Applicant's commercially available HydroPower® system, which includes a static diffuser and further included the replaceable media module 1900 of FIG. 19.

Figure 3:
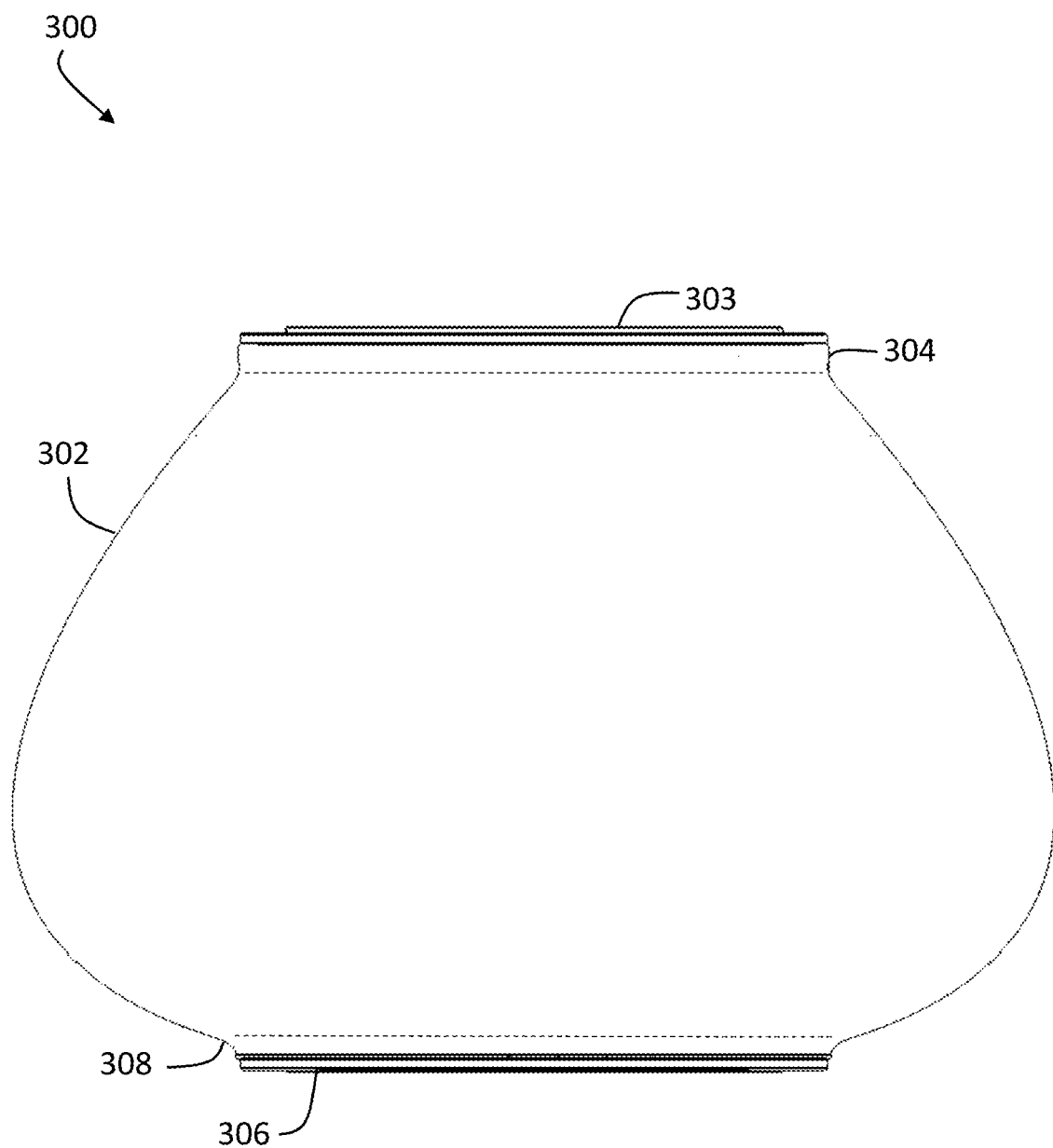
FIG. 3 is side view of a replaceable media module for use with the fluid purification device of FIG. 1 in accordance with an embodiment.
Figure 4:
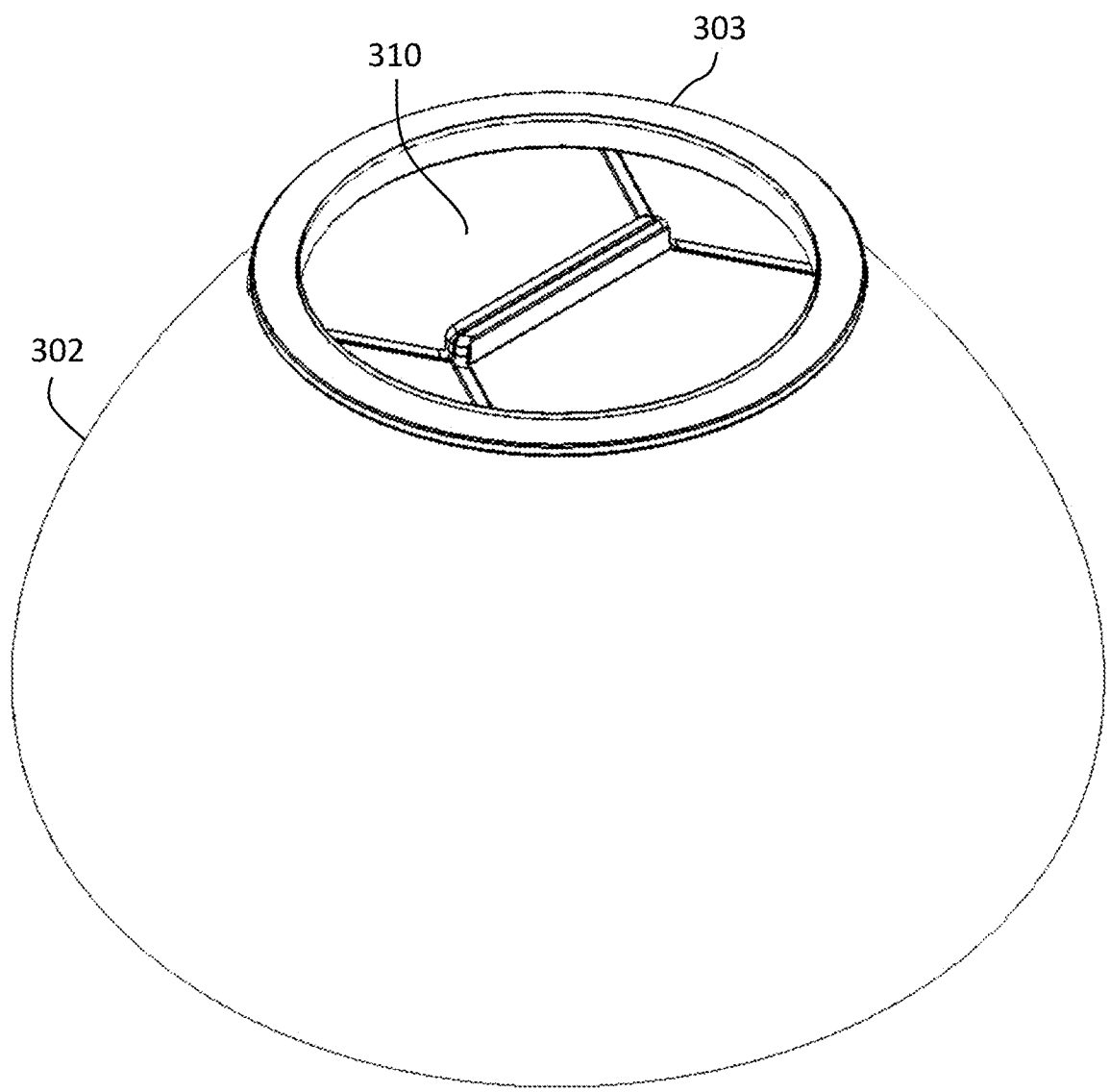
FIG. 4 is a top perspective view of the replaceable media module of FIG. 3.
Figure 5:
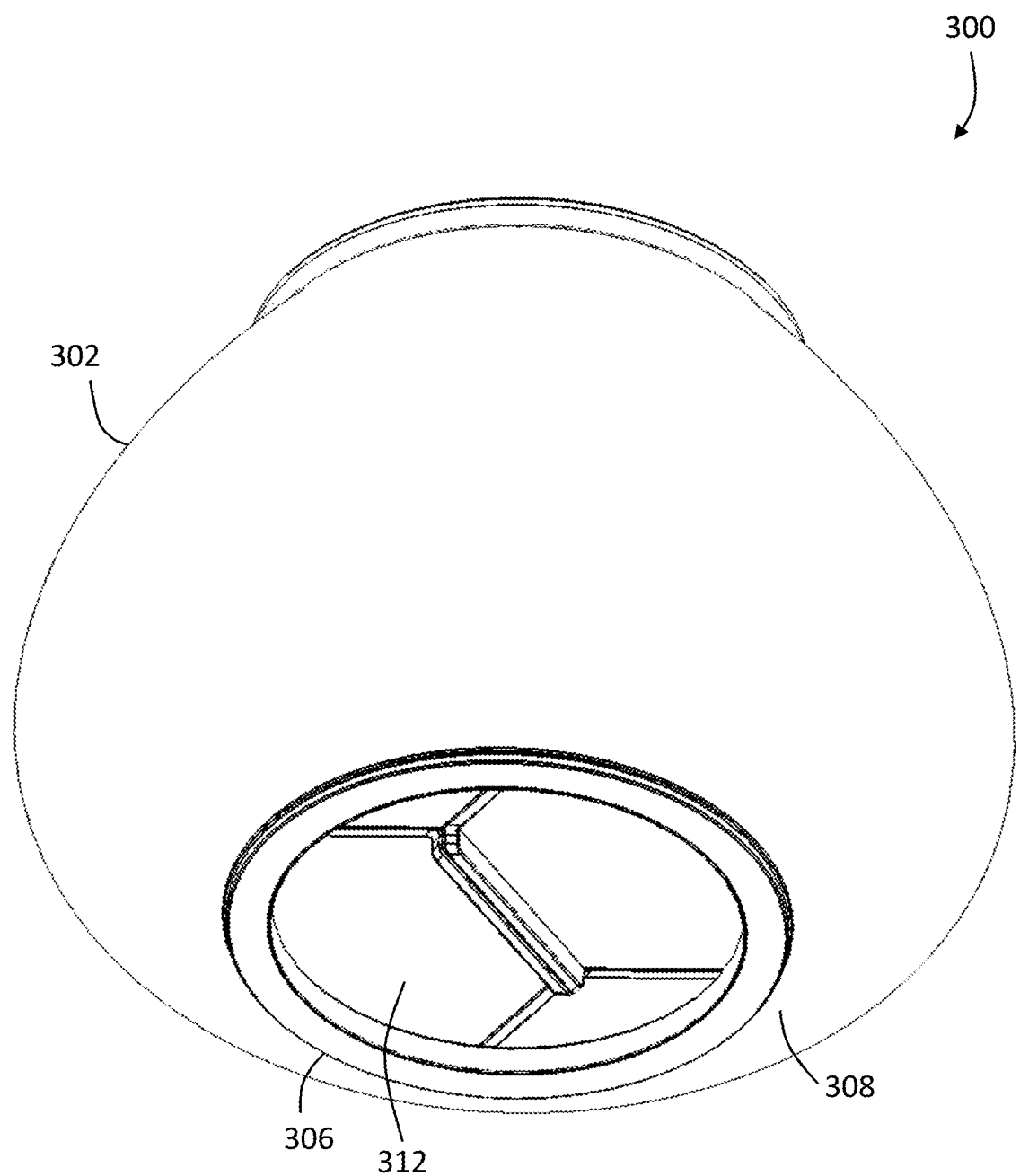
FIG. 5 is a bottom perspective view of the replaceable media module of FIG. 3.
Figure 6:
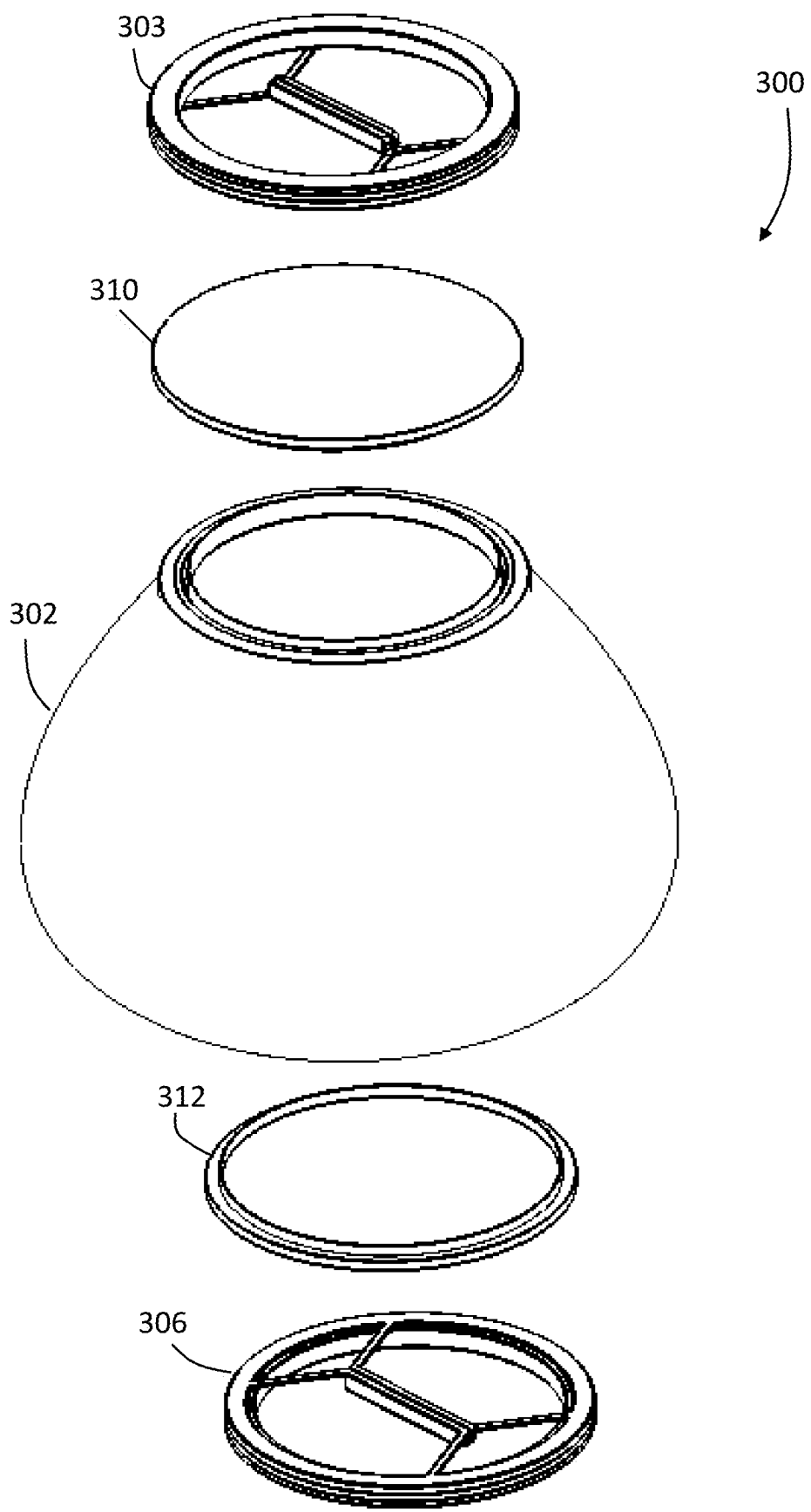
FIG. 6 is an unassembled view of the replaceable media module of FIG. 3.
Figure 7:
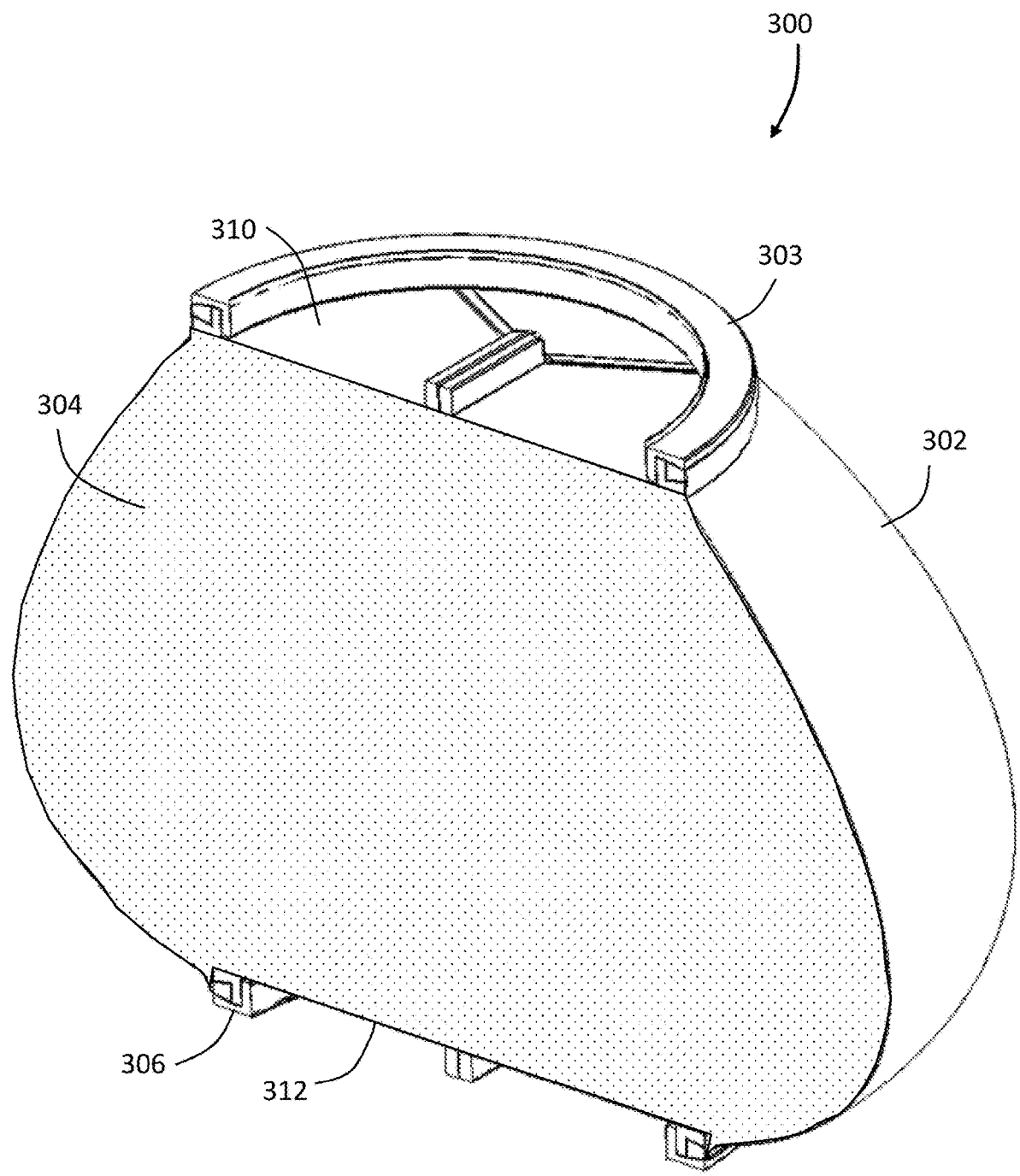
FIG. 7 is a perspective sectional view of the replaceable media module of FIG. 3.
Figure 8:
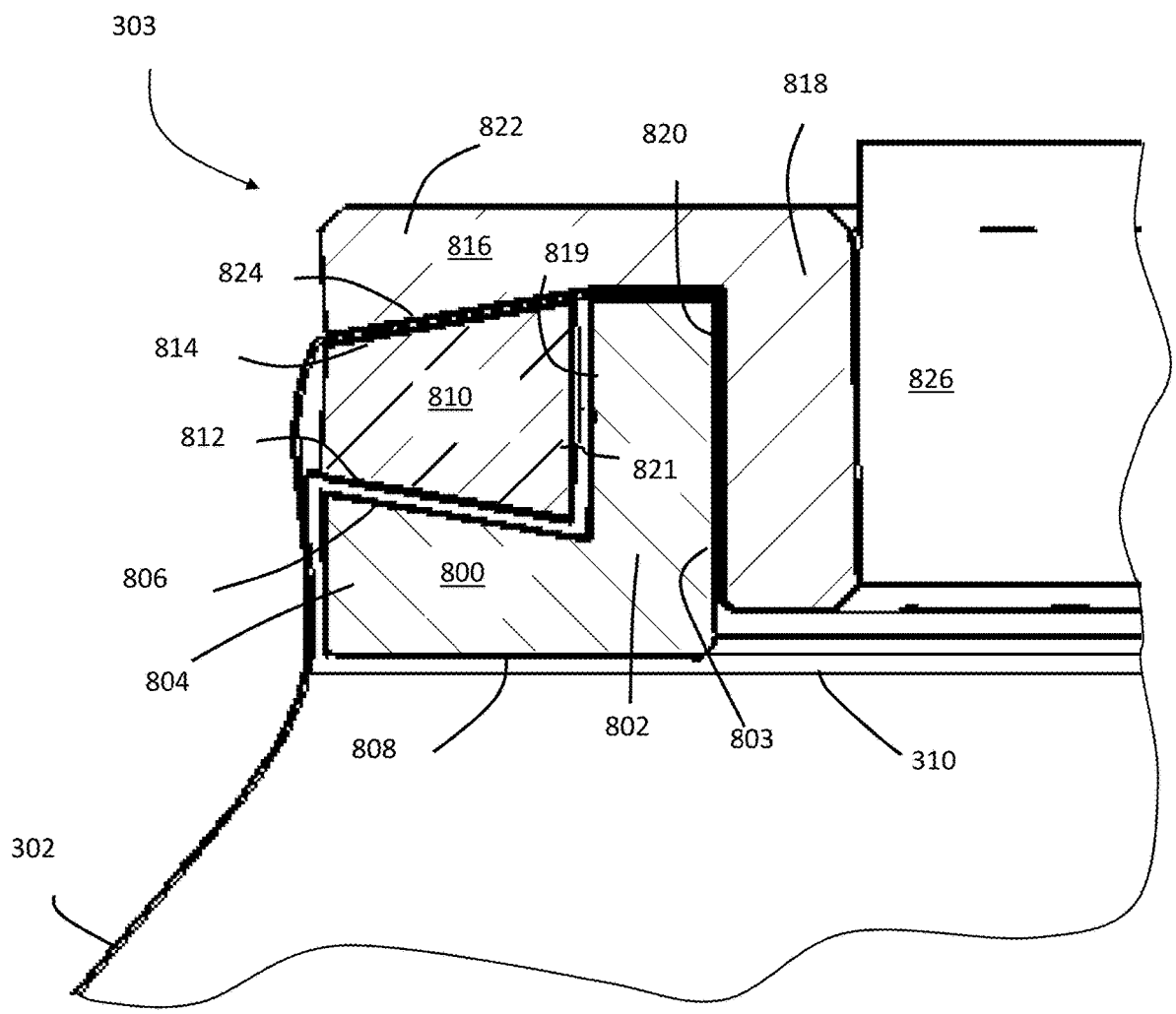
FIG. 8 is an enlarged sectional view of the ring assembly of the replaceable media module of FIG. 3.

During test 6b, the system 100 of FIG. 1 was the pure water system used is Applicant's commercially available HydroPower® system, which includes a static diffuser and further included the replaceable media module 300 of FIG. 3.

Thus, the seven tests performed compare the results of a container from the aforementioned U.S. patent application Ser. No. 14/684,071 (Tests 1, 1a, 1b), a container described in the aforementioned U.S. Patent Application Ser. No. 62/468,167 (Tests 3, 3b), a replaceable media module 1900 with an integrated diffuser on the inlet side (Test 5b), and a replaceable media module 300 (Test 6).

During the tests, the purification media was a mixed bed resin of a color changing resin commercially available from Purolite®. During Tests 1a, 2a, and 3, the media was a mixed bed resin of a color changing resin commercially available from Resin Tech, Inc. sold as part number MBD30. In all tests, the fresh or un-used color changing resin has a dark (e.g. purple) color that lightens to a light (e.g., yellow) color when depleted or used. It is noted that the darker yellow regions in the figures do not represent different resin usage, but rather is an indication of water saturation.

Water of a known particulate level, namely 400 parts per million (ppm), was fed to the systems at a known flow rate of about 6 liters per minute. Since it is impossible to dictate the quality of the incoming water, the water used during the tests was controlled to 400 ppm using known chemical injection techniques that combines tap water with a mixture of 4 parts calcium chloride and 1 part magnesium sulfate.

Water exiting the systems was tested for its particulate load with the test being stopped when the media within the system was no longer able to provide water of a desired particulate level, in this case 20 ppm and the data analyzed to provide results at 10 ppm and 20 ppm. The water flow was then stopped and system was placed in a freezer to freeze the resin of media in position. After frozen, the systems were cut away to provide the media in a solid mass (FIGS. 22A, 23A, 24A, 25A). These solid masses were then sectioned at regular intervals, namely into six intervals in FIGS. 22B-24G, FIGS. 23B-25G, FIGS. 24B-24G and FIGS. 25B-25G, respectively.

It is noted that the sections were approximately defined at the common locations along the flow direction such that FIG. 22B, FIG. 23B, FIG. 24B and FIG. 25B each represent approximately a common location, FIG. 22C, FIG. 23C, FIG. 24C and FIG. 25C each represent approximately a common location, and so on. In this way, comparison of the resin usage can be seen by visual comparison of the test results at these common locations.

It is also noted that the testing in all of these tests include normal variations that can be expected when measuring the removal of solids from running water on an ionic basis. The testing was performed to minimize differences by holding constant attributes such as, but not limited to, resin type/lot, incoming water quality, flow rates, and others.

Figure 22G:
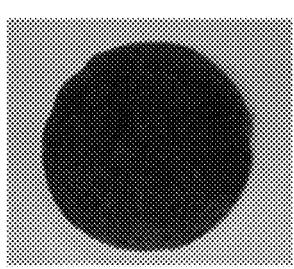
FIG. 22A-22G are images of a resin usage test using a water purification device described in U.S. patent application Ser. No. 14/684,071.
Figure 22F:
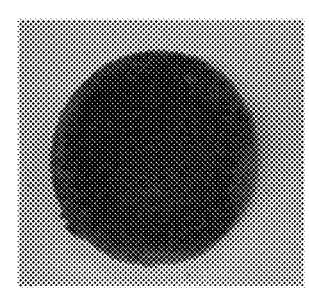
Figure 22E:
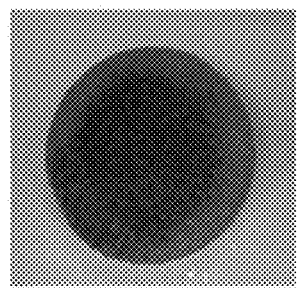
Figure 22D:
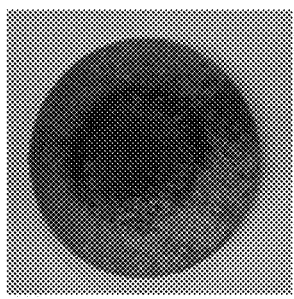
Figure 22C:
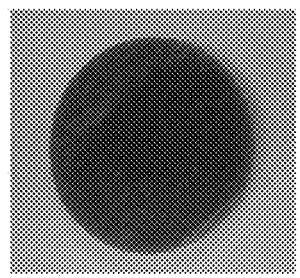
Figure 22B:
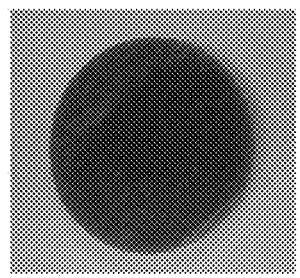
Figure 22A:
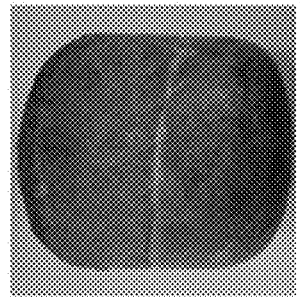

FIG. 22A illustrates the prior art media as a solid mass of frozen media after completion of Test 1b and before being sectioned. FIGS. 22B-22G show the solid mass of media after completion of Test 1b and in sectioned form. Here, FIG. 22B represents sections at the bottom of the solid mass, namely where the test water entered the container. Conversely, FIG. 22G represents the section of the frozen media at the top of the solid mass, namely where the test water exited the container. Thus, the flow direction (F) of water through the media during Test 1b was from the bottom (FIG. 24B) to the top (FIG. 24G).

It can be seen that the media utilization when the container described in the aforementioned U.S. patent application Ser. No. 14/684,071 and the prior art static diffuser plate in FIG. 22B-FIG. 22G initially results all media being spent in the first section of FIG. 22B, with a ring of unspent media in the second section of FIG. 22C, followed by a circular dark (purple) circle of unspent media throughout the center section and the light (yellow) outer rim of spent media in the next two sections of FIGS. 22D-22E, and then by increasing amounts of unspent media remaining in the four upper sections of FIGS. 22F-22G with not enough absorption of the media having occurred at the water exit so as to perceptably change the color of the media.

From FIG. 26, it can be seen that Test 1a/1b provided between 258-273 liters of 10 ppm water and 299-305 liters of 20 ppm water. Again, changes in the amount of purified water between Test 1 and Test 1b are attributed to differences such as, but not limited to, the resin being tested, water being tested, and equipment used.

FIG. 23A illustrates media as a solid mass of frozen media after completion of Test 3b and before being sectioned. FIGS. 23B-23G show the solid mass of media after completion of Test 3b and in sectioned form. Here, FIG. 23B represents sections at the bottom of the solid mass, namely where the test water entered the container. Conversely, FIG. 23G represents the section of the frozen media at the top of the solid mass, namely where the test water exited the container. Thus, the flow direction (F) of water through the media during Test 3b was from the bottom (FIG. 23B) to the top (FIG. 23G).

It can be seen that the media utilization when using integral controller 1916 of the present application initially results in all media being spent in the first three sections of FIGS. 23B-23D, followed by increasing amounts of unspent media remaining in the three upper sections FIG. 23E-23G with not enough absorption of the media having occurred at the water exit so as to perceptably change the color of the media.

From FIG. 26, it can be seen that Test 3/3b provided between 310-324 liters of 10 ppm water and between 352-364 liters of 20 ppm water. Comparing Test 3b to Test 1b, it can be seen that the integral diffuser provided about 14% more purified water at 10 ppm and about 18% more at 20 ppm then the static diffuser of the prior art.

Figure 24E:
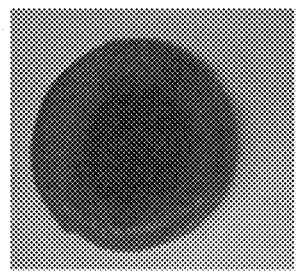
FIG. 24A-24G are images of a resin usage test using the replaceable media module of FIG. 19.
Figure 24F:
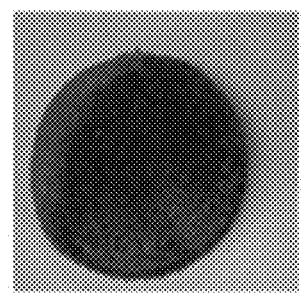
Figure 24G:
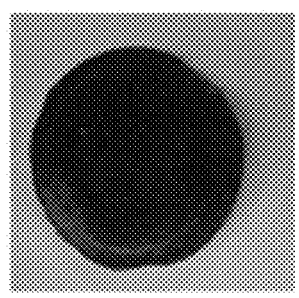
Figure 24B:
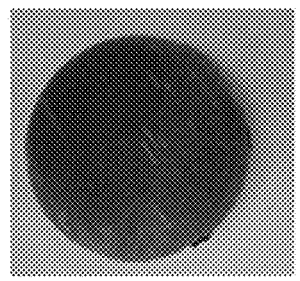
Figure 24C:
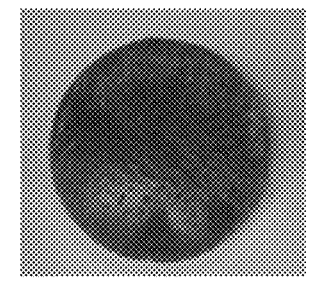
Figure 24D:
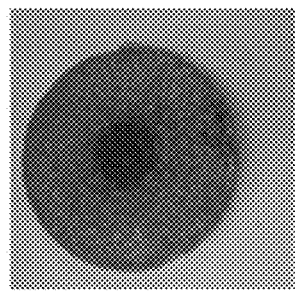
Figure 24A:
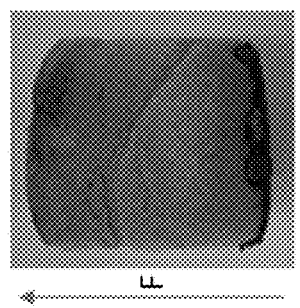

FIG. 24A illustrates media as a solid mass of frozen media after completion of Test 5b and before being sectioned. FIGS. 24B-24G show the solid mass of media after completion of Test 5b and in sectioned form. Here, FIG. 24B represents sections at the bottom of the solid mass, namely where the test water entered the container. Conversely, FIG. 24G represents the section of the frozen media at the top of the solid mass, namely where the test water exited the container. Thus, the flow direction (F) of water through the media during Test 5b was from the bottom (FIG. 24B) to the top (FIG. 24G).

It can be seen that the media utilization when using replaceable media module 1900 of the present application initially results in all media being spent in the first three sections of FIGS. 24B-24D, followed by increasing amounts of unspent media remaining in the three upper sections FIG. 24E-24G. A portion of the purification media in FIG. 24G at the water exit is also spent.

From FIG. 26, it can be seen that Test 5b provided 348 liters of 10 ppm water and 382 liters of 20 ppm water. Comparing Test 5b to Test 1b, it can be seen that the module 1900 provided about 27% more purified water at 10 ppm and about 28% more at 20 ppm then the static diffuser of the prior art.

FIG. 25A illustrates media as a solid mass of frozen media after completion of Test 6b and before being sectioned. FIGS. 25B-25G show the solid mass of media after completion of Test 6b and in sectioned form. Here, FIG. 25B represents sections at the bottom of the solid mass, namely where the test water entered the container. Conversely, FIG. 25G represents the section of the frozen media at the top of the solid mass, namely where the test water exited the container. Thus, the flow direction (F) of water through the media during Test 6b was from the bottom (FIG. 25B) to the top (FIG. 25G).

It can be seen that the media utilization when using the replaceable media module 300 of the present application initially results in all media being spent in the first four sections of FIGS. 25B-25F, with not enough absorption of the media having occurred at the water exit (FIG. 25G) so as to perceptably change the color of the media.

From FIG. 26, it can be seen that Test 6b provided 333 liters of 10 ppm water and 367 liters of 20 ppm water. Comparing Test 6b to Test 1b, it can be seen that the module 300 provided about 22% more purified water at 10 ppm and about 23% more at 20 ppm then the static diffuser of the prior art.

It should be appreciated from the images of FIGS. 22A-25G and FIG. 26 that the module 300 and module 1900 both provide increased utilization of the purification media and also provide improved performance over earlier purification media configurations. Thus, an operator of the system 100 would be able to obtain additional operating time and reduced costs when compared to earlier configurations.

Referring now to FIG. 27, another embodiment is shown of a fluid purification system 2700. The system 2700 is similar to the system 100 of FIG. 1 in having a base 102 that supports a tank 104. The open end of the tank 104 is enclosed by a cover assembly 2702 that includes a handle member 2704 and a top cap 2706. An outlet port 2708 is coupled to the top cap 2706. The cover assembly 2702 may be coupled to the tank 104 via a plurality of radial pins 105 (FIG. 1) that engage slots (not shown) on an inner diameter of the top cap 2706. In an embodiment, the cover assembly 2702 couples to the tank 104 in the same manner described in commonly owned U.S. patent application Ser. No. 14/684,071 filed on Apr. 10, 2015, the contents of which is incorporated by reference herein.

Figure 29:
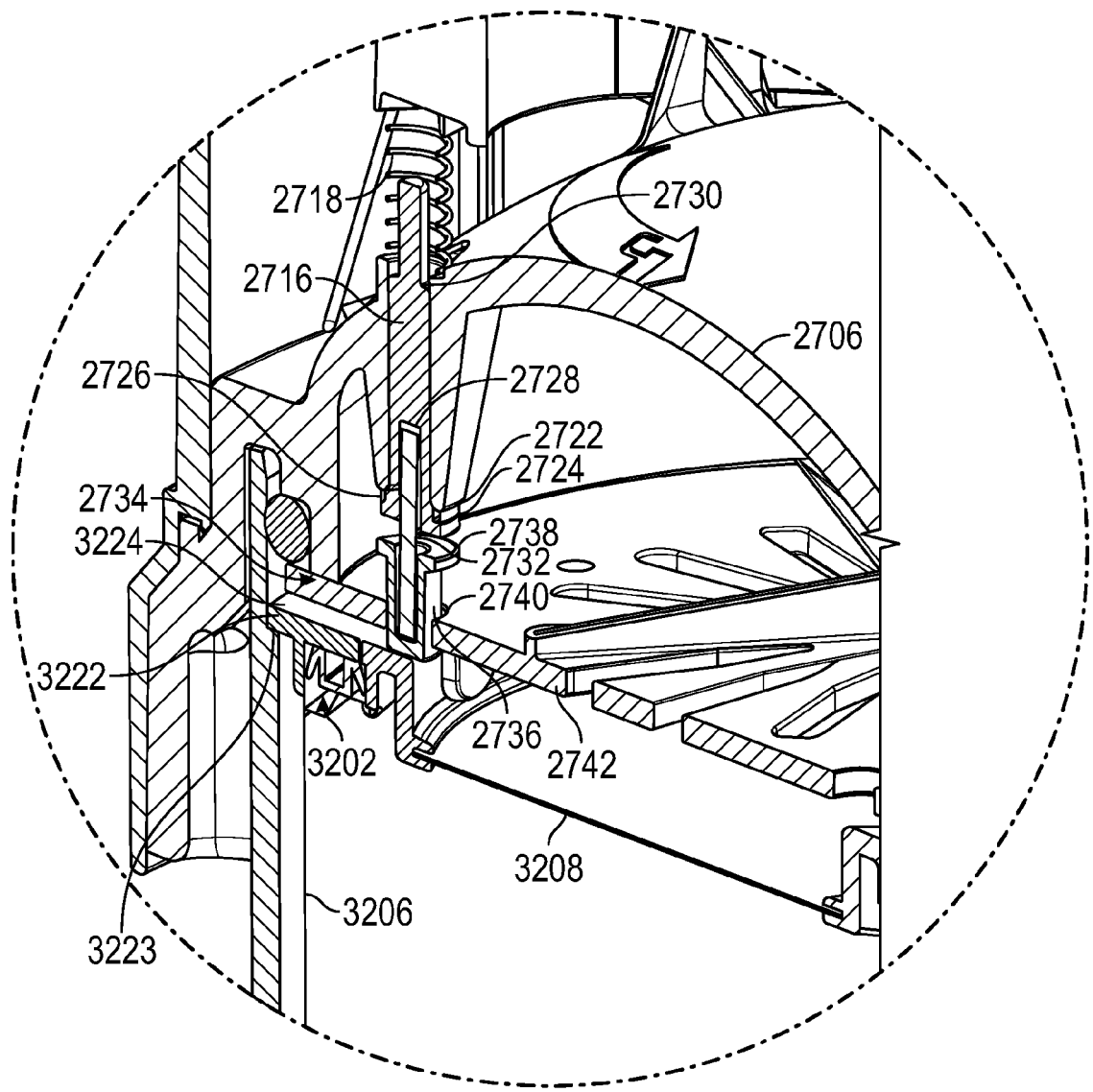
FIG. 29 is an enlarged view of a portion of the fluid purification device illustrated in FIG. 28.

In this embodiment, a release assembly 2710 is coupled to the top cap 2706. The release assembly 2710 includes a lever 2712, a pivot axis 2714, a pressure releasing plunger 2716, a biasing member 2718, and a locking arm 2720. Lever 2712 is secured to top cap 2706 for pivoting movement by pivot axis 2714. Biasing member 2718 normally biases lever 2712 to a first position (shown). In the illustrated embodiment, the biasing member 2718 extends between the underside of the lever 2712 and a shoulder 2730 (FIG. 29) on the plunger 2716. When the replaceable media module is disposed within the tank 104, the plunger 2716 is seated against a sealing surface 2722 of top cap 2706 as shown in FIGS. 28-30. In this position, the locking arm 2720 is arranged to extend through the top cap 2706 into slot to form a fluid tight connection as is described in the aforementioned U.S. patent application Ser. No. 14/684,071. In some embodiments, a seal 2724 may be disposed between a shoulder/end 2726 and the surface 2722 to assist in sealing the plunger 2718 against surface 2722 in the fluid tight manner.

Figure 34:
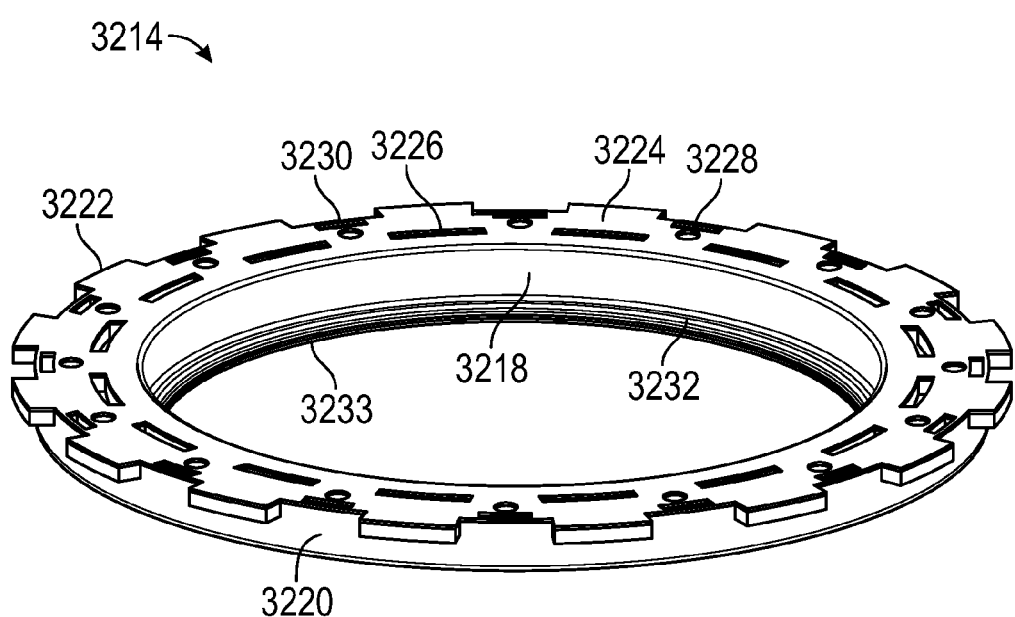
FIG. 34 is a top perspective view of a first ring for the replaceable media module of FIG. 33.
Figure 35:
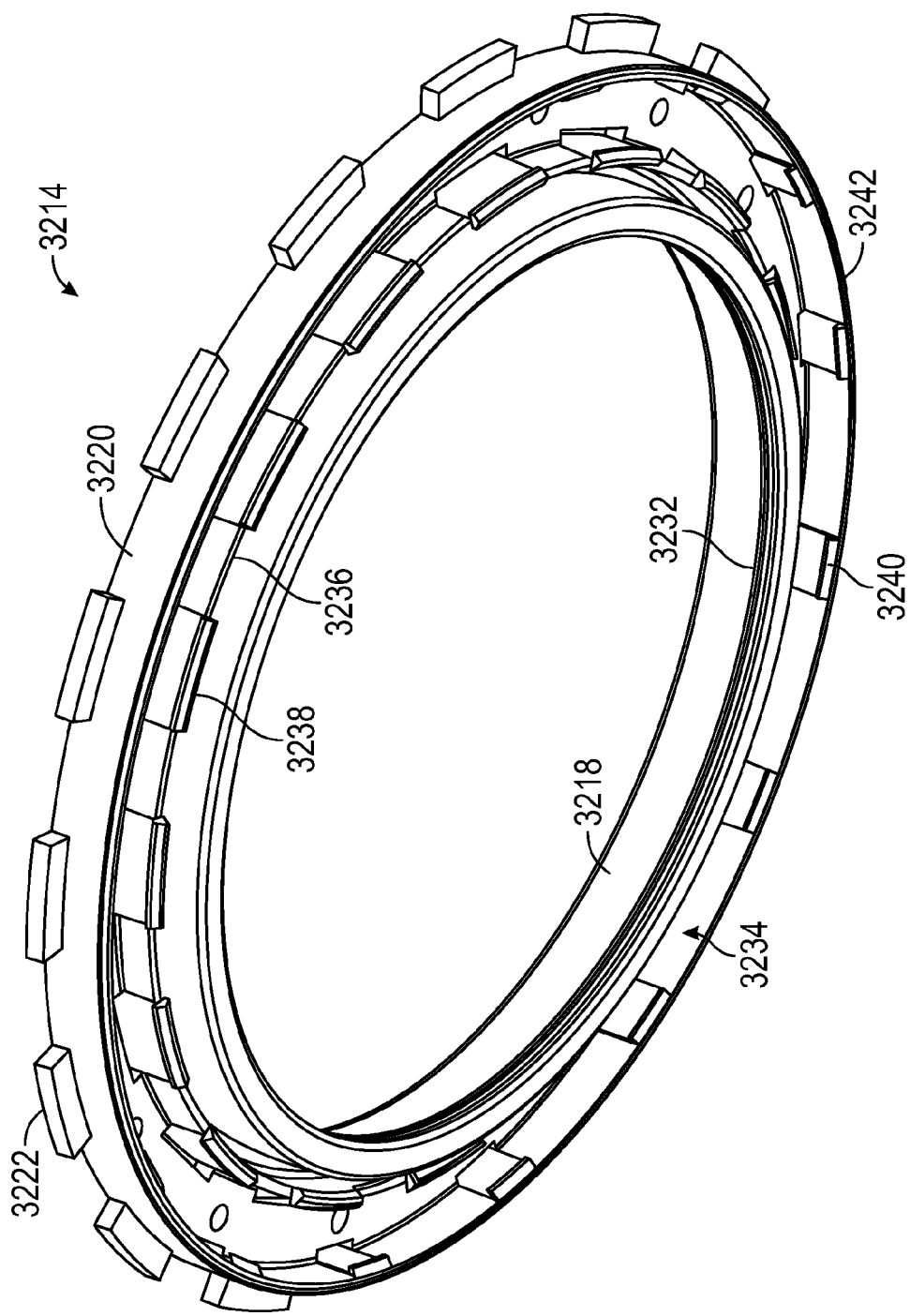
FIG. 35 is a bottom perspective view of the first ring of FIG. 34.

An opposite end 2726 of plunger 2716 includes a blind hole 2728 sized to receive a biasing member 2732 that extends between the plunger 2716 and an actuator 2734. The actuator 2734 includes a body 2736 and a shoulder 2738. In an embodiment, the actuator 2734 has a blind hole extending from the shoulder 2738 into the body 2736 that is sized to receive the biasing member 2732. The body 2736 is sized to extend through an opening 2740 in diffuser element 2742. The diffuser element 2743 may be similar to diffuser 1412 described herein above. In an embodiment, the diffuser element 2742 may include a flange 2745. The flange 2745 extends towards the tank 104 and is semi-circular in shape. The curvature of the flange 2745 has a center proximately aligned with the centerline of the tank and has a radius sized to interact with the inner wall 3218 (FIG. 34) of the first ring 3214. In this embodiment, the flange 2745 assists in centering the ring assembly of the replaceable media module. Further, in some embodiments, the height of the flange 2745 is sized to prevent or reduce the risk of damaging the actuator 2734. In an embodiment, the diffuser element 2742 may include multiple flanges 2745.

Further, it should be appreciated that while the diffuser element 2743 is illustrated as having open slots, this is for exemplary purposes and the claims should not be so limited. In other nonlimiting embodiments, a mesh material may be disposed across the slots. In another nonlimiting embodiment, the slots may be replaced with a large diameter (circular) hole extending through the diffuser. In an embodiment, the diameter of the hole will be radially inward from the actuator 2734. In still another nonlimiting embodiment, the circular hole may be covered by a mesh. In an embodiment, the mesh material is sized to substantially prevent purification media from flowing therethrough. In an embodiment, the mesh has an opening or pore size of between 10-400 microns (US Standard Mesh No. 850-US Standard Mesh 45). In another embodiment, the mesh has an opening or pore size between 50-300 microns (US Standard Mesh No. 270-US Standard Mesh 50). In an embodiment, the mesh material may be made from any suitable porous, relatively stiff/nonflexible material, such as but not limited to fabrics, plastics (e.g. polypropylene, nylon, etc.) or metal for example.

Figure 30A:
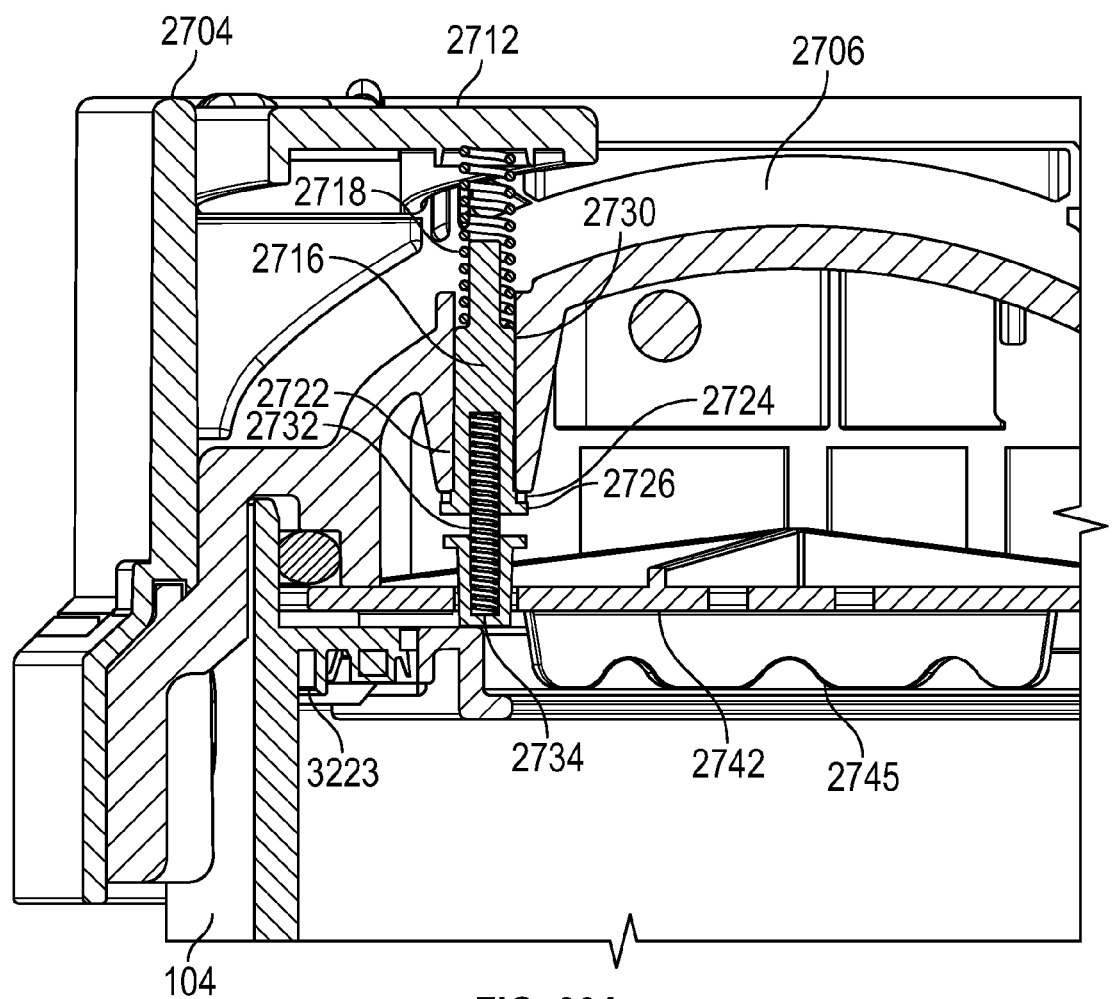
FIG. 30A is a partial side sectional view of the fluid purification device of FIG. 27 with the air vent in a closed position.

The biasing member 2732 biases the actuator 2734 away from the plunger 2716 into the opening 2740. When the replaceable media module is properly installed within the tank 104, a bottom end (i.e. end opposite the biasing member 2732) contacts a top surface 3224 of a ring member 3214 of the replaceable media module. This compresses the biasing member 2732 resulting in the shoulder of plunger 2716 seating against surface 2722 as is shown in FIG. 29 and FIG. 30A. In this position, plunger 2716 prevents or mitigates pressure within system 2700 from escaping through release assembly 2710 and locking arm 2720 prevents or mitigates radial pins 105 from inadvertently being withdrawn from the slots in the top cap 2706. In an embodiment, when locking arm 2720 extends into a slot in the top cap 2706, a side of the locking arm 2720 abuts a locking pin to prevent the pin from being withdrawn from the slot.

Application of downward pressure on lever 2712 at an end adjacent plunger 2716 causes the biasing member 2718 to compress and apply a force on the shoulder 2730 and causes the lever 2712 to pivot about pivot axis 2714 to a second position (not shown). In the second position, the force from biasing member 2718 on plunger 2716 overcomes the force applied to the plunger 2716 by biasing member 2732 causing the plunger end 2726 to move away from the surface 2722 a distance sufficient to allow pressure to vent from within system 2700. In an embodiment, locking arm 2720 also moves upward away from the slots in top cap 2706 a distance sufficient to allow radial pins 105 to be withdrawn from the slots on the inner diameter of the top cap 2706 allowing the cover assembly 2702 to be removed from the tank 104.

Figure 30B:
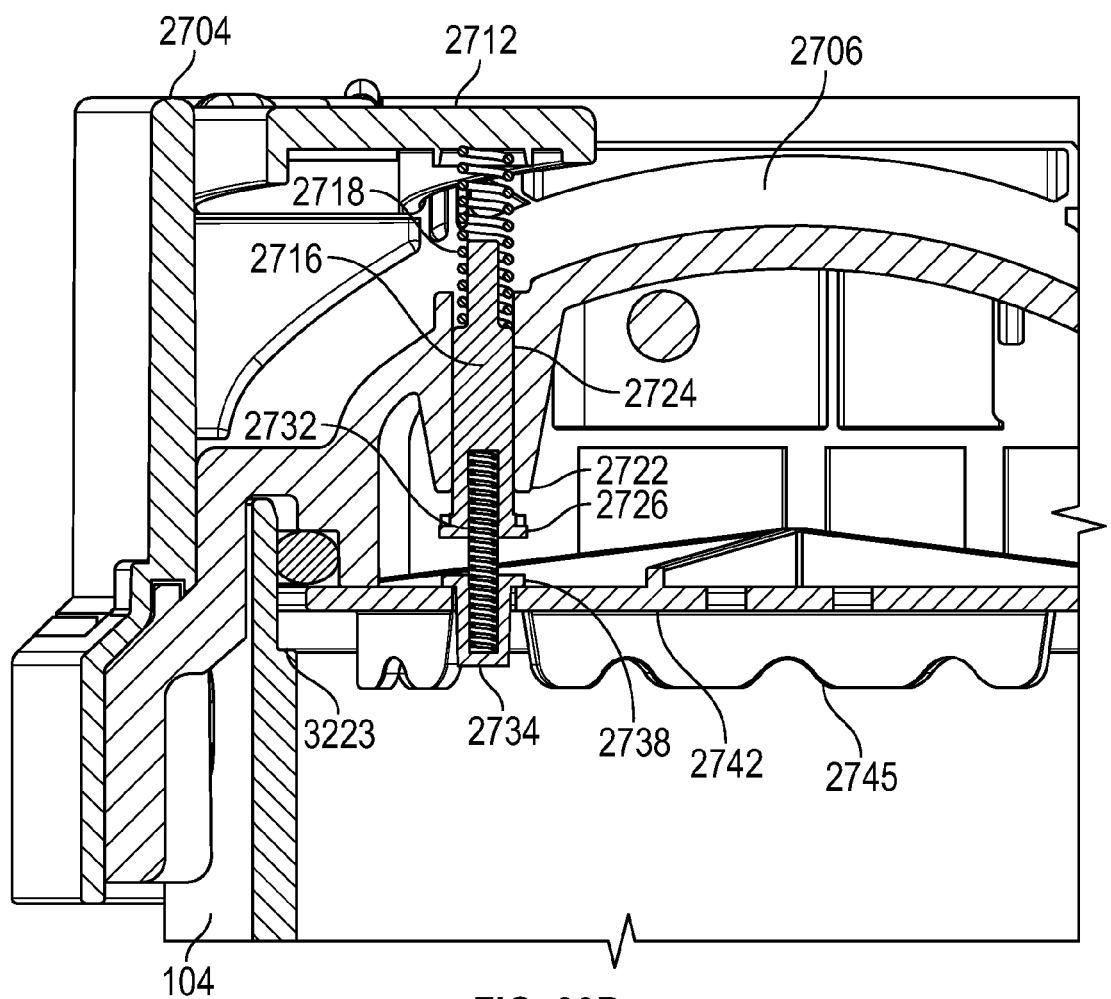
FIG. 30B is a partial side sectional view of the fluid purification device of FIG. 27 with the air vent in an open position.

It should be appreciated that it is undesired to operate the system 2700 without a replaceable media module in place. Operating in such a matter would allow the operator to believe they are using pure water when they are not. Referring now to FIG. 30B, the operation of the release assembly 2702 is shown when a replaceable media module is not present. When the replaceable media module is not present, the biasing member 2732 applies a force to the actuator 2734 moving the shoulder 2738 against the top surface of diffuser element 2742 (FIG. 30A). It should be appreciated that the plunger 2716 is disposed between and supported by the biasing members 2718, 2732, as a result the plunger 2716 floats between the two biasing members 2718, 2732. As result, when the biasing member 2732 biases the actuator 2734 towards the diffuser element 2742, the plunger 2716 also moves, under the biasing force of biasing member 2718, towards the diffuser element 2742 to create a gap between the end 2726 and the surface 2722. It should be appreciated that when the replaceable media module is not present, the plunger moves to an open position (i.e. the end 2726 is apart from the surface 2722). It should be appreciated that while the illustrated embodiment shows the seal 2724 as moving with the plunger 2716, in other embodiments, the seal 2724 is coupled to the surface 2722. As a result, if the system 2700 is operated and fluid is applied to the inlet port 106, air and then fluid will escape through gaps between the plunger 2716 and the sidewall 2744 in the opening in the top cap 2706 that the plunger 2716 extends through. This allows air and/or fluid to escape from the system 2700 alerting the operator that there is an issue.

In an embodiment, the biasing member 2732 will have a higher spring rate than the biasing member 2718 by a small margin and will also be under less compression. As a result, when the replaceable media module 3200 (FIG. 32) is not installed biasing member 2732 will bias or push the actuator 2734 downward (e.g. towards the base), while biasing member 2718 will push downward on the plunger 2716 keeping the plunger 2716 open, and resistant to water pressure, even with the lever 2712 in the first position. When the replaceable media module 3200 is installed. The biasing member 2732 will overcome some of the force applied by biasing member 2718 on the plunger 2716 and force the plunger 2716 upwards (e.g. towards the lever 2712), creating a seal between the end 2726 and the surface 2722). It should be appreciated that when the lever 2712 is depressed, the force applied by biasing member 2718 will overcome the force from biasing member 2732 to move the plunger 2716 to an open position with the end 2726 spaced apart from the surface 2722, and there is enough stroke (gaps between plunger 2716 and the surface 2722) to allow the lever to open the lock and release pressure. In the illustrated embodiment, the biasing members 2718, 2732 are made from stainless steel.

Referring now to FIGS. 31A-31E, an embodiment of another valve assembly 3100 for use with the release assembly 2710. In this embodiment, the valve assembly 3100 includes an upper valve member 3102, a lower valve member 3104, and a biasing member 3106. The valve assembly 3100 is at least partially disposed within a bore 3108 in the top cap 2706. The bore 3108 is sized to provide a gap between the sidewall of the bore 3108 and the outer surface of the body 3110 of the upper valve member 3102. A seal 3112 is arranged between a shoulder 3114 and a surface 3116 to seal the gap between the body 3110 and the surface of the bore 3108 when the valve assembly 3100 is in the closed position.

The upper valve member 3102 includes a central bore sized to receive the biasing member 3106. The central bore includes a tapered or conical surface 3122 is arranged adjacent the shoulder 3114. The biasing member 3106 is disposed in the central bore between an end portion 3118 and a shoulder 3120 on the end of a body portion 3126 of the lower valve member 3104. In the illustrated embodiment, the biasing member 3106 is a compression spring that biases the lower valve member 3104 away from the upper valve member 3102.

The lower valve member 3104 includes a projection 3124 that extends from the shoulder 3120 and is sized to fit within the biasing member 3106. The body portion 3126 is sized to fit within the central bore of the upper valve member 3102 and provide a gap therebetween. The body 3126 further includes a slot sized to receive a seal 3129, such as an o-ring. The slot is positioned such that when the valve assembly 3100 is in a closed position, with the replaceable media installed (FIG. 31F), the seal 3129 will sealingly engage the conical surface 3122. The lower valve member 3104 includes a flange 3128 with an engagement member 3130 extending therefrom. The flange 3128 is arranged on an opposite end of the body portion 3126 from the projection 3124. The flange 3128 is disposed within an opening 3131 defined by an optional wall 3132 that extends from a top or end surface of the diffuser element 2742. In other embodiments (FIG. 31C), the opening is a recess in the diffuser element 2742) The opening 3131 includes a hole sized to allow the engagement member 3130 to extend therethrough. The flange 3128 contacts the bottom surface of the opening 3131 and stops the travel of the lower valve member 3104 when the replaceable media module is not installed.

Figure 31A:
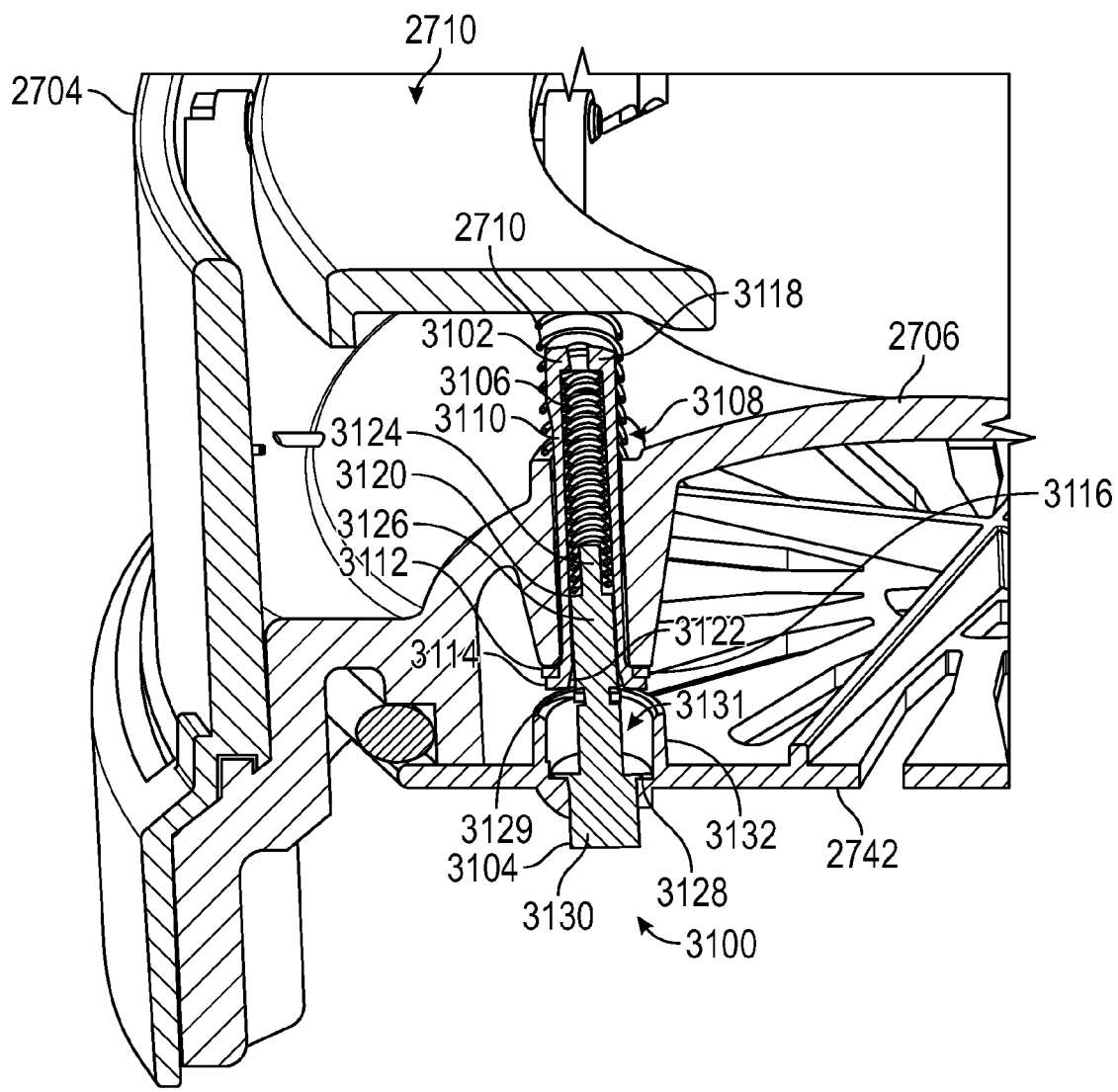
FIG. 31A-FIG. 31F are views of the fluid purification device of FIG. 24 with a vent assembly in accordance with another embodiment.
Figure 31B:
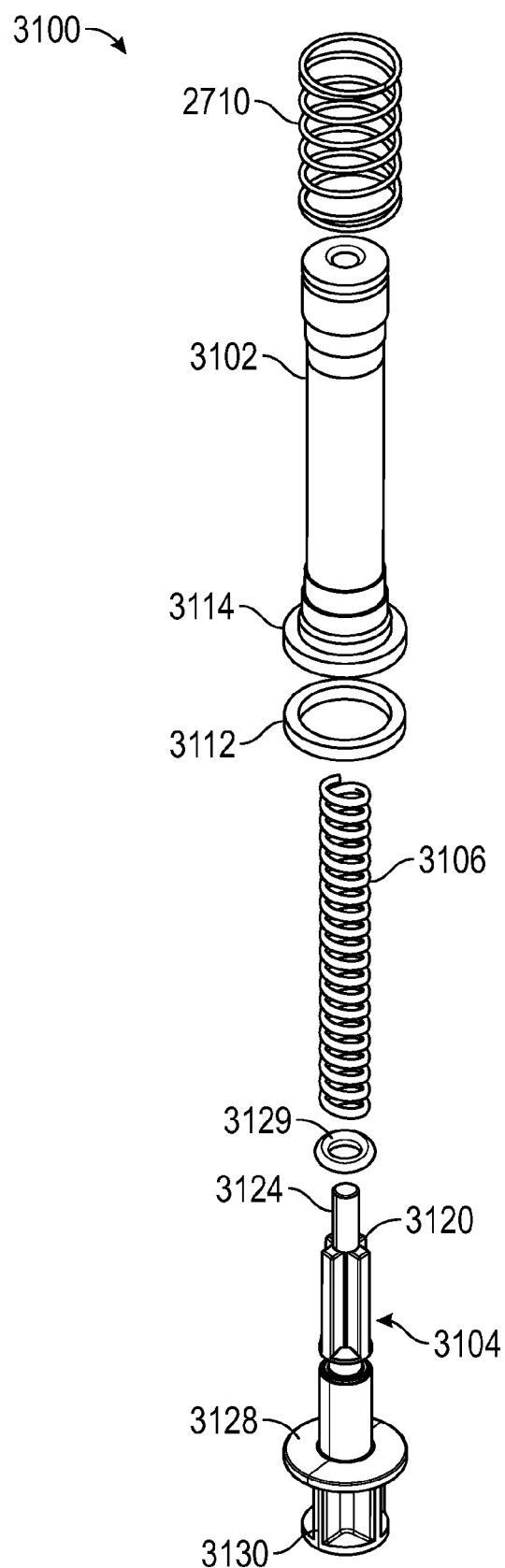
Figure 31C:
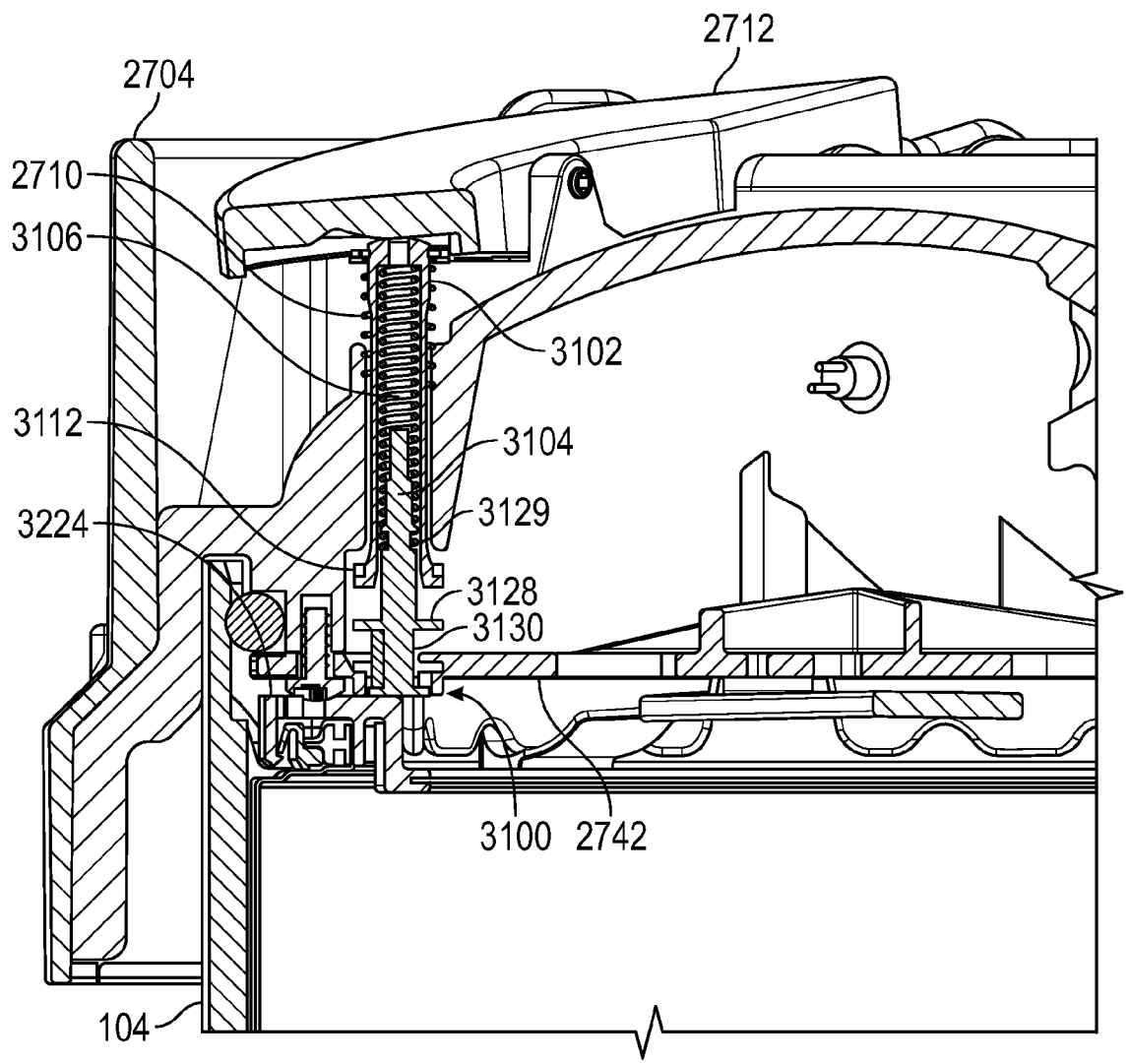
Figure 31D:
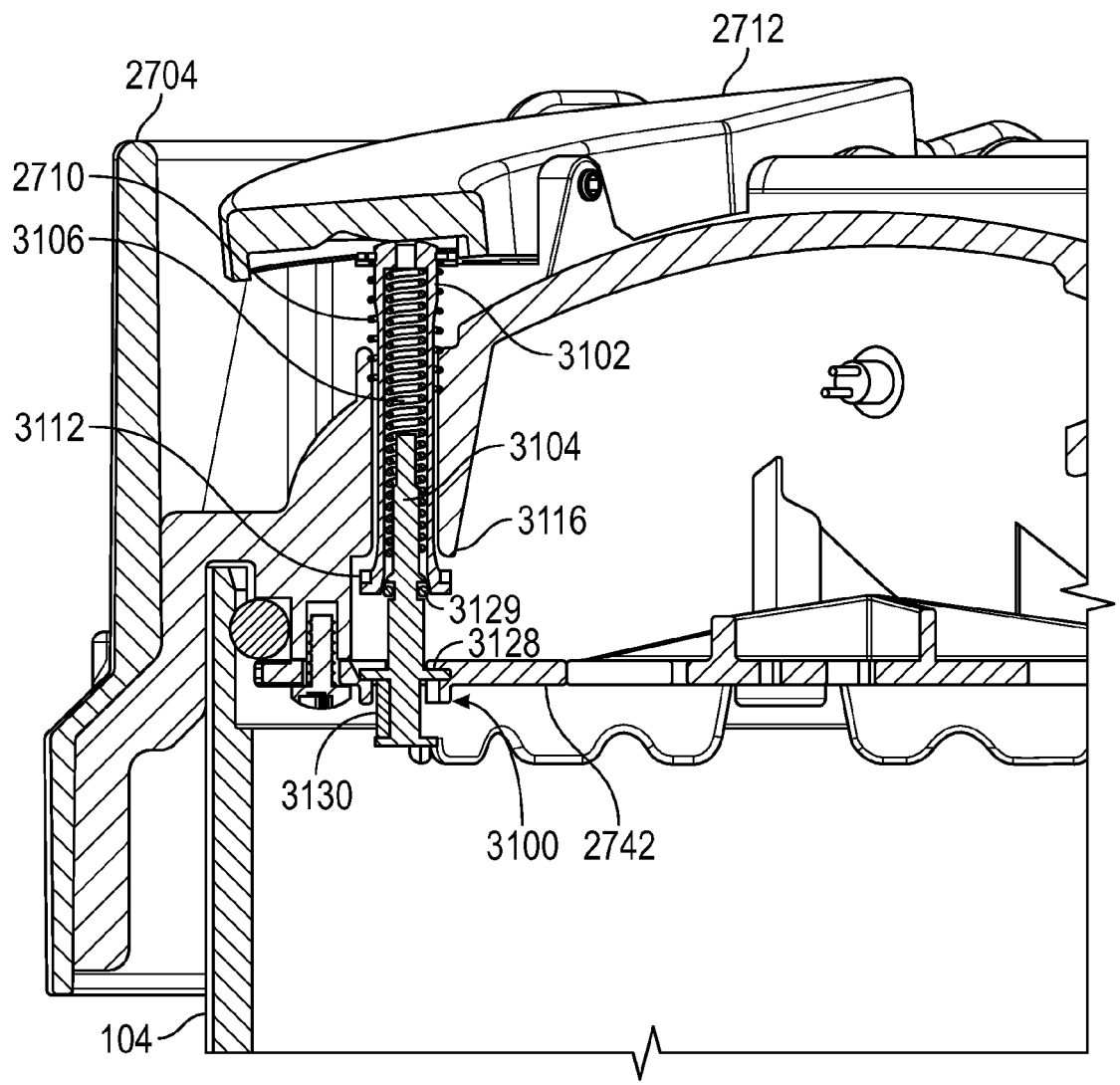
Figure 31E:
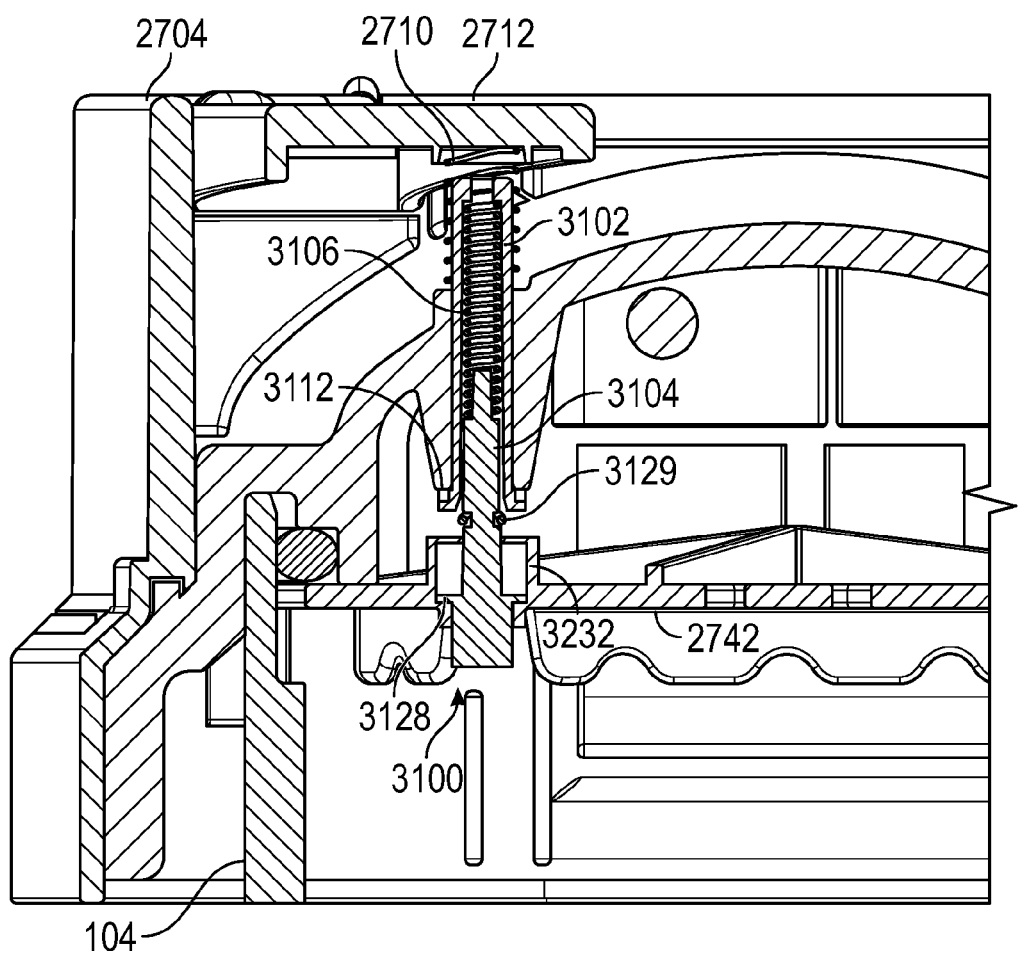
Figure 31F:
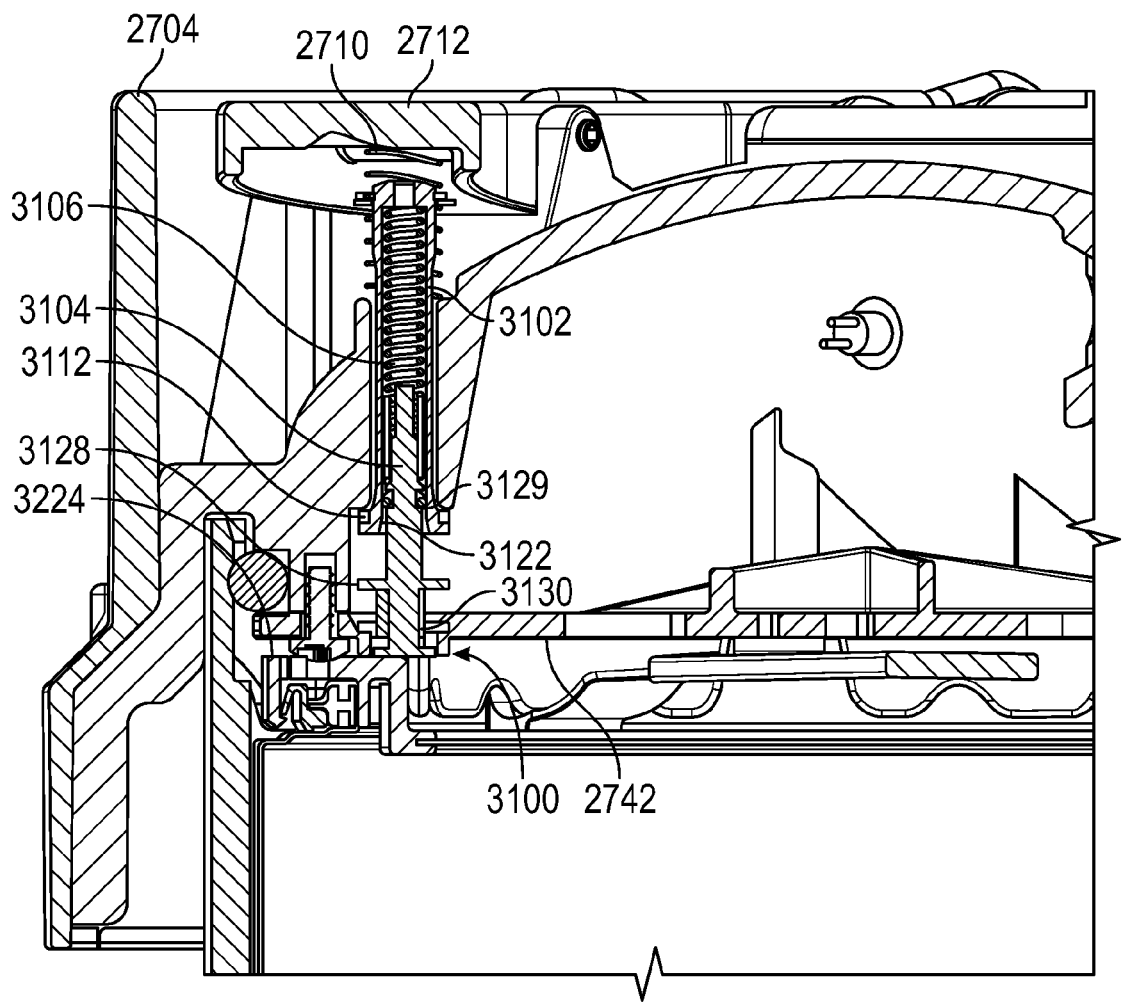

In operation, the valve assembly 3100 is configured to be positioned in one of four positions: unlocked/open (FIG. 31C); unlocked/open-no media module (FIG. 31D); closed/venting-no media module (FIG. 31E); and closed with media module (FIG. 31F). In the unlocked position (FIG. 31C) when the media container is installed in the tank 104, the operator actuates the lever 2712 causing it to pivot and overcome the biasing force of the spring 2710 and spring 3106. The under surface of the lever 2712 engages the end of the upper valve member 3102 causing the upper valve member 3102 to move towards the diffuser element 2742. As the upper valve member 3102 moves, the seal 3112 separates from the surface 3116, allowing any pressurized gas within the system 2700 to be released through the fluid path or gap between the body portion 3110 and the bore 3108, allowing the top cap 2704 to be removed.

It should be appreciated that pressure is released from within the tank 104 when the media container is not installed. Referring now to FIG. 31D, operation of the valve 3100 is shown where the media container is not positioned within the tank 104. In this mode of operation, when the operator actuates the lever 2712, the lever 2712 pivots to overcome the biasing force of springs 2710, 3106 to contact the upper valve member 3102. Further movement of the lever 2712 moves the upper valve member 3102 in a direction to separate the seal 3112 from the surface 3116. Since the media container is not installed, the movement of the upper valve member 3102 causes the biasing member 3106 to apply a force on the lower valve member 3104 causing the lower valve member 3104 to move. The movement of the lower valve member 3104 continues until the flange 3128 contacts the diffuser element 2742. It should be appreciated that in the illustrated embodiment, the seal 3129 may or may not engage with the upper valve member 3102 depending on how far the user depresses the lever 2710. As long as one of the fluid paths through the valve 3100 is open (e.g. the fluid path between the cover 2704 and the upper valve member, and a second fluid path between the first valve member 3102 and the second valve member 3104), the gas or liquid/fluid within the tank 104 may be released.

As discussed above, it is undesirable to operate the system 2700 without the replaceable media module. When the media module is not disposed within the hollow interior 108, and the lever 2712 is not being actuated by the operator, the valve assembly 3100 moves to the position shown in FIG. 31E. In this position, the biasing member 3106 biases the upper valve member 3102 towards the lever 2712 and the lower valve member 3104 towards the diffuser element 2742. The movement or travel of the upper valve member 3102 stops when the seal 3112 contacts the surface 3116. The movement or travel of the lower valve member 3104 stops when the flange 3128 contacts the diffuser element 2742 at the bottom of the opening 3131. It should be appreciated that in this position, the seal 3129 separates from the conical surface 3122 creating a fluid path between the body portion 3128 and the central bore of the upper valve member 3102. Thus, if the media module is missing from the system 2700, the tank 104 will vent and water will flow onto the top cap 2704 providing a visual indication to the user that the module needs to be installed even though the upper valve member 3102 is in a closed position with the seal 3112 engaging the surface 3116.

When the media module, such as media module 3200 for example, is installed, the valve assembly 3100 assumes the position shown in FIG. 31F. In this position, the engagement member 3130 contacts the top of the media module (e.g. surface 3224). As the top cap 2712 is placed on the system 2700, the lower valve member 3104 moves relative to the diffuser element 2742 causing the flange 3128 to separate from the diffuser element 2742. This compresses the biasing element 3106 causing the upper valve member 3102 to move towards the lever 2712 such that the seal 3112 engages the surface 3116. The lower valve member 3104 moves until the seal 3129 sealing engages the conical surface 3122. Thus, the gap between the body 3110 and the bore 3108 is sealed by the seal 3112 and the gap between the body portion 3126 and the central bore of upper valve member 3102 is sealed by the seal 3129. As a result, the valve assembly 3100 is closed and the system 2700 will operate in a normal manner.

Referring now to FIGS. 32-41, an embodiment is shown of a replaceable media module 3200. The module 3200 may be used in the system 2700 and is configured to cooperate with the release assembly 2710 to control the position of the piston 2716. The module 2700 includes a top ring assembly 3202, a bottom ring assembly 3204 and a first member 3206 disposed therebetween. The ends of the module 3200 are enclosed by a second member 3208 and a third member 3210 that are coupled to the first ring assembly 3202 and the second ring assembly 3204 respectively.

The first ring assembly 3202 includes a first ring 3214 coupled to a second ring 3216. The first ring 3214 includes an inner wall 3218 and an outer wall 3220. A plurality of radially extending projections 3222 extend from the outer wall 3220. In an embodiment, a top surface of the projections 3222 is coplanar with a top surface 3224 of the first ring 3214. The projections 3222 are sized to engage a lip 3223 (FIG. 29) on the tank 104 and maintain the first ring assembly at a desired position within the tank 104 (e.g. so that the actuator contacts the top surface of the first ring 3214). Further, the diameter of the inner wall 3218 is sized to allow the actuator 2734 to rest on the top surface 3224 when the replaceable media module 3200 is placed in the tank 104 and the cover assembly is installed.

In an embodiment, a plurality of first slots 3226 extend through the top surface 3224, the plurality of first slots 3226 being angularly equally spaced apart. In an embodiment, the center of each of the plurality of first slots is aligned with one of the projections 3222. In an embodiment a plurality of second slots 3228 extend through the top surface 3224. In an embodiment, the center of each of the plurality of second slots 3228 are aligned with the space between each of the projections 3222. As discussed in more detail herein, the slots 3226, 3228 are positioned to allow the forming of tabs 3238, 3240 when the first ring 3214 is formed by injection molding. In a further embodiment, a plurality of holes 3230 extend through the top surface 3224. In an embodiment, each of the plurality of holes 3230 are aligned with the one of the plurality of second slots 3228.

The inner wall 3218 includes a slot 3232 that extends about the circumference of the inner wall 3218. The slot 3232 is sized to receive the second member 3208. When received in the slot 3232, the second member 3208 encloses the opening defined by the first ring 3214. In an embodiment, the second member 3208 is a mesh material that is molded into the first ring 3214 when the first ring 3214 is fabricated. In an embodiment, the mesh material is sized to substantially prevent purification media from flowing therethrough. The mesh further provides consistent flow of water by reducing the resistance relative to the prior art. In an embodiment, the second member 3208 has an opening or pore size of between 10-400 microns (US Standard No. 850-US Standard Mesh 45). In another embodiment, the second member 3208 has an opening or pore size between 50-300 microns (US Standard Mesh No. 270-US Standard Mesh 50). In an embodiment, the mesh material may be made from any suitable porous, relatively stiff/nonflexible material, such as but not limited to fabrics, plastics (e.g. polypropylene, nylon, etc.) or metal for example.

The inner wall 3218 may include a radially extending lip 3233, that provides additional support for the second member 3208. The inner wall 3218 and the outer wall 3220 define a slot 3234 on a side opposite the top surface 3224. In an embodiment, the first slots 3226, the second slots 3228 and the holes 3230 extend from the top surface 3224 to the slot 3234. Disposed within the slot 3234 is a wall 3236 (FIG. 40), extending radially outward from the wall 3236 are a first plurality of tabs 3238. In an embodiment, each of the tabs 3238 are aligned with and disposed adjacent of one of the first slots 3226. In an embodiment, a plurality of second tabs 3240 extend radially inward from the inside surface of the outer wall 3220. In an embodiment, the second tabs 3240 include an edge aligned with the bottom surface 3242 of the outer wall 3220. In an embodiment, the second tabs are aligned with and adjacent the second slots 3228.

Figure 36:
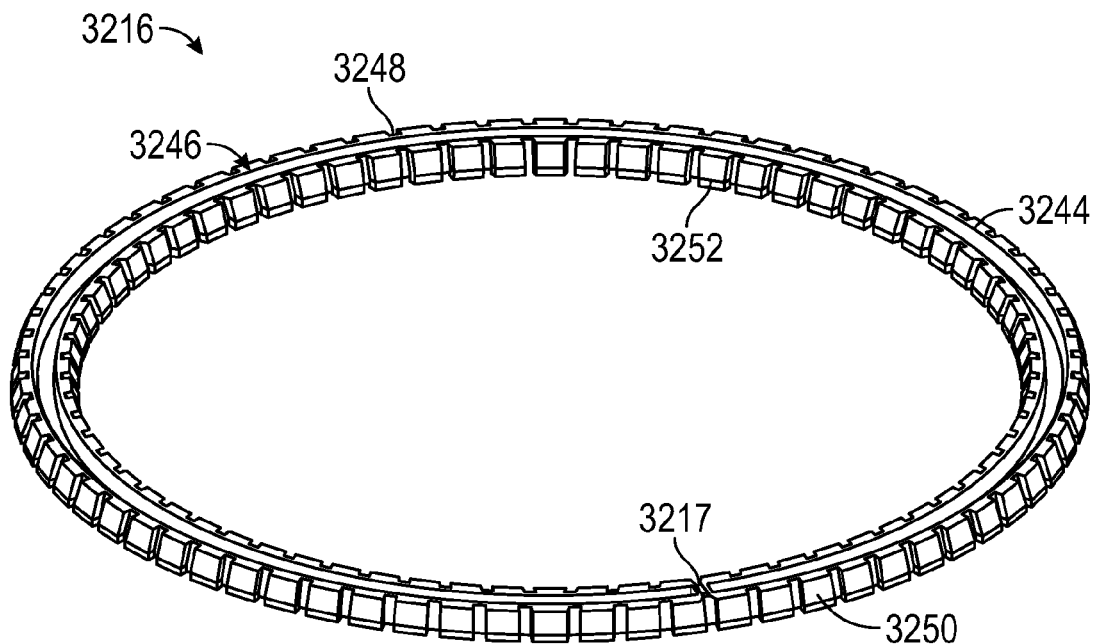
FIG. 36 is a top perspective view of a second ring for the replaceable media module of FIG. 33.
Figure 37:
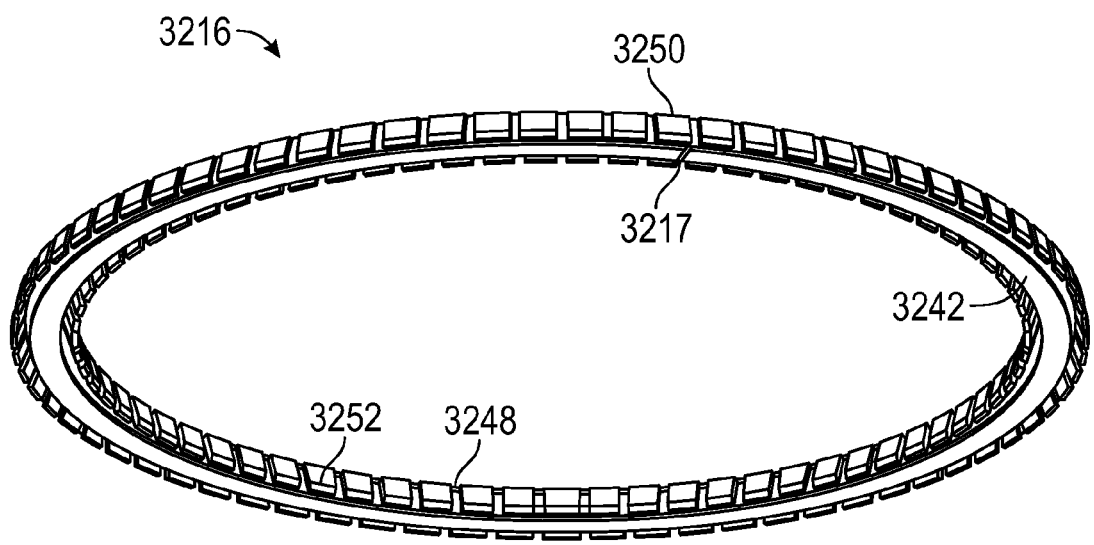
FIG. 37 is a bottom perspective view of the second ring of FIG. 36.
Figure 38:
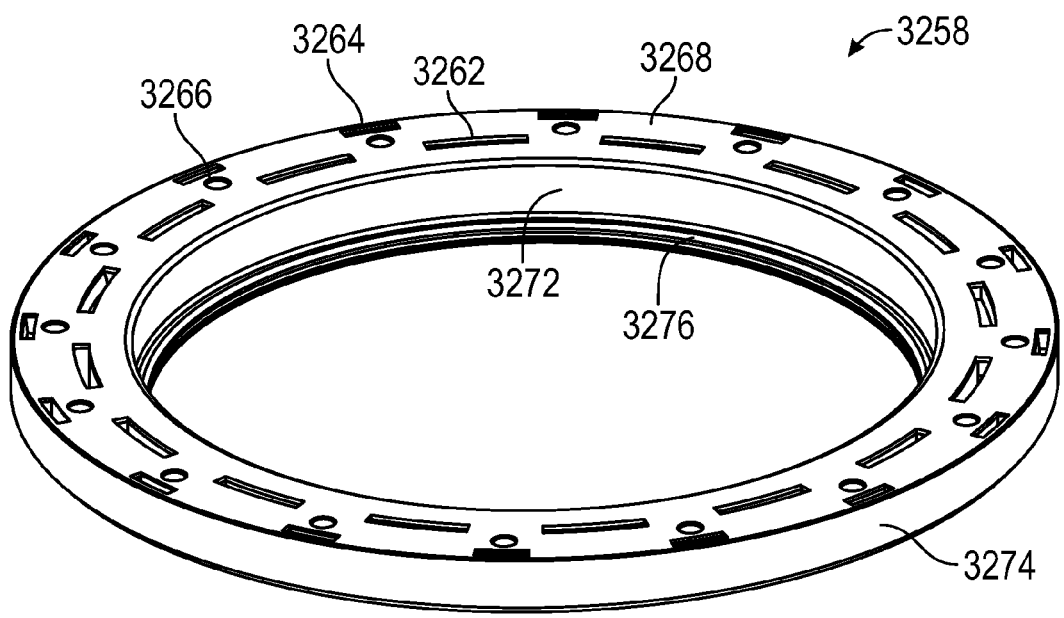
FIG. 38 is a top perspective view of a third ring for the replaceable media module of FIG. 33.
Figure 39:
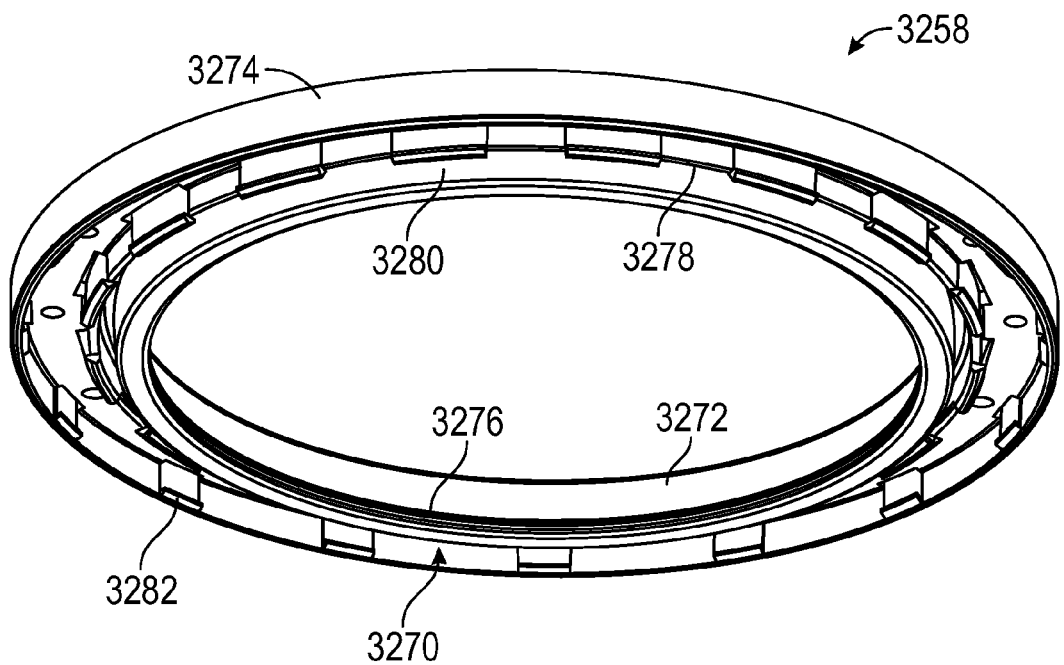
FIG. 39 is a bottom perspective view of the third ring of FIG. 38.
Figure 40:
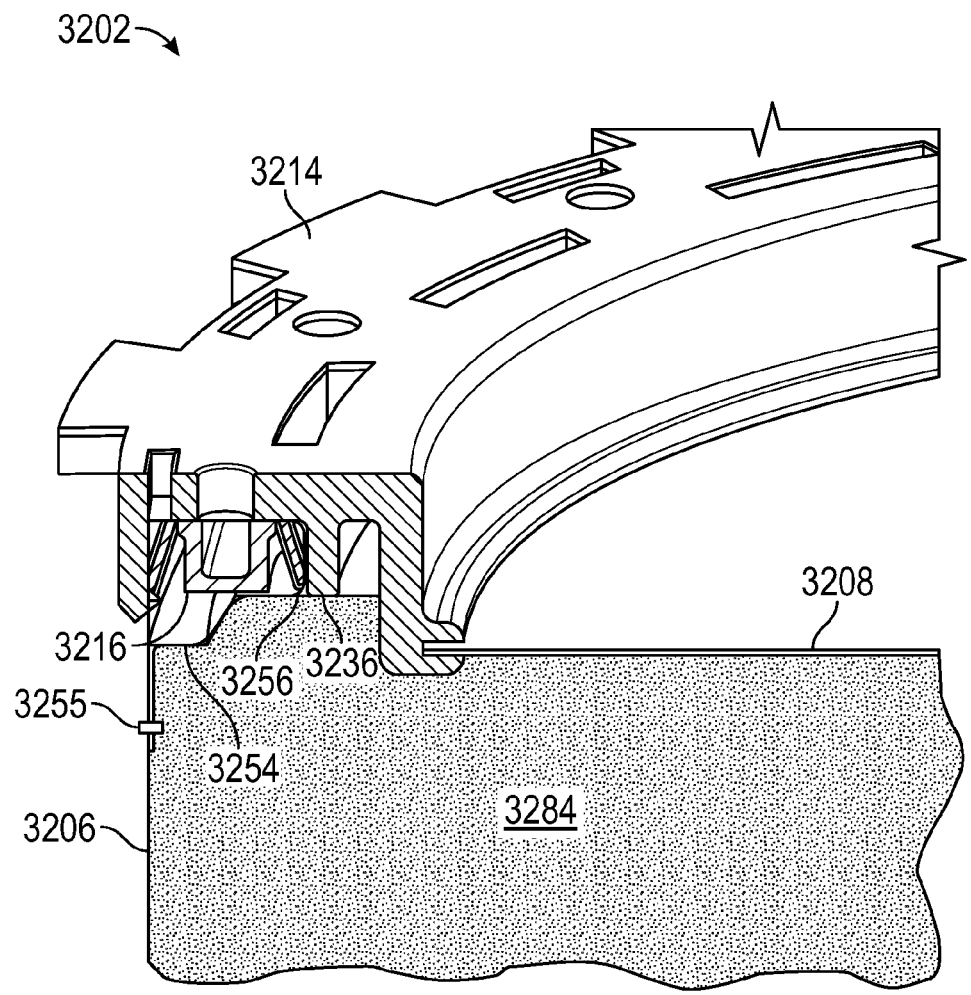
FIG. 40 is an enlarged sectional view of a top ring assembly that includes the first ring and second ring of FIG. 34 and FIG. 36 according to an embodiment.
Figure 41:
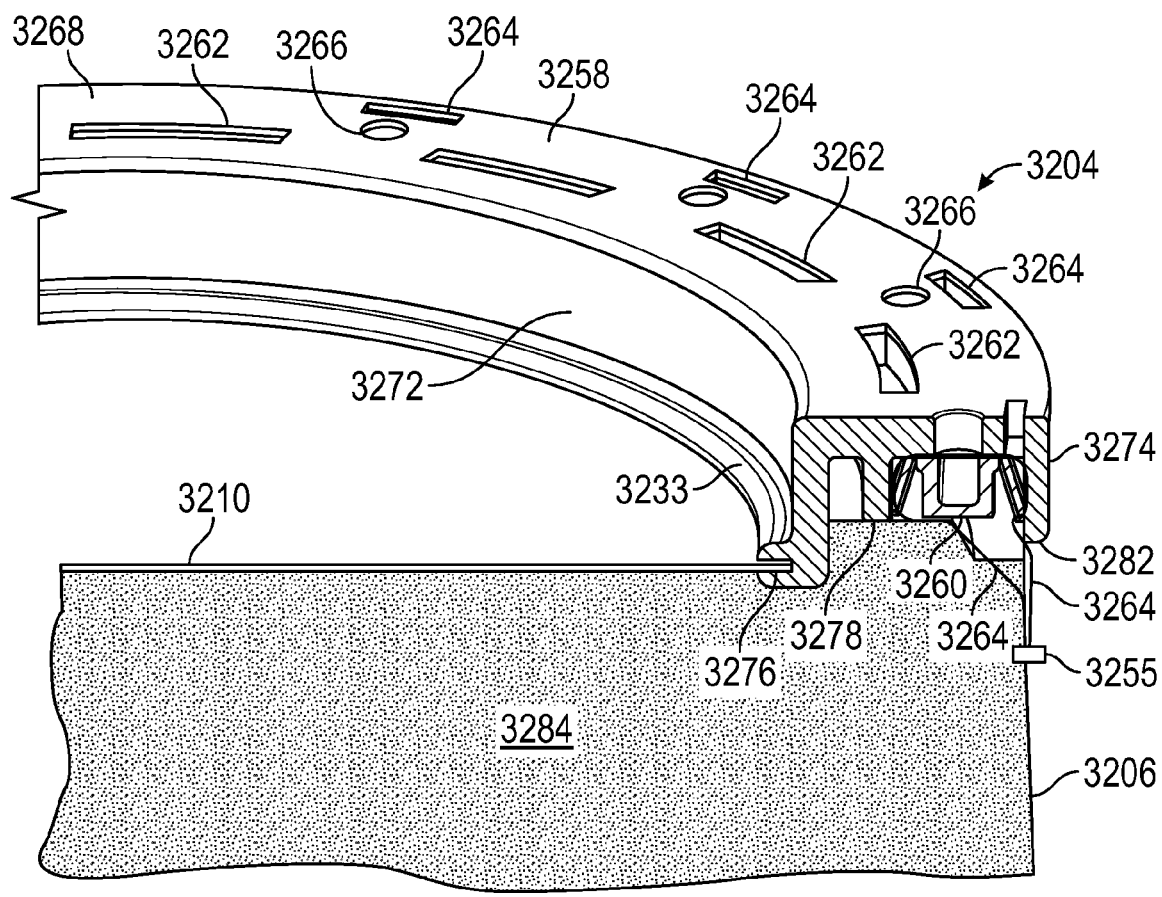
FIG. 41 is an enlarged sectional view of a bottom ring assembly that includes the third ring and the second ring of FIG. 38 and FIG. 36. according to an embodiment.
Figure 42:
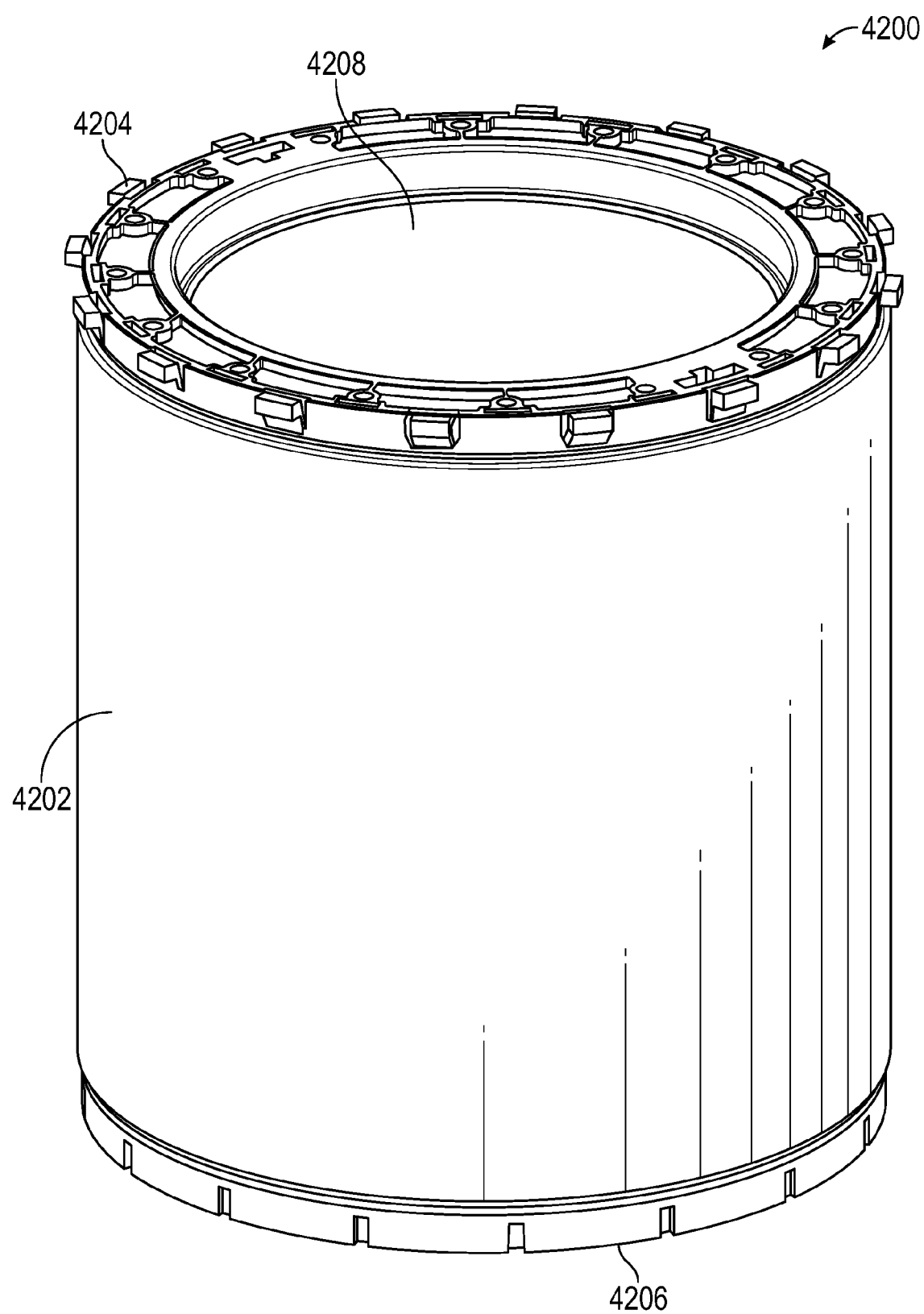
FIG. 42 is a perspective view of a replaceable media module in accordance with another embodiment.
Figure 43:
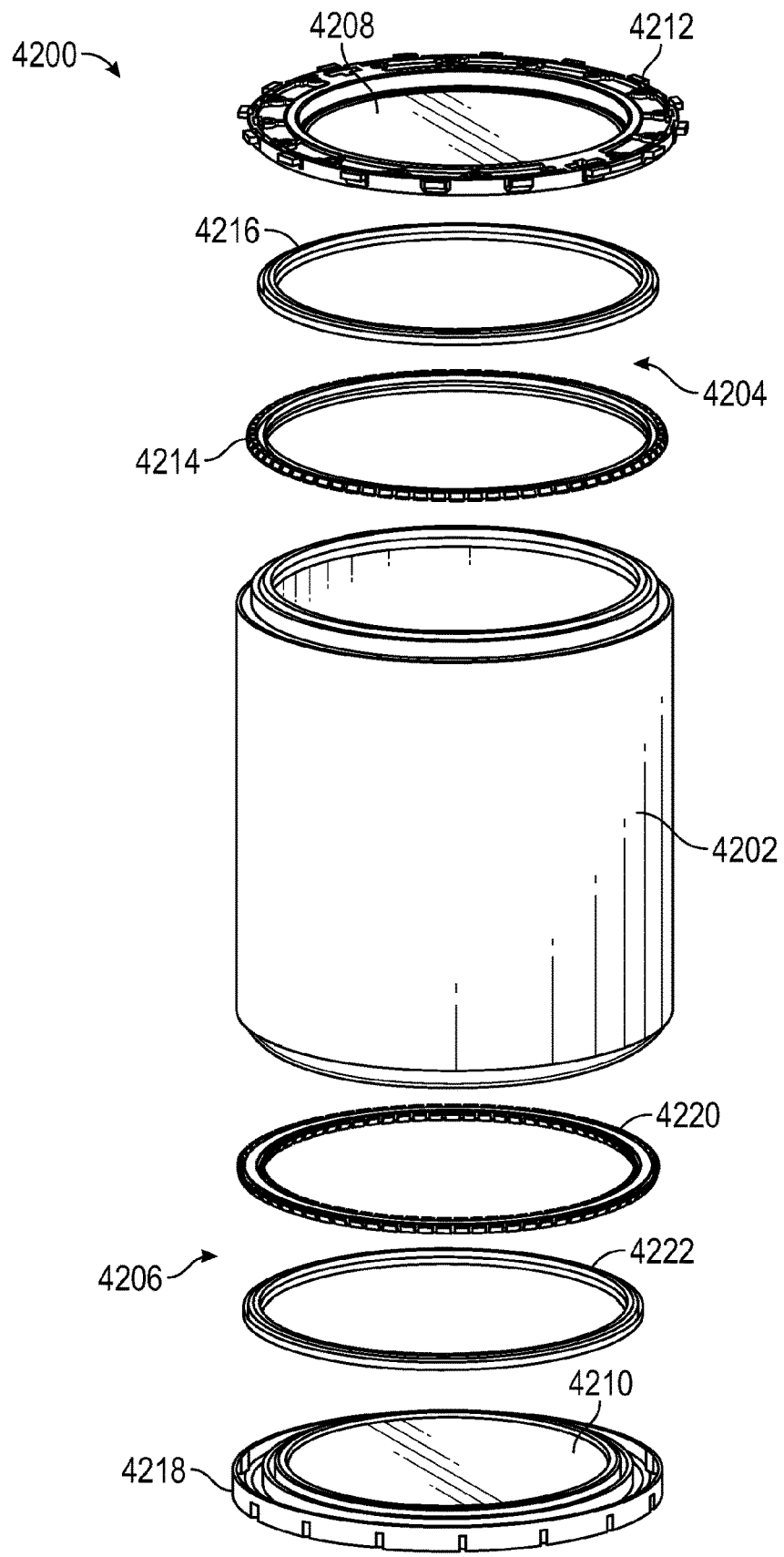
FIG. 43 is an unassembled view of the replaceable media module of FIG. 42.
Figure 44:
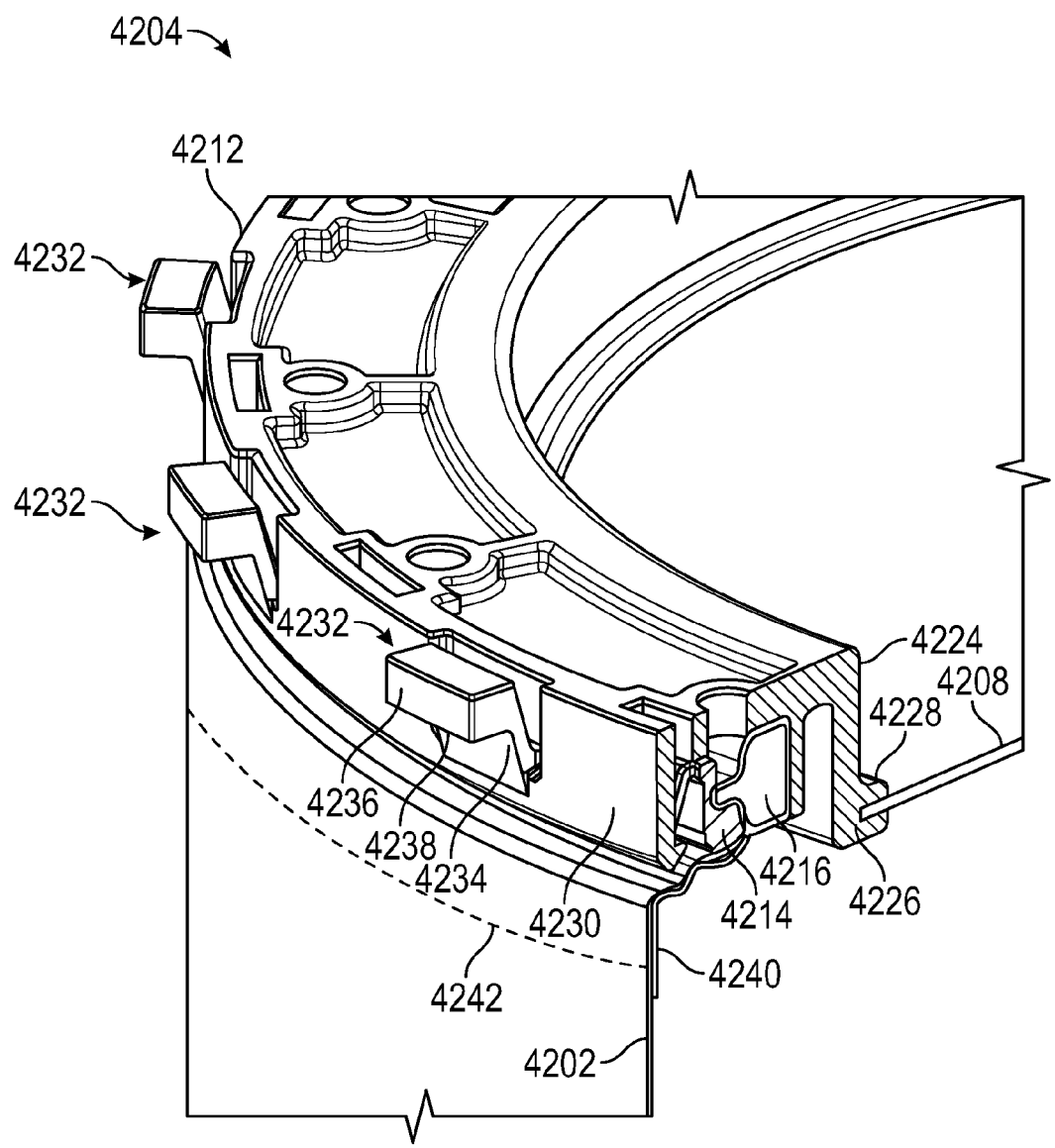
FIG. 44 is an enlarged perspective sectional view of a first ring assembly of the replaceable media module of FIG. 42.
Figure 45:
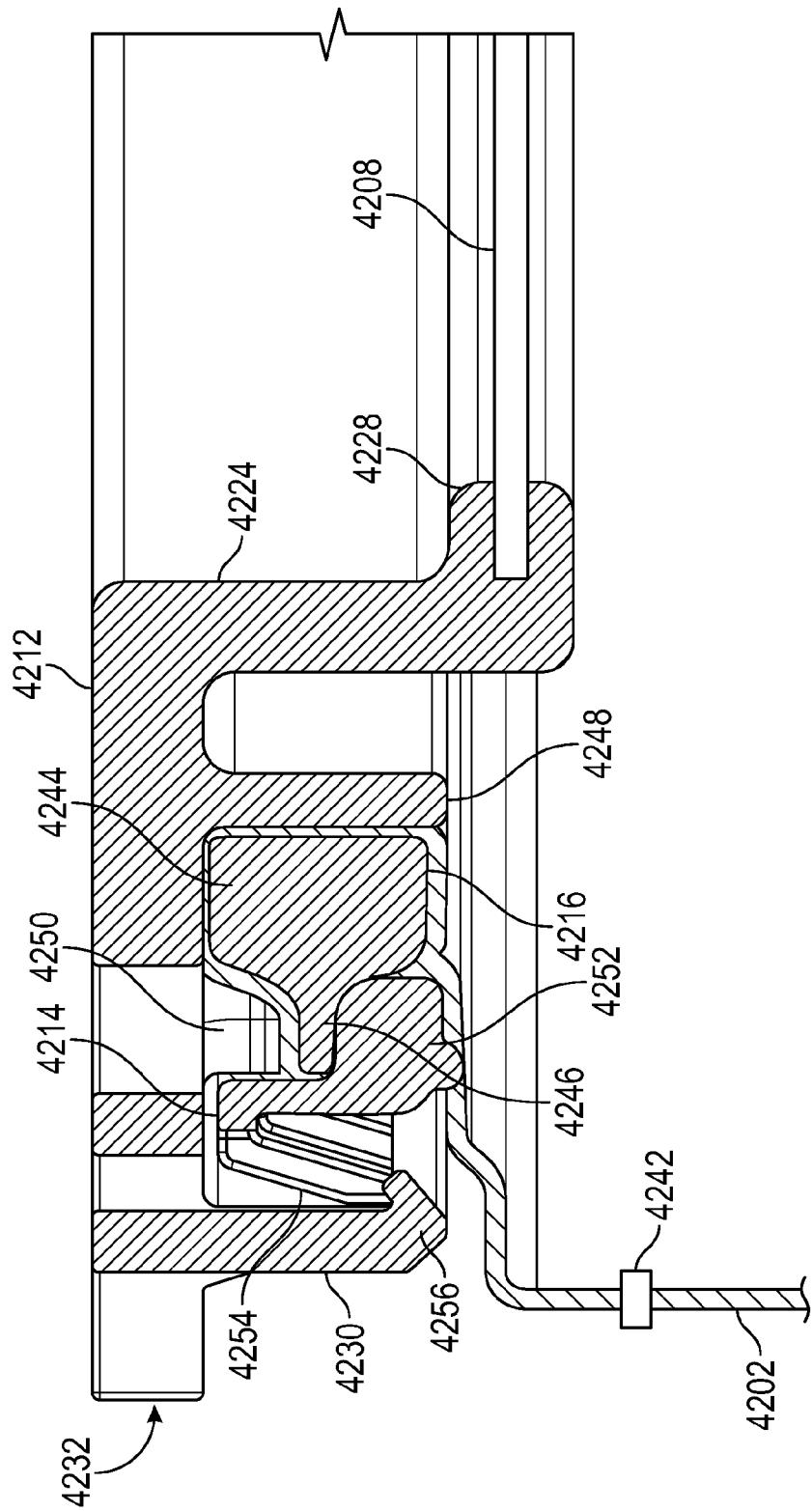
FIG. 45 is a side sectional view of the first ring assembly of the replaceable media module of FIG. 42.

Referring now to FIG. 36 and FIG. 37, the second ring 3216 is shown. The second ring 3216 includes a u-shaped body 3244 that defines a slot 3246. Extending from an end 3248 of the body 3242 are a plurality of first arms 3250 and a plurality of second arms 3252. The first arms 3250 are configured to engage the second tabs 3240 and the second arms 3252 are configured to engage the first tabs 3238 when the second ring 3216 is inserted into the slot 3234. It should be appreciated that the arms 3250, 3252 flex as the second ring 3216 is inserted into the slot 3234 and move back towards their original position to engage the tabs 3238, 3240.

The assembly of the first ring 3214 and the second ring 3216 also allows for the coupling of the first member 3206. In an embodiment where the end 3254 is not hemmed, the end 3254 of the first member 3206 may be overlaid the second ring 3216. In another embodiment, the end 3254 may be hemmed, meaning the edge of the material is folded over with the second ring 3216 disposed between the layers of the end 3254. By stitching 3255 the hemmed portion, the second ring is attached is coupled to the first member 3206. In one nonlimiting embodiment, the second ring 3216 is a split ring, meaning there are two separable ends at a joint 3217. This allows an end to be inserted into the hemmed opening (e.g. a slot or hole in the folded over end 3254) and then allowed to return to a circular shape when fully inserted. Then when the second ring 3216 is snapped into the slot 3234 the first member 3206 is captured therebetween. When assembled, the edge 3256 (FIG. 40) is disposed adjacent the wall 3236.

It should be appreciated that while embodiments herein may refer to the hemmed portions of the first member 3254 as being secured by stitching, this is for exemplary purposes and the claims should not be so limited. In other embodiments, the hemmed portion may be secured by an adhesive, ultrasonic welding or other suitable mechanical or adhesive means. In still other embodiments, the second ring 3216 may be sewn, bonded, or ultrasonically welded directly onto the hem or to the end of the first member (without a hem).

The second ring assembly 3204 includes a third ring 3258 and a second ring 3260. In the illustrated embodiment, the second ring 3260 identical to the second ring 3216. The third ring 3258 is configured the same as the first ring 3214 without the projections 3222. This allows the second ring assembly 3204 to move past the lip 3223 when the replaceable media module 3200 is inserted into the tank 104. The third ring includes a plurality of first slots 3262, a plurality of second slots 3264 and a plurality of holes 3266 that extend from a top surface 3268 to a slot 3270. The slot 3270 is defined by an inner wall 3272 and an outer wall 3274.

The inner wall 3272 includes a slot 3276 that extends about the circumference of the inner wall 3272. The slot 3276 is sized to receive the third member 3210. When the third member 3210 is received in the slot 3276, the third member closes the opening defined by the third ring 3258. In an embodiment, the third member 3210 is a mesh material that is molded into the third ring 3258 when the third ring 3258 is fabricated. Within the slot 3270 is a wall 3278 having a plurality of first tabs 3280 equally spaced about the circumference of the wall 3278. A plurality of second tabs 3282 extend radially inward from the inside surface of the outer wall 3274. When the second ring 3260 is inserted into the slot 3276, the arms of the second ring 3260 engage the tabs 3280, 3282 to couple the third ring 3258 and second ring 3260.

Similar to the first ring assembly 3202, the second ring assembly 3204 is coupled to an end 3264 of the first member 3206. The end 3264 is overlaid on the second ring 3260. When the second ring 3260 is inserted into the slot 3270, the first member 3206 is captured within the slot 3276 between the third ring 3258 and the second ring 3260. In an embodiment, the end 3264 of the first member 3206 is also hemmed (e.g. folded over and attached by stitching a thread 3255). In this embodiment, the second ring 3260 may also be a split ring that allows the second ring 3260 to be inserted into the hemmed portion. As discussed above, in some embodiments, the hem may be formed by an adhesive or ultrasonic welding. Further, in some embodiments, the second ring 3260 may be sewn, bonded or ultrasonically welded to the end of the first member (without a hem).

In the illustrated embodiment, the first member 3206 made from nylon (with or without elastane). The second member 3208 and third member 3210 may be made from a nylon mesh, such as a 300 mesh (small enough so that media does not flow therethrough). In an embodiment, the mesh material is sized to substantially prevent purification media from flowing therethrough and to provide consistent/uniform flow of water reducing the flow resistance of the prior art. In an embodiment, the second member and third member have an opening or pore size of between 10-400 microns (US Standard Mesh No. 850-US Standard Mesh 45). In another embodiment, the second member and third member have an opening or pore size between 50-300 microns (US Standard Mesh No. 270-US Standard Mesh 50). In an embodiment, the mesh material may be made from any suitable porous, relatively stiff/nonflexible material, such as but not limited to fabrics, plastics (e.g. polypropylene, nylon, etc.) or metal for example.

The first ring 3214, second ring 3216, 3260, and third ring 3258 may be made from polypropylene, acrylonitrile butadiene styrene (ABS), polyoxymethylene (POM) or polyamide (PA).

To assemble the replaceable media module 3200, the second ring 3258 is first slid into the area defined by the hemmed end 3264 and the third ring 3260 is snapped onto the second ring 3258. In the illustrated embodiment, the third member 3210 is insert molded or co-molded into the second ring 3258. Thus, once the second ring assembly 3204 is formed, the end of the first member 3206 is closed. Next, the second ring 3216 is slid into the area defined by the hemmed end 3254. The water purification resin 3284 is then inserted/filled into the interior space defined by the first member 3206 and the third member 3210. When the desired amount of resin is inserted (e.g. the first member 3206 is filled to a predetermined volume or weight), the first ring 3214 (with the second member 3208 inserted molded or co-molded into the ring 3214) is snapped onto the second ring 3216 to form the first ring assembly 3202 and enclose the end of the replaceable media module 3200. In an embodiment, the material of the first member is stretched as it is filled with the purification media to create the compressive force on the purification media after the resin module is closed.

Referring now to FIG. 42-FIG. 45 and FIG. 47, another embodiment is shown of a replaceable media module 4200. The replaceable media module 4200 includes a first member 4202, a first ring assembly 4204 and a second ring assembly 4206. The first ring assembly 4204 includes a second member 4208 and the second ring assembly includes a third member 4210. The second member 4208 and third member 4210 each enclose opposite ends of the replaceable media module 4200. The first member 4202, the second member 4208 and the third member 4210 are each made from a porous, flexible, and/or elastic material. In an embodiment, at least one of the materials is both porous and elastic. In other embodiments, at least one of the material is both porous and flexible. In some such embodiments, first member 4202 may be formed from a material that has 5%-25% elastane and 75%-95% Nylon, preferably a material formed from between 10%-20 elastane and between 80%-90% Nylon, or with 15% elastane and 85% Nylon being desired, and any subranges therebetween.

In an embodiment, the second member 4208 and the third member may be made from a mesh material. In an embodiment, the mesh material is sized to substantially prevent purification media from flowing therethrough and to provide consistent/uniform flow of water by reducing the flow resistance of the prior art. In an embodiment, the member 4208, 4210 may have an opening or pore size of between 10-400 microns (US Standard Mesh No. 850-US Standard Mesh 45). In another embodiment, the member 4208, 4210 may have an opening or pore size between 50-300 microns (US Standard Mesh No. 270-US Standard Mesh 50). In an embodiment, the mesh material may be made from any suitable porous, relatively stiff/nonflexible material, such as but not limited to fabrics, plastics (e.g. polypropylene, nylon, etc.) or metal for example.

The first ring assembly 4204 includes a first ring 4212, a second ring 4214, an intermediate ring 4216. The second member 4208 may be coupled to the first ring 4212 in the same manner as described above with reference to ring 3214 and member 3208. As will be described in more detail herein, the rings 4212, 4214, 4216 snap-fit together to couple the first member to the first ring assembly 4204. The second ring assembly 4206 includes a third ring 4218, second ring 4220, and an intermediate ring 4222. The third member 4210 may be coupled to the third ring 4218 in the same manner as described above with reference to ring 3258 and member 3210. As will be described in more detail herein, the rings 4118, 4220, 4222 snap-fit together to couple the first member 4202 to the second ring assembly 4206.

The first ring 4212 includes an inner wall 4224. In an embodiment, the inner wall 4224 includes a slot 4226 that is sized to receive the second member 4208. In an embodiment, the inner wall 4224 includes a lip 4228 that helps support the second member 4208. The first ring 4212 further includes an outer wall 4230. In one embodiment, the outer wall includes a plurality of tabs 4232. Each tab 4232 includes an arm 4234 and an end portion 4236. The end portion includes a shoulder 4238 that rests on the lip 3233 (FIG. 29) when the replaceable media module 4200 is placed in the tank 104. The tabs 4232 provide advantages in allowing flexibility in the placement of the replaceable media module 4200 within the tank 104 in the event that the tank opening and the lip 3233 are not concentric or are out of round.

The first ring assembly further includes an intermediate member 4216 that is disposed within spaced defined by the hemmed end 4240 and the stitches 4242. As noted above, in other embodiments, the hemmed end 4240 may be secured by an adhesive, ultrasonic bonding or other suitable mechanical or adhesive means. Further, the intermediate member 4216 may be sewn, bonded or ultrasonically welded to either the hemmed portion or directly to the end of the first member. The intermediate member 4216 includes a body 4244 having a protrusion 4246 extending about the outer periphery of the body 4244. The inner diameter of the body 4244 engages a wall 4248 that extends from the first ring 4212. An outer diameter of the body 4244 is positioned adjacent a ribs 4250. In the illustrated embodiment, the first ring 4212 includes a plurality of ribs 4250 that extend therefrom.

To secure the intermediate member 4216 to the first ring 4212, the second ring 4214 is snap-fit into the slot defined between the inner wall 4224 and the outer wall 4230. The second ring 4214 includes a body 4252 that is shaped to engage (indirectly through the thickness of the first member 4202) at least a portion of the protrusion 4246 and the body 4244. Extending from the body 4252 is a plurality of arms 4254. As the second ring 4214 is pushed into the slot in the first ring 4212, the arms 4254 flex as the second ring 4214 moves past a tab 4256. Once the end of the arms 4254 move past the tab 4256, the arms 4254 move back towards their original position and secure the first member 4202, the second ring 4214, and the intermediate member 4216 to the first ring 4212. It should be appreciated that the wall 4248 and the tabs 4256 may be formed in the same manner as the wall 3236 and tabs 3282 of FIG. 39.

Figure 46:
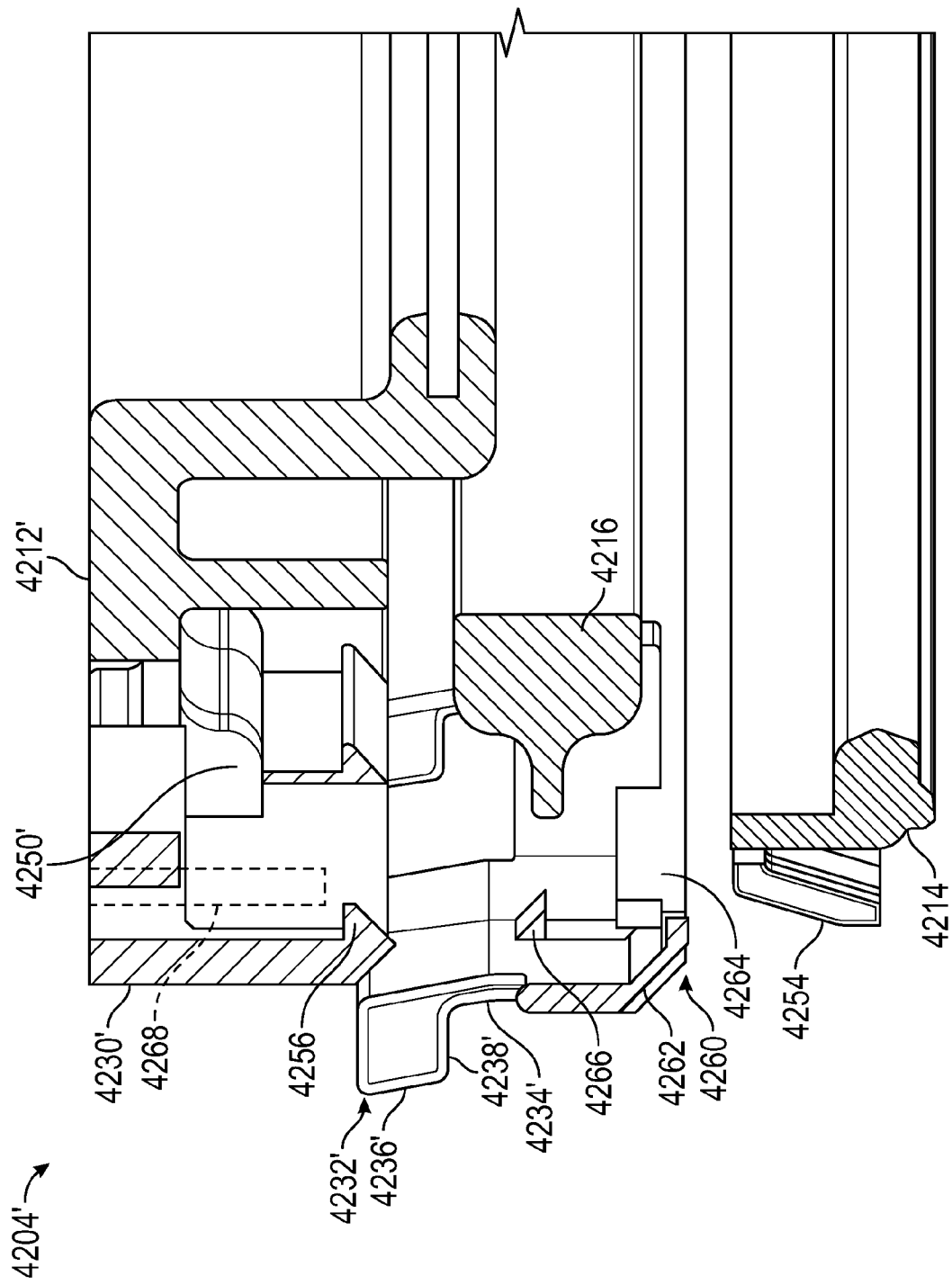
FIG. 46 is a side sectional view of a first ring assembly for use with the replaceable media module of FIG. 42 in accordance with another embodiment.

Referring now to FIG. 46, another embodiment is shown of a first ring assembly 4204'. The assembly 4204' is similar to the first ring assembly 4204, having a first ring 4212', an intermediate body 4216 and a second ring 4214. The first ring 4212' is similar to the first ring 4212, except that the outer wall 4230' does not include any tabs. In this embodiment, the assembly 4204' includes an outer ring 4260. The outer ring 4260 includes a body 4262 having a first tab 4264 and a second tab 4266. The first tab 4264 engages the bottom surface of the outer wall 4230' (e.g. adjacent the tab) and the second tab 4266 is snap-fit into a slot 4268 on the outer wall 4230'. In other embodiments, the outer ring 4260 may be mechanically fastened (e.g. screws), adhesively bonded, or ultrasonically welded to the ring 4212'. It should be appreciated that the outer ring 4260 includes a plurality of tabs 4264, 4266 that are disposed about the circumference of the body 4262.

Extending from the body 4262 are a plurality of tabs 4232' that are disposed about the circumference of the outer ring 4260. The tabs 4232' include an arm 4234' and an end portion 4236' having a shoulder 4238'. The shoulder 4238' is sized and positioned to engage the lip 3223 when the replaceable media module 4200 is placed in the tank 104.

In an embodiment, the outer ring 4260 is a split ring. This may provide additional advantages in allowing the outer ring 4260 to be removed from the replaceable media module 4200 so that the replaceable media module 4200 may be used in another system, such as an intermediate or bottom most media module in a system 100 (FIG. 15A-FIG. 15C) for example. In an embodiment, the outer ring 4260 may be installed after the first member is filled with purification resin.

Figure 47:
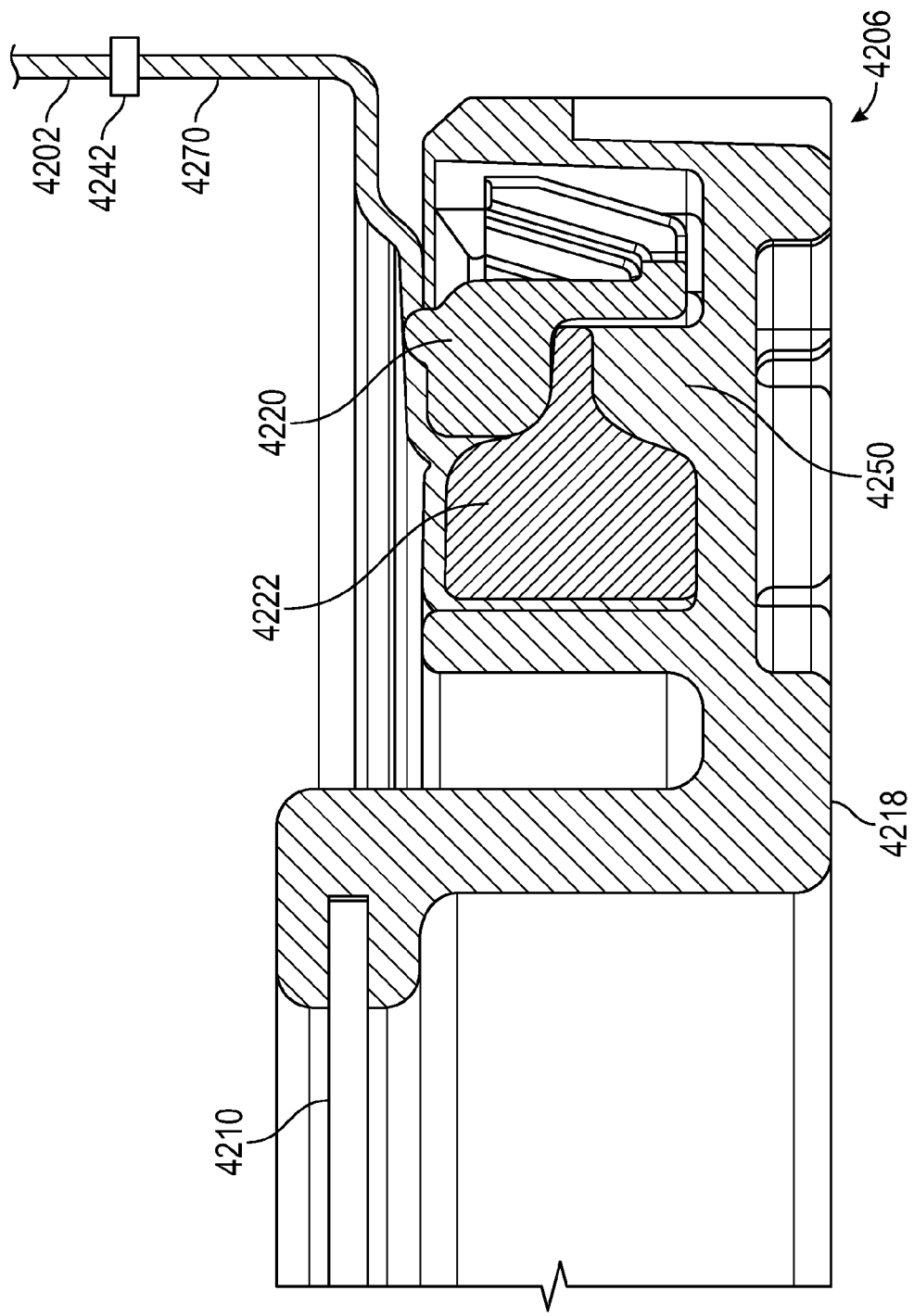
FIG. 47 is a side sectional view of a second ring assembly for use with the replaceable media module of FIG. 42.

Referring now to FIG. 47, an embodiment is shown of the second ring assembly 4206. In this embodiment, the third ring 4218 is the same as the first ring 4212, except that the third ring 4218 does not include the tabs 4232. Thus, the second ring assembly 4206 is configured the same as the first ring assembly 4204 having an intermediate ring 4222 disposed within a hemmed portion 4270. The intermediate ring 4222 and the first member 4202 are coupled to the third ring 4218 by the second ring 4220 that is coupled to the third ring 4218 by a snap-fit in the same manner as described above with respect to first ring 4212, second ring 4214 and intermediate ring 4216.

It should be appreciated that when the module 4200 is used in a multi-module system, such as system 100 (FIG. 15A-FIG. 15C), the modules placed in the lower positioned (e.g. all other positions except the top most module), may have the ring assembly 4206 on both ends of the first member 4202, so as to allow the modules 4200 to move past the lip 3223.

Figure 48:
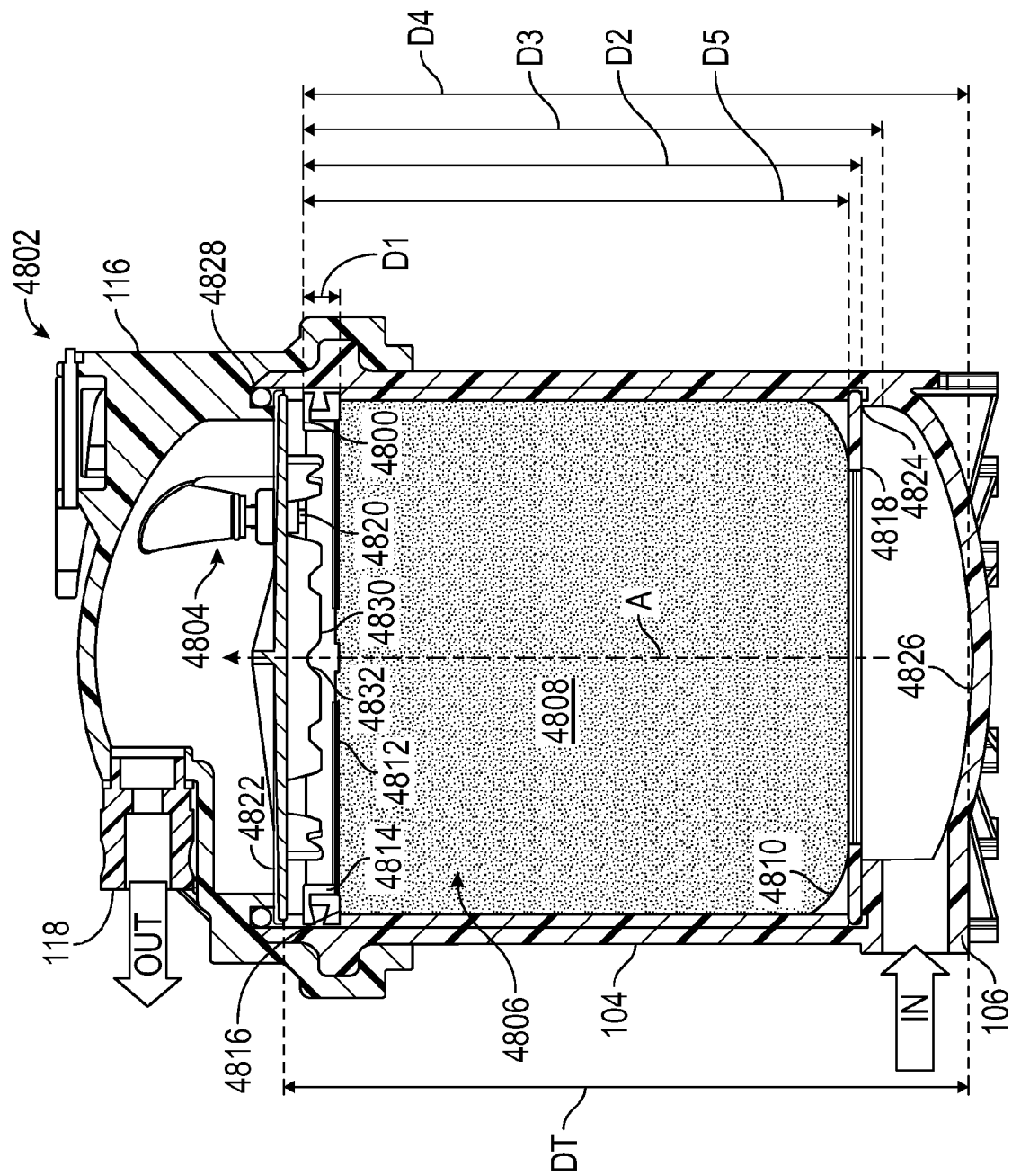
FIG. 48 is a side sectional view of a system having an activation surface.
Figure 49:
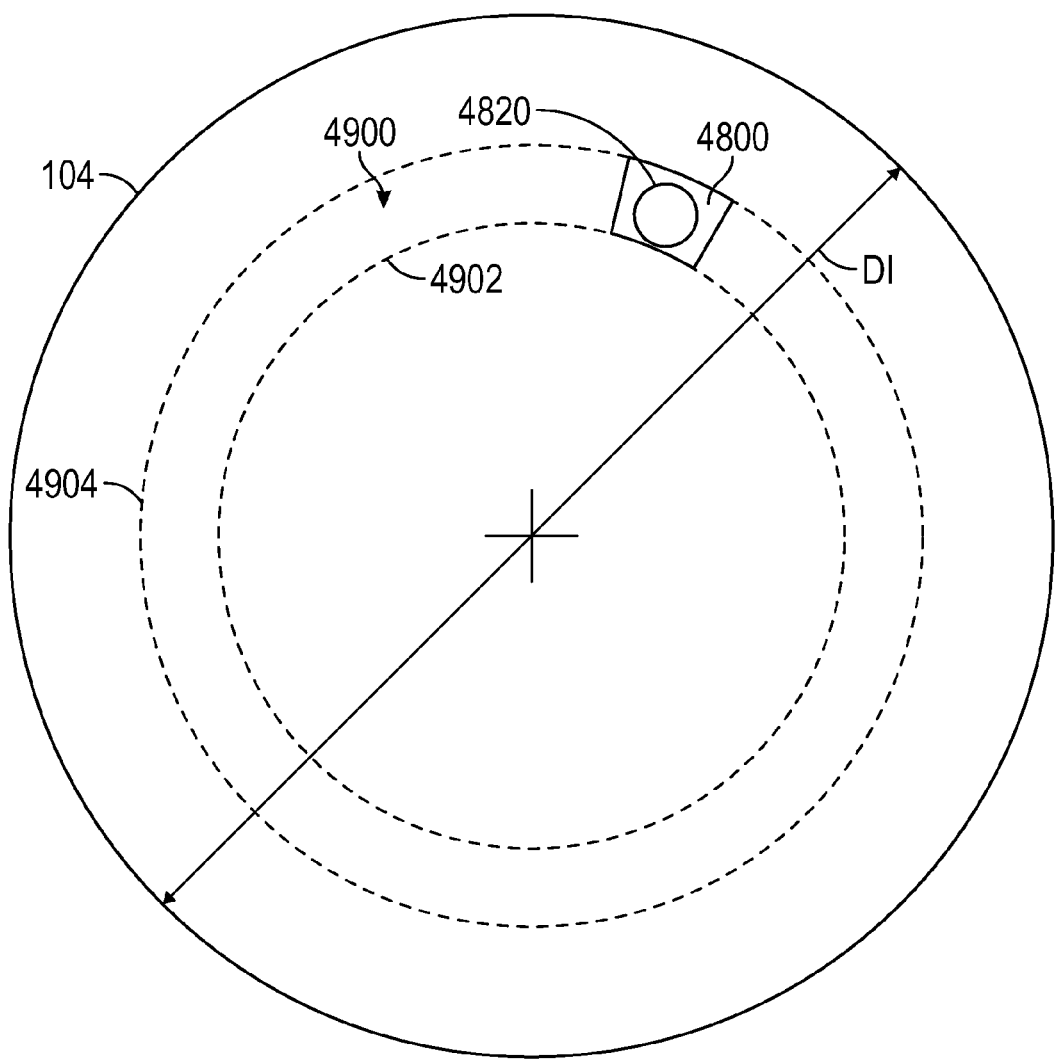
FIG. 49 is a top schematic plan view of the system of FIG. 48.
Figure 50:
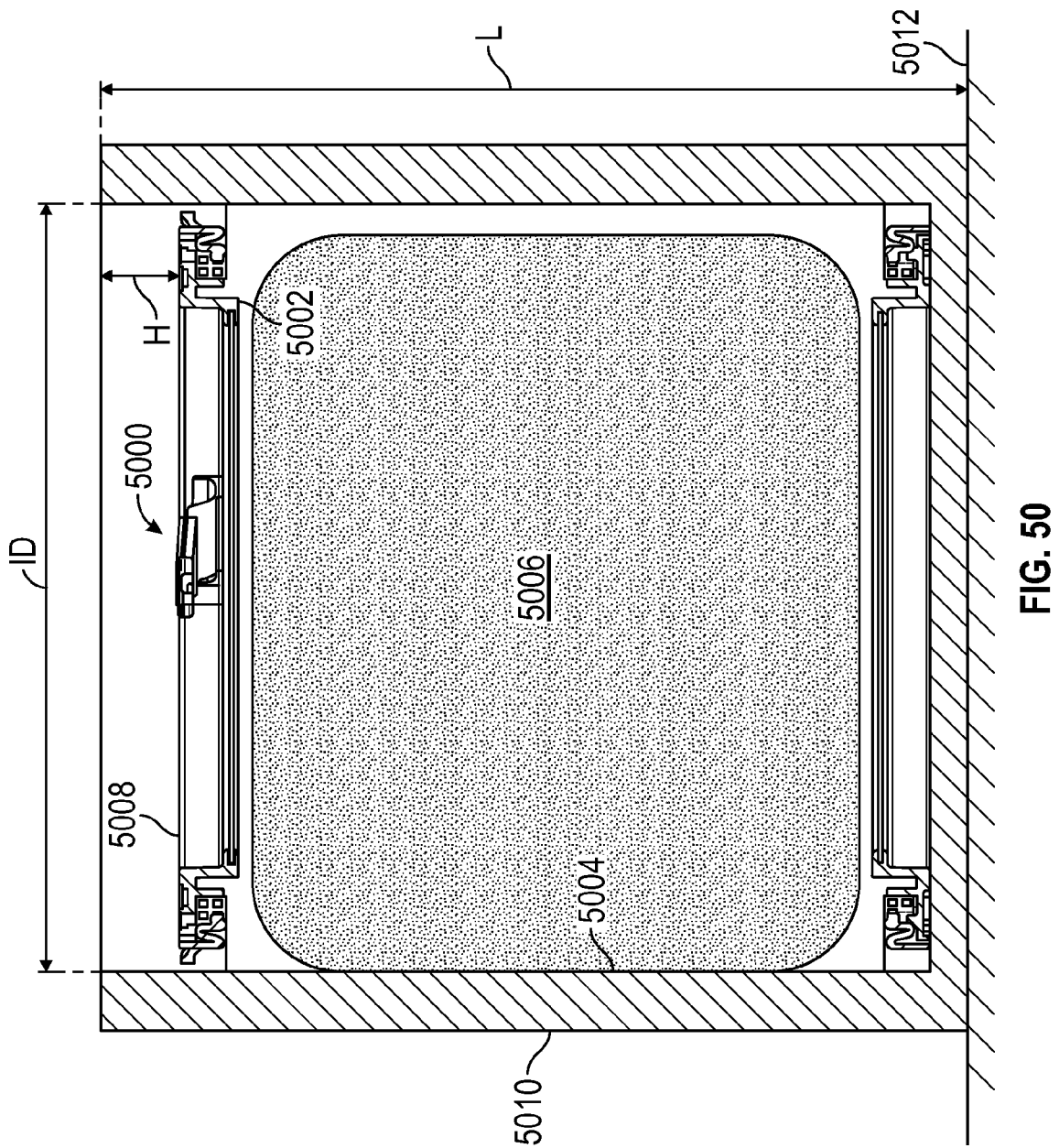
FIG. 50 is a side sectional view of a system for check a desired location of an activation valve.

Referring now to FIGS. 48-50, embodiments are illustrated showing the positioning of an activation surface 4800 relative to different features within the system 4802. It should be appreciated the location parameters disclosed with respect to FIGS. 48-50 are also applicable to the embodiments shown in FIGS. 27-47. It should be appreciated that the positioning of the activation surface 4800 in the desired location allows the activation of the valve 4804. The valve 4804 may be the same the valve used in release assembly 2710 or valve assembly 3100 for example. Placement of the activation surface 4800 at the desired location provides advantages in the sealing of valve 4804. Further placement of the activation surface 4800 at the desired location assists in sealing the end of the tank 104.

In the embodiment of FIG. 48, a purification member 4806 is configured to be disposed within the hollow interior of the tank 104. The purification member 4806 is a container for purification media 4808. In the exemplary embodiment, the purification media 4808 is in a compressed state as described herein. The purification member 4806 may include a first member or wall 4810 that contains the purification media 4808. The wall 4810 may be a made from a fluid permeable elastic and flexible material. In another embodiment the wall 4810 may be made from flexible or a substantially rigid material. The end of the purification member 4808 may be formed by closing or gathering the end of the wall 4810, or may be formed by a second member 4812. The second member 4812 may be made from a flexible material, elastic and flexible material, or a rigid material. In the illustrated embodiment, the wall 4810 and the second member 4812 are coupled by an activation element 4814. The activation element 4814 may be the same as ring assembly 114, member 303, or ring assembly 1100, 1200, 1610, 1910, 3202, 4204 for example.

In the illustrated embodiment, the activation surface 4800 is integral with activation element 4814. In an embodiment, the activation surface 4800 is the top surface of the activation element 4814. In embodiments herein, the activation element 4814 is described as being coupled to the purification member 4806, however the claims should not be so limited. In other embodiments, the activation element 4814 is separate from the purification member 4806.

In an embodiment, the activation element 4814 is positioned on or rests on a lip or location surface 4816 that is formed on an inner wall of the hollow interior of tank 104. In an embodiment the location surface is located 0 to 50 mm from the top of the tank. In an embodiment where the activation element 4814 is coupled to or integral with the purification member 4806, the wall 4810 and purification media 4808 may be suspended within the hollow interior of the tank 104. Thus, while the embodiment of FIG. 48 shows the wall 4810 as extending to a diffuser 4818, in other embodiments, the bottom of the wall 4810 may be offset from any diffuser or other element located towards the bottom of the hollow interior of tank 104.

It should be appreciated that while the activation element 4814 is illustrated as being an annular or ring shaped member, this is for exemplary purposes and the claims should not be so limited. One or both of the activation element 4814 and the activation surface 4800 may have other shapes, such as but not limited to a semi-circle, a partial circle a crescent, and a straight bar for example. Further in some embodiments, the activation element 4814 may not be positioned on a lip 3223 formed in the inner wall of the tank 104, but rather from a different location surface, such as but not limited to the bottom surface 4826 of the tank 104 D4, a lip D2 the diffuser rests on, or the top surface of a diffuser 4818 D5.

As discussed, the activation surface 4800 is positioned to engage valve 4804. In an embodiment, the valve 4804 includes an actuator 4820 that extends through an upper diffuser element 4822. The actuator 4820 is movable between at least an open position where the valve 4804 is open and gas or fluids within the tank may be vented to the environment, and a closed position where the valve 4804 is closed and the interior of the tank is sealed from the environment. As discussed herein, when the activation element 4814 and the activation surface 4800 are positioned in the desired location within the tank 104, the actuator 4820 will engage the activation surface when the cover 116 is placed on the tank and move the valve 4804 to the closed position.

The activation surface 4800 may be positioned within the tank 104 relative to other features. In an embodiment, the activation surface is a distance D1 of 0-10 millimeters from the location surface 4816. In an embodiment, the location of the activation surface 4800 may be relative to a depth of the tank 104. The activation surface 4800 may be 0-30% of the depth DT of the hollow interior from the bottom of the top diffuser 4822 to the bottom of the tank 104. It should be appreciated that the hollow interior of the tank 104 may have a complex shape and other features, such as a lip 4824, or a curved/hemispherical surface 4826. Thus the depth of the hollow interior of tank 104 may be measured as being the depth D2 to the lip 4824, the depth D3 to an end of surface 4826, or the depth D4 to the point of the surface 4826 that is furthest from the end 4828 of tank 104. In an embodiment, the activation surface 4800 is located 180 to 300 millimeters from a bottom surface of the hollow interior of tank 104. Where the system includes one or more elongation tubes 104', the distance from the activation surface to the bottom surface of the elongation tube 104' is about 220 to 275 millimeter, or about 250 millimeters. In one embodiment the activation surface 4800 is about 207 millimeters from a lip 4824. It should be appreciated that the activation surface 4800 may also be positioned relative to a surface on the top diffuser 4818. In still other embodiments, the activation surface 4800 may be positioned relative to an end of the wall 4810 or the second member 4812. In an embodiment, the activation surface 4800 may be 50 millimeters from the end of the wall 4810 or the second member 4812.

In an embodiment, the activation surface 4800 is parallel to the open end 4828 of tank 104. In an embodiment, the activation surface 4800 is parallel to the location surface 4816.

In an embodiment, the activation surface 4800 may also be, or alternatively be, positioned relative to the periphery or diameter of the tank 104. As shown schematically in FIG. 49, the tank 104 has an inner diameter DI. In this embodiment, the activation surface 4800 is positioned within an annular region 4900 that is defined by an inner circle 4902 and an outer circle 4904, the circles 4902, 4904 being substantially concentric with the inner diameter DI. In an embodiment, the annular region is between 65% to 85% of the diameter DI. In an embodiment, the inner circle is about 140 millimeters and the outer circle is about 160 millimeters.

It should be appreciated that the activation surface 4800 may not have an annular shape, but may be any suitable surface area having a structure that activates the actuator 4820. In other words, the activation surface 4800 may be any shape that is in the desired position and sufficient structural rigidity to overcome the spring force within the actuator 4820. In an embodiment, the activation surface 4800 engages at least half of the actuator 4820. In other embodiments, the activation surface 4800 has an area between 5 mm$^2$-70 mm$^2$. In still another embodiment, the activation surface has an area of about 35 mm$^2$.

In an embodiment, the diffuser 4822 has at least one rib 4830 that extends from a side of the diffuser opposite the valve 4804. In an embodiment a plurality of ribs 4830 are disposed circumferentially about the surface of the diffuser 4822. The ribs 4830 may include one or more curved slots 4832. The ribs 4830 are sized to have sufficient height to reduce the risk of the top surface of the purification member 4806 from inadvertently engaging the actuator 4820. It should be appreciated that if a purification member that did not have a rigid element on the location surface 4816, was placed in the hollow interior and was sized such that the top surface of the purification member engaged the actuator 4820, the valve 4804 may be initially closed. However, as the purification media 4808 is depleted, the actuator 4820 will move towards an open position, and eventually water would leak through the valve 4804 (to clarify this would only occur if it was not a rigid container or the top activation is located to shelf 4816). In an embodiment, the ribs 4830 have an outer diameter up to about 140 mm and a height of about 12 millimeters.

It should be appreciated that when the activation element is coupled to the structure (e.g. wall/member 4810) containing the purification media, it is desired to check the purification member to determine whether the activation surface is in a desired position. This may be advantageous with embodiments where the wall/member 4810 is made from a flexible material, or an elastic and flexible material. Due to the nature of the material, the shape of the purification member may be different in a free or unsupported state (e.g. the material will sag under the weight of the purification media and have a pear like shape as shown in FIG. 18) than when contained within the hollow interior of the tank 104 (e.g. conforms to the inner wall of the hollow interior). Referring now to FIG. 50, an embodiment is shown of a system and method of checking a purification member 5000 having an activation element 5002 coupled to a container having a wall/member 5004 that holds purification media 5006.

To check that the activation surface 5008 is at a desired location to activate the valve (e.g. valve 4804) when placed in the fluid purification system, the purification member 5000 is placed within a tube 5010 having a predetermined inner diameter ID and a predetermined length L. The tube 5010 has sufficient rigidity to support the wall/member 5004 when the purification member 5000 is placed therein. It should be appreciated that the bottom of the tube 5010 may be enclosed or the tube 5010 may be placed upright on a surface 5012. The operator may then measure a distance H. When the distance H is within a predetermined threshold, or threshold range, the activation surface 5008 will be located at the desired position when placed within the hollow interior of the tank 104. In an embodiment, the tube 5010 has a inner diameter ID of 205 millimeters, a length L of 220 and the height H should be between 0 millimeters and 40 millimeters. In one embodiment, the height H is 20 millimeters.

It should be appreciated that while the embodiments of FIGS. 48-50 illustrated the purification member 4806 with a closed bottom portion formed by the wall 4810, this is for exemplary purposes and the claims should not be so limited. In other embodiments, the purification member 4806 may include additional structure, such as a diffuser element incorporated into the purification member like is shown in FIGS. 19-21 for example. Further, the purification member 4806 may include a bottom element, such as the ring assemblies shown in FIGS. 3-7 and FIGS. 32-47. Further, the purification member 4806 may be a combination of these embodiments. Further, the wall 4810 may be fabricated from multiple members that are coupled (e.g. sewn, adhesively bonded or ultrasonically bonded) together to define a container to hold the purification media.

Further, it should be appreciated that while the embodiments of FIGS. 48-50 illustrate a purification system having a single purification module, this is for exemplary purposes and the claims should not be so limited. In other embodiment, the purification system may include multiple purification members as is shown in FIGS. 15A-15C.

Embodiments provided herein provide replaceable media modules that allow for more consistent/uniform flow through the modules than prior purification systems. It has been found that this provides advantages in better utilization of the purification media, which in turn extends the life of the replaceable media modules.

It should further be appreciated that while embodiments herein may refer to features with respect to an embodiment, this is for example purposes and it is contemplated that the features may be combined with other disclosed embodiments.

The term "about" is intended to include the degree of error associated with measurement of the particular quantity based upon the equipment available at the time of filing the application. For example, "substantially" or "about" can include a range around a given value.

It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A fluid purification device comprising:
a first member, the first member having a first open end;
a first element coupled to and disposed about the first open end, the first element having an inner surface, and outer surface, and a slot formed between the inner surface and the outer surface therein;
a second element coupled to the first element;
an intermediate element coupled to the first member adjacent to the first open end, the intermediate element being at least partially disposed between the first element and the second element, wherein at least one of the second element and the intermediate element is arranged within the slot; and
a porous second member, the porous second member being operably coupled to the inner surface of the first element and enclosing the first open end.

2. The fluid purification device of claim 1, wherein the first element is integral with the first member.

3. The fluid purification device of claim 1, wherein the first member is made from a flexible material.

4. A fluid purification device for use in a fluid purification system having a tank, a valve, and a lever arranged to engage the valve, the valve having an open position and a closed position, the fluid purification device comprising:
a first member configured to be disposed within a hollow interior of the tank, having a purification media disposed therein;
a first element coupled to and disposed about an open end of the first member, the first element having a slot formed therein;
a second element coupled to the first element;
an intermediate element coupled to the first member adjacent to the first member open end, the intermediate element being at least partially disposed between the first element and the second element, wherein at least one of the second element and the intermediate element is arranged within the slot via a snap-fit connection; and
an activation element sized to fit within the hollow interior of the tank, the activation element being configured to engage the valve when the activation element is disposed in the tank, the intermediate element being operably coupled to the activation element.

5. The fluid purification device of claim 4, wherein the activation element is operably coupled to the first member.

6. The fluid purification device of claim 4, further comprising a porous second member, the porous second member being operably coupled to the activation element and enclosing the open end of the first member.

7. The fluid purification device of claim 4, wherein the activation element is integral with the first member.

8. The fluid purification device of claim 4, wherein:
the tank has the hollow interior extending from an open end, the hollow interior having a predetermined depth; and
the activation element includes activation surface, the activation surface being configured to be located 0-30% of the predetermined depth from the open end when the first member is inserted in the tank.

9. The fluid purification device of claim 4, wherein:
the tank includes a location surface formed on an inner wall of the hollow interior adjacent an open end of the tank; and
the activation element includes an activation surface that is configured to be parallel with a location surface when the first member is inserted in the tank.

10. The fluid purification device of claim 9, wherein the activation element includes the activation surface configured to engage the valve when the first member is inserted in the tank, the activation surface being positioned at least partially within an annular region on the activation element, the annular region being positioned at a location between 65% to 85% of a diameter of the tank when the first member is inserted in the tank.

11. A fluid purification device for use in a fluid purification system having a tank, a valve, and a lever arranged to engage the valve, the valve having an open position and a closed position, the fluid purification device comprising:
a first member configured to be disposed within a hollow interior of the tank, having a purification media disposed therein;

an intermediate member coupled to the first member adjacent a first member open end;

an activation element sized to fit within the hollow interior of the tank, the activation element being configured to engage the valve when the activation element is disposed in the tank, the intermediate member being operably coupled to the activation element; and wherein the activation element includes a portion having an engagement surface on a first side and a rib extending from a second side, the second side being arranged opposite the engagement surface, the engagement surface being arranged to engage the valve.

12. The fluid purification device of claim 11, wherein the rib contacts the first member.

13. The fluid purification device of claim 4, wherein the first member and the activation element are sized . . . when the first member and the activation element are positioned within the tube.

14. A fluid purification device comprising:

a first member, the first member having a first open end;

an intermediate element coupled to the first member adjacent the first open end;

a first element separate from and connectable to the first open end, the intermediate element being operably coupled to the first element;

a porous second member, the porous second member being operably coupled to the first element and enclosing the first open end; and a second element removably coupled to the first element, the second element securing the intermediate element to the first element, wherein a portion of the first member is positioned between the second element and the intermediate element.

15. The fluid purification device claim 14, wherein the second element includes an arm, the arm cooperating with the first element to couple the second element to the first element with a snap fit.

16. The fluid purification device claim 14, wherein the second element further includes a body and the intermediate element includes a protrusion, the first member being disposed adjacent to the protrusion and the body of the second element.

17. The fluid purification device claim 16, wherein the first element includes a rib adjacent to the portion of the first member that is adjacent the protrusion.

18. The fluid purification device claim 17, wherein the rib contacts the first member.

19. A fluid purification device comprising:

a first member, the first member having a first open end;

an intermediate member coupled to the first member adjacent the first open end;

a first element coupled to and disposed about the first open end, the intermediate member being operably coupled to the first element;

a porous second member, the porous second member being operably coupled to the first element and enclosing the first open end; and wherein the first member includes a space defined by a hemmed portion, the intermediate member being disposed within the space.

20. The fluid purification device of claim 12, wherein the intermediate element is coupled to the first member by either adhesively bonding, ultrasonically welding, or sewing.

\* \* \* \* \*